US009527211B2

(12) United States Patent
Posselius et al.

(10) Patent No.: US 9,527,211 B2
(45) Date of Patent: Dec. 27, 2016

(54) CONTROL ARCHITECTURE FOR MULTI-ROBOT SYSTEM

(71) Applicant: CNH Industrial America LLC, New Holland, PA (US)

(72) Inventors: John H. Posselius, Ephrata, PA (US); Christopher A. Foster, Lititz, PA (US); Santosh K. Pitla, Columbus, OH (US); Scott A. Shearer, Hilliard, OH (US); Joe D. Luck, Lincoln, NE (US); Michael P. Sama, Lexington, KY (US); Rodrigo S. Zandonadi, Sinop (BR)

(73) Assignee: CNH Industrial America LLC, New Holland, PA (US)

( * ) Notice: Subject to any disclaimer, the term of this patent is extended or adjusted under 35 U.S.C. 154(b) by 158 days.

(21) Appl. No.: 14/274,130

(22) Filed: May 9, 2014

(65) Prior Publication Data

US 2014/0336818 A1 Nov. 13, 2014

Related U.S. Application Data

(60) Provisional application No. 61/822,102, filed on May 10, 2013.

(51) Int. Cl.
*G05B 19/418* (2006.01)
*B25J 9/16* (2006.01)
*G05B 19/402* (2006.01)
*G05D 1/02* (2006.01)

(52) U.S. Cl.
CPC ............ *B25J 9/1679* (2013.01); *G05B 19/402* (2013.01); *G05D 1/0295* (2013.01); *G05D 1/0297* (2013.01); *G05D 2201/0201* (2013.01)

(58) Field of Classification Search
CPC .... B25J 9/1679; G05B 19/402; G05D 1/0295; G05D 2201/0201
USPC ............. 700/245–264; 701/1, 23, 24, 25, 50
See application file for complete search history.

(56) References Cited

U.S. PATENT DOCUMENTS

| 5,646,844 A * | 7/1997 | Gudat | E01C 19/004 |
| | | | 701/409 |
| 6,205,381 B1 * | 3/2001 | Motz | A01B 69/008 |
| | | | 340/988 |
| 2002/0059320 A1 * | 5/2002 | Tamaru | E01C 19/00 |

(Continued)

OTHER PUBLICATIONS

"Motor Schema—Based Mobile Robot Navigation", R.C. Arkin, The International Journal of Robotics Research, 1989 (22 pages).

(Continued)

*Primary Examiner* — Jerrah Edwards
*Assistant Examiner* — Rachid Bendidi
(74) *Attorney, Agent, or Firm* — Rebbeca L. Henkel

(57) ABSTRACT

A multiple robot control architecture including a plurality of robotic agricultural machines including a first and second robotic agricultural machine. Each robotic agricultural machine including at least one controller configured to implement a plurality of finite state machines within an individual robot control architecture (IRCA) and a global information module (GIM) communicatively coupled to the IRCA. The GIMs of the first and second robotic agricultural machines being configured to cooperate to cause said first robotic agricultural machine and said second agricultural machine to perform at least one agricultural task.

20 Claims, 38 Drawing Sheets

(56) References Cited

U.S. PATENT DOCUMENTS

| | | | |
|---|---|---|---|
| 2007/0021879 A1* | 1/2007 | DelNero | G05D 1/0088 701/23 |
| 2007/0112700 A1* | 5/2007 | Den Haan | G05D 1/024 706/14 |
| 2007/0129869 A1* | 6/2007 | Gudat | G05D 1/0297 701/50 |
| 2010/0042297 A1* | 2/2010 | Foster | A01B 79/005 701/50 |
| 2010/0070145 A1* | 3/2010 | Foster | A01B 79/005 701/50 |
| 2010/0094499 A1* | 4/2010 | Anderson | G05D 1/0295 701/23 |
| 2012/0085458 A1* | 4/2012 | Wenzel | A01F 25/14 141/10 |
| 2013/0179026 A1* | 7/2013 | McClure | A01B 69/008 701/25 |
| 2013/0231823 A1* | 9/2013 | Wang | A01B 69/008 701/24 |

OTHER PUBLICATIONS

"Integrating Behavioral, Perceptual, and World Knowledge in Reactive Navigation", Ronald C. Arkin, Elsevier Science Publishers B.V., 1990 (18 pages).

"Communication in Reactive Multiagent Robotic Systems", Tucker Balch and Ronald C. Arkin, Autonomous Robots, 1994 (25 pages).

"A Specification of Behavioural Requirements for an Autonomous Tractor", Professor Simon Blackmore, AgroTechnology, The Royal Veterinary and Agricultural University, 2001 (17 pages).

"A Proposed System Architecture to Enable Behavioural Control of an Autonomous Tractor", Professor Simon Blackmore, AgroTechnology, The Royal Veterinary and Agricultural University, 2002 (14 pages).

"A Robust Layered Control System for a Mobile Robot", Rodney A. Brooks, IEEE Journal of Robotics and Automation, vol. RA-2, No. 1, Mar. 1986 (10 pages).

"Experiements in Multirobot Air-Ground Coordination", Luiz Chaimowicz, et al., Proceedings of the IEEE International Conference on Robotics and Automation 2004, vol. 4, pp. 4053-4058 (7 pages).

"A Framework and Architecture for Multi-Robot Coordination", Rafael Fierro, et al., The International Journal of Robotics Research, vol. 21, No. 10-11, Oct.-Nov. 2002 (19 pages).

"Development and Implementation of a Team of Robotic Tractors for Autonomous Peat Moss Harvesting", David A. Johnson et al., Journal of Field Robotics 26(6-7), 2009 (23 pages).

"Task Modelling in Collective Robotics", C. Ronald Kube and Hong Zhang, Autonomous Robots 4, 1997 (20 pages).

"Supervisory Control of Multiple Tractors in an Orchard Environment", Stewart Moorehead et al., Deere & Company & National Robotics Engineering Center, Carnegie Mellon University, 2009 (2 pages).

"Connecting High Level and Low Level Controllers on Robotic Vehicles Using a Supporting Architecture", Cameron Mott et al., Moline Technology Innovation Center and John Deere Technology Innovation Center, Deere & Company, 2009 (2 pages).

"Development of a Master-Slave Robot System for Farm Operations", Noboru Noguchi et al., Science Direct, Computers and Electronics in Agriculture 44, 2004 (19 pages).

"Multi-Robot Systems: From Swarms to Intelligent Automata", Alan C. Schultz and Lynne E. Parker, Proceedings from 2002 NRL Workshop on Mutli-Robot Systems, Springer-Science+Business Media, B.V., 2002 (7 pages).

"IRoN: An Inter Robot Network and Three Examples on Multiple Mobile Robots' Motion Coordination", M. Rude, et al., Intelligent Robot Laboratory, Institute of Information Science and Electronics, University of Tsukuba, 1997 (8 pages).

"Joint Architecture for Unmanned Ground Systems (JAUGS) Applied to Autonomous Agricultural Vehicles", M. W. Torrie et al., Automation Technology for Off-Road Equipment, Proceedings of the Jul. 26-27, 2002 Conference, Jul. 26, 2002 (12 pages).

"Coordinated master-slave motion control for agricultural robotic vehicles", S.G. Vougioukas, Aristotle University of Thessaloniki, Department of Agricultural Engineering, 2009 (6 pages).

"A New Conceptual Approach to the Design of Hybrid Control Architecture for Autonomous Mobile Robots", H. Yavuz and A. Bradshaw, Journal of Intelligent and Robotic Systems 34: 1-26, 2002 (26 pages).

"Behavior Based Robotics Intelligent Autonomous Agents", Ronald C. Arkin, 1998, pp. 80-83, 112-113 and 226-227 (4 pages).

\* cited by examiner

StatMsg

| SA | L1 | L2 | F1 | F2 | F3 | ← Status Flags |
|----|----|----|----|----|----|---|
| 1  | 0  | 0  | 0  | 0  | 0  | ← Values |

Message Frame

| Data | Control | StatMsg |
|------|---------|---------|
| (x, y, v, φ) | (m, r, c) | (1, 0, 0, 0, 0, 0) |

CONTROL ARCHITECTURE FOR MULTI-ROBOT SYSTEM

CROSS REFERENCE TO RELATED APPLICATIONS

This is a non-provisional application based upon U.S. provisional patent application Ser. No. 61/822,102, entitled "CONTROL ARCHITECTURE FOR MULTI-ROBOT SYSTEM", filed May 10, 2013, which is incorporated herein by reference.

BACKGROUND OF THE INVENTION

1. Field of the Invention

The present application relates to multi-robotic systems and more specifically to a control architecture for a multi-robot agricultural field production system.

2. Description of the Related Art

The notion of improving productivity using autonomous agricultural vehicles has gained increased attention. A combination of labor shortages and the need to manage multiple machines by a single operator is driving the demand for the deployment of autonomous vehicles. While autonomous operation of these vehicles is beneficial to the producer, operating them in a farm environment is a challenging endeavor. Elimination of the driver from the control loop complicates contemporary automated agricultural vehicles adding to existing liability challenges. The agricultural environment in which an Agricultural Robot (ag-robot) operates is unknown, uncontrollable and unpredictable. Sensors onboard the ag-robot acts as a gateway to the external world and aid the robot in learning about the unknown environment.

The demand for application of computers and electronics to automate the agricultural field machinery has seen tremendous growth in the recent years. The primary objective of automating field machinery is to increase productivity. Although, electronics are extensively used in contemporary agriculture to assist machine operators, the continual increase in the size of farm equipment is creating problems with the metering and placement of crop production inputs and soil compaction. Automation is seen as a way to mitigate sources of errors and problems that are caused with the ever increasing size of human-controlled field machinery. Typically, use of multiple machines with dedicated human operators is common on most large scale farms. Hence, there is a one-to-one ratio of human operators to the number of machines. Use of agricultural robots and the capability of one human to manage and monitor multiple robots can reduce labor costs and increase the productivity of the farming operation significantly. Taking agricultural robotics a step further, deployment of a completely autonomous multi robot system (MRS) has the potential to be efficient, profitable and scale neutral. In the future, farm operators will monitor field operations remotely and respond to machine errors/failures as required.

Previous efforts by researchers have focused on implementation of MRSs for agricultural production. Algorithms for operating a leader-follower MRS were developed by Noguchi et al. (2004). In this system the lead machine is controlled manually and algorithms enable the autonomous follower machine to either follow or go to a particular location commanded by the lead machine. Vougioukas (2009) proposed a method for coordinating teams of robots where one lead machine specifies the motion characteristics of one or more machines (followers). Simulation experiments verified that the method can be used for coordinated motion of hierarchies of leader-follower robots. Researchers at Carnegie Mellon University and John Deere Company are working on a project to enable a single remote user to supervise a fleet of semi-autonomous tractors mowing and spraying in an orchard (Moorehead et al., 2009). In a similar effort, three autonomous peat harvesting machines performed 100 field test missions during tests conducted with end users (Johnson et al., 2009). The efforts to implement MRS by these researchers are a testimony to the fact that deployment of agricultural robotics in real-world applications is feasible and that production agriculture is evolving into a high-tech work environment.

The design of control architecture for a MRS becomes increasingly challenging with the number of robots performing a given task. The MRS should adapt to the changing environment and, changes in the configuration and capabilities of other robots to accomplish the overall production goal. A mechanism for dynamic coordination of multiple robots was developed using hybrid systems framework by Chaimowicz et al. (2004). The mechanism allowed the robots to dynamically change their roles and adapt to the changing environment to finish the task successfully. A framework and architecture for multi-robot coordination was developed by Fierro et al. (2002) for applications ranging from scouting and reconnaissance, to search and rescue. The software framework provided a modular and hierarchical approach to programming deliberative and reactive behaviors in autonomous operation. In a similar effort, finite state automata theory was used for modeling multi-robot tasks for collective robotics by Kube et al. (1997).

In addition to task modeling and dynamic role assignment, coordination and synchronization of robot actions involve exchanging information between the team members to finish the cooperative tasks. Thus, inter-robot communication becomes crucial for the success of a MRS. Identifying the specific advantages of deploying inter-robot communication is critical as the cost increases with the complexity of communication among the robots. Three types of inter-robot communication were explored by Balch et al. (1994). They found that inter-robot communication can significantly improve performance in some cases, but for others, inter-agent communication is unnecessary. In cases where communication helps, the lowest level of communication is almost as effective as the more complex type. Rude et al. (1997) developed a wireless inter robot communication network called IRoN. The two important concepts of the network were implicit and explicit communication. Modest cooperation between robots was realized using implicit communication while a dynamic cooperation was achieved by using explicit communication.

To date, most of the research work done on multi-agent robot systems has been conducted in areas other than agriculture. Research work done on the architectural specifications of a MRS specifically deployed for agricultural production is nonexistent. Thus, there is a need to explore research and understand control methodologies so that multiple robots can be deployed simultaneously. Furthermore, a rapidly evolving contemporary agriculture industry may be poised to adopt MRS for increasing production efficiency.

Most of the initial work done on control architectures for mobile robots was carried out in aerospace and artificial intelligence research laboratories to accomplish military missions and space exploration. Several researchers identified the utility of control architectures that offered fault tolerance and robustness to the operation of these robots. A robust layered control system with task achieving behaviors was proposed by Brooks (1986) where, a behavior was defined as a stimulus and response pair. Brooks reasoned that the conventional sense-plan-act paradigm used in some of the first autonomous robots was detrimental to the construction of the real working robots. The author proposed a robust layered control system with task achieving behaviors in which each layer was an augmented finite state machine (AFSM) that works concurrently and asynchronously. Arkin (1989 and 1998) extensively utilized schema theory and developed distributive processing architectures for autonomous Behavior Based (BB) robots. Schemas were biologically inspired concepts that acted in parallel as individual distributed agents. Reactive and deliberative behaviors are two types of behaviors dealt with in BB robotics. Reactive behaviors are instantaneous responses of the robot to external stimuli where the robot's reaction is triggered by the changes in environment (e.g., reacting to obstacles). Goal-oriented/deliberative behavior is a pre-planned execution of control steps aimed at achieving a given task (e.g., path planning to reach a target). An Autonomous Robot Architecture (AuRA) for reactive control was thus developed by Arkin (1998) that consisted of five basic subsystems; perception, cartographic, planning, motor and homeostatic control. Numerous robot experiments and simulations demonstrated the flexibility and adaptability of this architecture for navigation. AuRA is a generic architecture that can be applied for navigation in buildings, in outdoor campus settings, in aerospace or undersea applications and in manufacturing environments. Yavuz and Bradshaw (2002) did an extensive literature review of the available robot architectures and proposed a new conceptual approach that included both reactive and deliberative behaviors. In addition to reactive, deliberative, distributed, and centralized control approaches, fuzzy logic and modular hierarchical structure principles were utilized. The architectures discussed above were mostly utilized for mobile robotic applications for non-agricultural settings.

For agricultural robotic applications, a specification of behavioral requirements for an autonomous tractor was provided by Blackmore et al. (2001). The authors discussed the importance of a control system that behaves sensibly in a semi-natural environment, and identified graceful degradation as a key element of a robust autonomous vehicle. Using the BB robotic principles, Blackmore et al. (2002) developed a system architecture for the behavioral control of an autonomous tractor. Blackmore followed the assumption that robotic architecture designs refer to a software architecture, rather than hardware, side of the system (Arkin, 1998). A more practical approach of control architecture for ag-robots was proposed by Torrie et al. (2002). The authors stated that, to effectively support Unmanned Ground Vehicle (UGV) systems, a standard architecture is required. They developed a Joint Architecture for Unmanned Ground Systems (JAUGS) that was independent of vehicle platform, mission or tasks, computer hardware and technology. JAUGS was scalable and can be applied for any task with minimum components. This architecture was implemented on orchard tractors and small utility vehicles. In a similar attempt, a system architecture that connects high level and low level controllers of a robotic vehicle was proposed by Mott et al. (2009). In addition to the high and low-level controllers, a middle-level was introduced that acted as a communication bridge integrating the high and low-level controllers thereby providing robustness to the robotic vehicles.

What is needed in the art therefore is a generalized control architecture of an ag-robot that provides intelligence to the ag-robot enabling full autonomy and sufficient intelligence to accomplish a desired task while encountering unpredictable situations.

SUMMARY OF THE INVENTION

The invention provides a generalized control architecture of a robot that provides intelligence to the robot by enabling full autonomy and sufficient intelligence to accomplish a desired task while encountering unpredictable situations in an agricultural environment.

To optimally utilize the information obtained from sensors, the ag-robot should possess an intelligent robust control methodology. The control structure of the ag-robot methodically converts sensor output into desired, useful actions. Further, the ag-robot should effectively arbitrate/prioritize the information available from different sensors to ensure safe and efficient operation. Thus, it is imperative that the ag-robot possess a robust and fault tolerant control architecture that ensures safe and desired operation. Although, a MRS is desirable for increasing the efficiency of agricultural production, it is a challenge to coordinate the activities of multiple robots. A system consisting of multiple, simpler robots will most likely be cost-effective and more robust than a system employing a single complex robot (Parker, 2002). If one robot fails the remaining robots continue to work to finish the given task making the system more reliable than a single complex robot. However, to achieve a safe and reliable MRS, it is important to develop robust control and coordination strategies. A robust control architecture or framework is vital to deploy a MRS and a focus of the present invention is a robust Multi-Robot System Control Architecture (MRSCA).

Modern autonomous machines, although equipped with numerous sensors and controls, require human supervision to warrant safe operation. In contrast, the next generation autonomous machines, in addition to the control hardware, must include intelligence to learn and react to the unknown environment in the absence of an operator. Intelligence to an Agricultural Robot (Ag-Robot) is possible through a robust control methodology/architecture that effectively interprets, arbitrates and prioritizes the information obtained from sensors to produce desired actions. In the present invention, a five-layer, Individual Robot Control Architecture (IRCA) is developed and validated. The five functional layers methodically interpret and translate sensor information into useful actions of the robot. Using typical field conditions for an Ag-Robot, five scenarios were created for simulation. Inputs for the simulation of the Finite State Machine Layer (FSML) of the IRCA were generated from the scenarios. SIMULINK and State Flow Chart tool (MATLAB, Inc.) were used for building inputs and internal states of the FSML. During the simulation, the FSML generated desired/reference commands required by the ag-robot to perform desired tasks for given scenarios.

Deployment of a Multi-Robot System (MRS) for accomplishing cooperative agricultural tasks can be overwhelming from a control perspective and presents a challenge for coordinating the activities of the agricultural robots. Analysis of the functions of each robot and identifying the role each robot has to perform becomes significant for finishing an assigned cooperative task. The present invention focuses on a framework/control architecture to deploy a MRS for accomplishing typical agricultural tasks. The architecture developed focuses on the aspects of homogeneity and heterogeneity, level of cooperation, type of inter-robot communication and the role assignment of each robot during the cooperative task execution. A key component of the MRSCA developed in this manuscript is the global information module (GIM). The GIM receives information local to each robot and the global information from other robots as inputs and yields role assignments and messages required for inter-robot coordination. The GIM is assumed as a finite state machine (FSM) with three parallel finite states; Role Module (RM), Coordination Module (CM) and Wireless Communication Module (WCM) for building a simulation model. The state flow chart tool of MATLAB was used to simulate the GIM for three levels of cooperation between the robots of the MRS. Each level of cooperation is associated with typical agricultural tasks such as, for example, planting, baling and harvesting.

The invention, in one form, is a multiple robot control architecture including a plurality of robotic agricultural machines including a first and second robotic agricultural machine. Each robotic agricultural machine including at least one controller configured to implement a plurality of finite state machines within an individual robot control architecture (IRCA) and a global information module (GIM) communicatively coupled to the IRCA. The GIMs of the first and second robotic agricultural machines being configured to cooperate to cause said first robotic agricultural machine and said second agricultural machine to perform at least one agricultural task.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 39 illustrates the GIM of the Follower with active state Go To;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
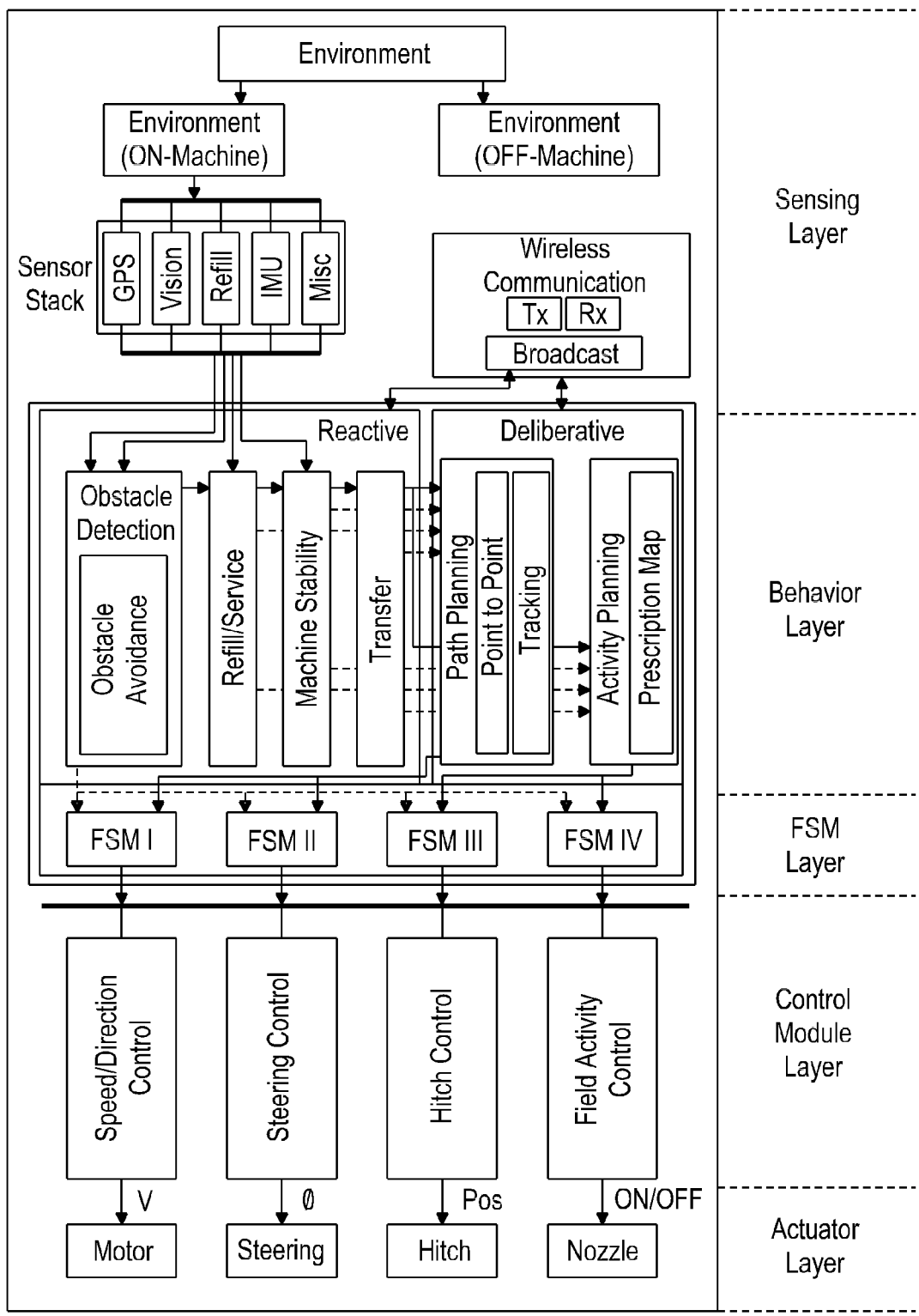
FIG. 1 is a schematical illustration of an embodiment of the Individual Robot Control Architecture (IRCA) of an ag-robot of the present invention.

Referring now to the drawings, and more particularly to FIG. 1, the Individual Robot Control Architecture (IRCA) consists of five functional layers; the Sensing Layer (SL), the Behavior Layer (BL), the Finite State Machine Layer (FSML), the Control Module Layer (CML) and the Actuator Layer (AL). Each layer of the IRCA (FIG. 1) can be implemented in either software or hardware constructs. A detailed explanation on each layer follows.

The SL is the topmost layer of the IRCA that processes information about the environment obtained from the onboard sensors or entities (e.g., remote computer, other robots) external to the ag-robot. The sensor stack and Wireless Communication Module (WCM) are two important components of the SL.

The sensor stack (FIG. 1) of the SL is an array of sensors that aids the ag-robot in continuous learning about the operating environment. Example sensors required for an ag-robot are included shown in the sensor stack of the IRCA (FIG. 1) and included Global Positioning System (GPS) for determining location (x, y) and heading (o) information, vision sensors (e.g., Infra-Red or Laser) for sensing the obstacles, refill sensors (e.g., proximity sensors) for monitoring the levels of fuel and crop input material (e.g., pesticide, fertilizer and seeds), and an Inertial Measurement Unit (IMU) for obtaining the velocity, orientation and gravitational force information. Additional sensors required for a specific application can be added or removed without affecting architecture function.

The WCM of the SL processes the commands and information obtained from remote or off-machine entities. The WCM transmits, receives and broadcasts the messages depending on the robot's mode of operation. Data consisting of the current states, for instance, speed, location and the fraction of assigned task completed by the robot can be continuously broadcasted to enable the operator of a remote base station to monitor the progress of the ag-robot. The WCM plays a crucial role in providing redundant safety features for the robot. For example, when a vision sensor fails and the robot is in danger of a collision, the remote base station can be used to wirelessly send an emergency command to the ag-robot. In this study, the WCM will be assumed to process only messages received from a base station. Discussion on the in-depth details of the WCM is beyond the scope of this manuscript. Thus, the SL receives the environment data obtained from the sensor stack (on-machine) and the WCM (off-machine) and passes the information to the BL for further processing and filtering.

The BL is purely a software layer that manages the data flow and acts as a gateway between the SL and the FSML. This layer of the IRCA contains two types of behaviors; Deliberative and Reactive. Deliberative behaviors are planned sequential steps that enable the robot to reach an assigned goal, whereas reactive behaviors allow the ag-robot to respond to unexpected and dynamic events. The hybrid nature of the BL allows the Ag-Robot to achieve real-time responsiveness and goal oriented planning. An important feature of the IRCA called the By-Pass of Control will be defined before discussing the deliberative and reactive behaviors in detail.

Figure 2:
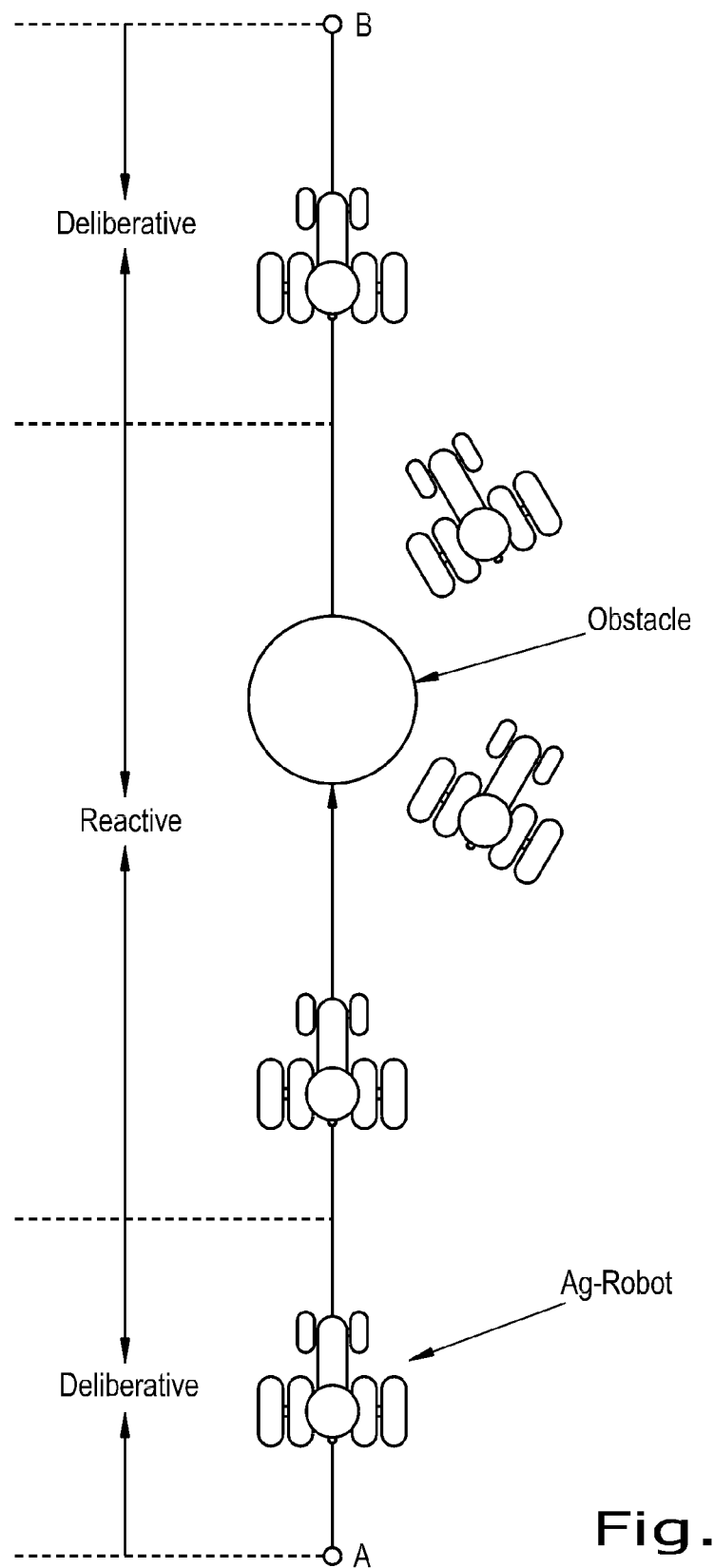
FIG. 2 is a schematical illustration of the operation of the By-Pass of Control aspect of the IRCA shown in FIG. 1.

By-Pass of Control is an important phenomenon that happens in the BL when the ag-robot experiences unexpected and dynamic events. Control commands to the actuators of the ag-robot are typically generated either by the deliberative or reactive behavior at all times of operation. These two types of behaviors are mutually exclusive and only one behavior (reactive or deliberative) can generate control commands to the actuator at any given time. For the majority of the ag-robot's field operation, the deliberative behavior is responsible for control command generation under normal conditions, whereas the reactive behavior generates control commands in the event of unpredictable situations. The switching of the control command generation source in response to the changing environment is known as By-Pass of Control. This aspect is illustrated with a simple example in FIG. 2, where the ag-robot performs goal oriented navigation and obstacle avoidance. In FIG. 2, the ag-robot starts from point A to reach its target point B. At the beginning of the path the ag-robot is in deliberative mode and takes the control commands required to follow a desired path from the deliberative behavior. Once the ag-robot encounters an unexpected event (obstacle), by virtue of By-Pass of Control, the ag-robot switches to reactive mode where this behavior generates control commands to the actuators to avoid the obstacle. After obstacle avoidance, the ag-robot switches back to deliberative mode and control commands are generated to reach goal point B.

High level decision making processes that require planning and algorithm execution are placed in the deliberative behavior. In deliberative mode, parallel deliberative behaviors; Path Planning Module (PPM) and Activity Planning Module (APM), generate control commands that are sent to the FSML (see FIG. 1) for further processing. The major task of the PPM is to generate the desired steering angle (SAd) required for the ag-robot to reach its goal point. The PPM accepts current location information from the GPS and determines the desired SAd to reach a goal point or to track a given path. Two algorithms, point-to-point and tracking lie within the PPM to determine the desired SAd. The APM is a field activity planner that devises the actual agricultural task to be accomplished by the ag-robot. The APM consists of a prescription map module that provides information about the crop inputs (e.g., fertilizer, nutrients, chemicals, and seed) and the location of their intended application. Map based control commands (ON/OFF and RATE) are generated based on the current GPS location and are sent to the FSML. If, for example, the ag-robot is assumed to be a robotic sprayer, control commands are generated to switch the nozzles to ON or OFF position based on the sprayer's location.

Low level processes that do not require considerable computation reside in the reactive behavior of the BL. Obstacle Detection and Avoidance, Refill/Service, Machine Stability and Transfer module are the parallel reactive behaviors of the ag-robot. These parallel reactive behaviors process information obtained from the sensor stack and generate desired control commands for the actuators. The Obstacle Detection and Avoidance Module (ODAM) is given the highest priority as it ensures the safety of the ag-robot. The ODAM specifically processes and filters data obtained from the vision (and other) sensors to determine the presence of obstacles in the path of the ag-robot. In the presence of obstacles, the ODAM generates desired reactive steering angle (SAr) to avoid the obstacle. In FIG. 2, when the ag-robot senses an obstacle in its path, it switches from deliberative to reactive mode and ODAM becomes the source of steering control command SAr for avoiding the obstacle. Thus, By-Pass of Control takes place in unpredictable situations where the SAd is ignored and SAr is sent to the actuators. The Refill/Service Module (RSM) analyzes the data obtained from the refill sensors to estimate the levels of fuel and crop input material available on the ag-robot. When the levels are found to be lower than desired, a flag is raised. The Refill/Service flag (ReF) raised indicates that the ag-robot should stop working soon and return to a refill station. The ReF triggers the PPM of deliberative behavior to generate SAd for reaching the refill station.

The Machine Stability Module (MSM) analyzes the data obtained from the IMU to diagnose the acceleration, posture and gravitational forces of the ag-robot. If the data obtained are under the preset threshold magnitudes, the ag-robot is assumed to be working under normal conditions. In the event data obtained from the IMU exceeds threshold magnitudes, control commands are generated to take corrective actions. The data corresponding to the ag-robot turning rate (obtained from the IMU) will be used to raise a Turning Flag (TuF). Therefore, when the ag-robot is turning, the TuF will be raised to begin generating the control commands required to slow the forward speed of the ag-robot. The Transfer Module (TM) is a reactive behavior that raises a Transfer Flag (TrF) when external entities (e.g., other ag-robots or the remote base station) require the ag-robot to perform a desired action. For example, when the ag-robot is required to reach a specific location commanded by the base station, the TrF is raised to enable the ag-robot to accept external commands from to accomplish the task.

Thus, the behavior layer receives data from the sensor stack and the WCM, and processes the information obtained to create signals and flags that are fed to the FSML (see FIG. 1). Based on these inputs, the FSML creates control commands that are sent to the CML. The modules/behaviors mentioned in the reactive behavior mode are essential to add safety and robustness to the control of the ag-robot. It is contemplated that additional reactive modules can be added to the reactive behavior in the BL depending on specific agricultural application requirements.

The FSML consists of multiple finite state machines (FSMs) where each FSM is unique to one actuator controller of the control module layer. The FSML is a software layer that takes inputs from the BL and outputs desired control commands to the CML for achieving desired operation of the ag-robot. As an example, four FSMs (I to IV) are present in the FSML (see FIG. 1) that operate simultaneously in parallel for generation of control commands to the Speed/Direction, Steering, Hitch and Field Activity controllers.

Figure 3:
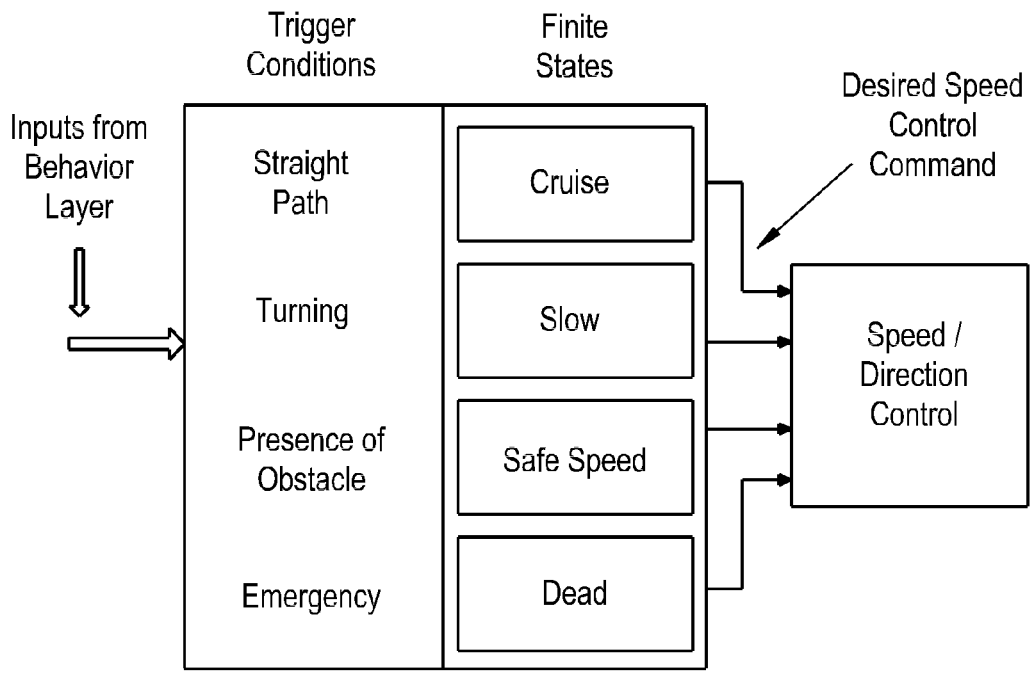
FIG. 3 is a schematical illustration of an embodiment of internal finite states of FSM I of FIG. 1.

Now, additionally referring to FIG. 3, FSM I sends desired control commands to the speed/direction controller of the ag-robot. It has four mutually exclusive states: Cruise, Slow, Safe Speed and Dead, where only one state is active at a time. Cruise is the default state of the ag-robot during which it operates at a user defined speed (Vc). For example, if the ag-robot is performing a row crop operation where it is following a straight row free of obstacles at a constant speed, the ag-robot is said to be in the Cruise state. Once the ag-robot reaches the end of the row and begins to turn to make a subsequent pass, the transition from Cruise to Slow takes place. The Slow state is triggered when the TuF is raised. In the Slow state, the robot is operated at a reduced speed (Vs) to avoid slipping and ensure safe turning. After beginning the subsequent pass, the state is switched back to Cruise. In the event of encountering an obstacle, the Safe Speed state is triggered and the ag-robot slows to safe speed Vss (where Vss is <Vs) to avoid the obstacle. The ag-robot remains in the Safe Speed state until after passing the obstacle. Finally, the Dead state is triggered when an external command or emergency situation is encountered. During this state a control command is issued to the speed/direction controller to completely stop the ag-robot (Vd=0). Thus, FSM I, based on the inputs and flags obtained from the BL, triggers its internal states to generate reference desired speeds (Vc, Vs, Vss and Vd) for the Speed/Direction actuator.

Figure 4:
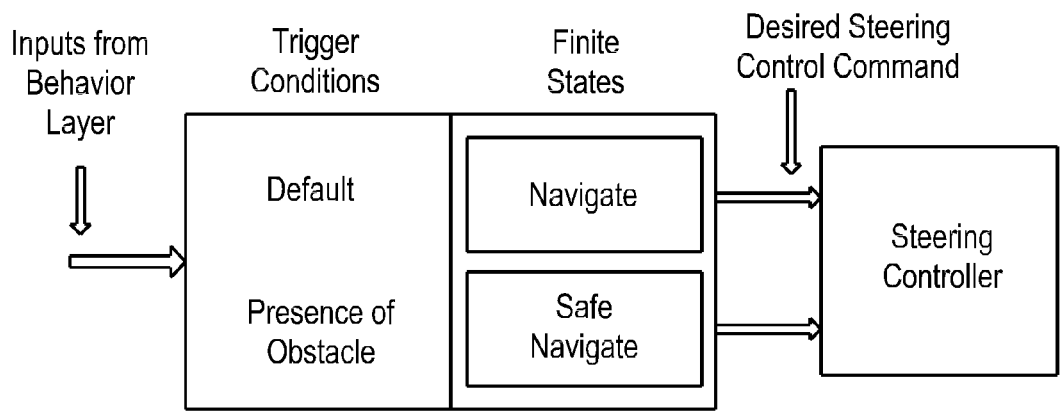
FIG. 4 is a schematical illustration of an embodiment of internal finite states of FSM II of FIG. 1.

Now, additionally referring to FIG. 4, FSM II sends desired steering commands to the ag-robot. Two mutually exclusive finite states: Navigate and Safe Navigate are present in FSM II. Navigate is the default state of FSM II that sends SAd obtained from the deliberative behavior module to the steering controller in the CML. When an obstacle is encountered, the Safe Navigate state is triggered and SAr, obtained from the reactive behavior module, is sent to the steering controller. As long as there is an obstacle in proximity (within sensor range), the ag-robot will remain in the reactive mode. The Safe Navigate state will remain active and continue sending SAr to the steering controller until the ag-robot passes the obstacle.

Figure 5:
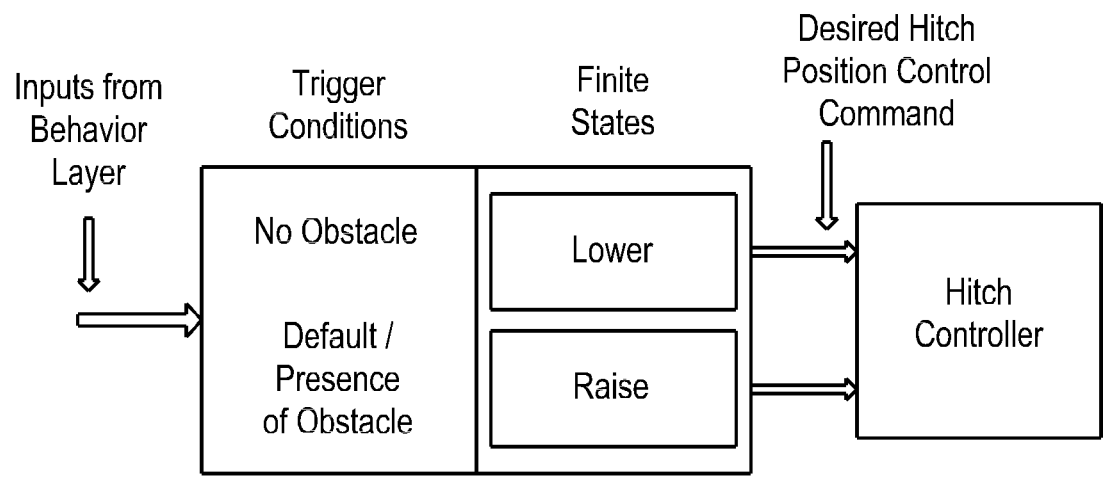
FIG. 5 is a schematical illustration of an embodiment of internal finite states of FSM III of FIG. 1.

Now, additionally referring to FIG. 5, FSM III provides desired hitch position commands to the hitch controller of the CL. FSM III has two finite states; Lower and Raise. Raise is triggered when an obstacle is encountered and also is the default hitch state. FSM III sends a command to the hitch controller to raise the implement when the ag-robot detects an obstacle. After passing by the obstacle the finite state Lower is triggered and FSM III sends a command to lower the implement and resume normal field operations.

Figure 6:
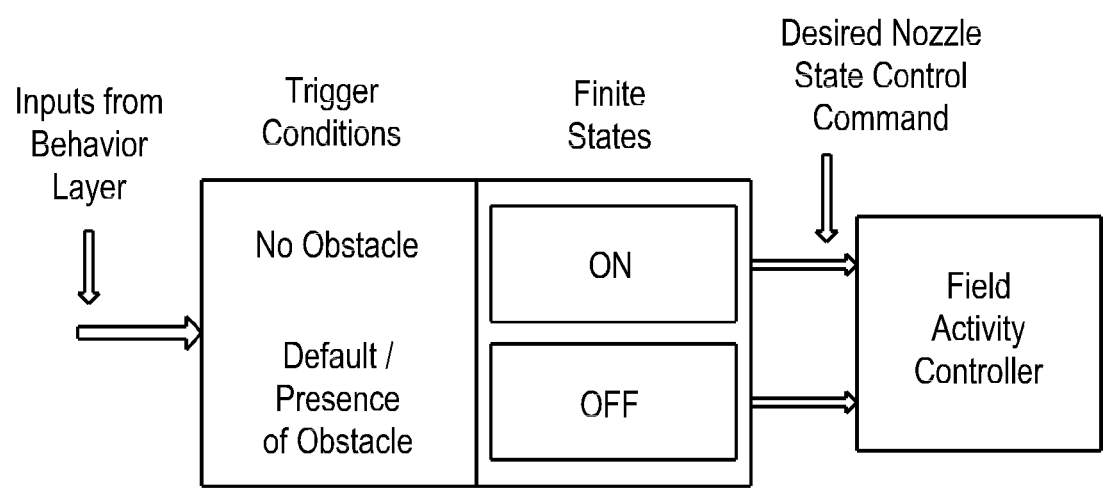
FIG. 6 is a schematical illustration of an embodiment of internal finite states of FSM IV of FIG. 1.

Now, additionally referring to FIG. 6, FSM IV illustrates two finite states (ON/OFF) and sends desired control commands to the field activity controller. For example, in the case of a chemical application, the spray nozzles may be actuated by the field activity controller. In the absence of an obstacle, finite state ON is triggered and the control command to switch the nozzle to the ON position is sent to the field activity controller. The default finite state OFF is then triggered when an obstacle is encountered and the desired control command to switch the nozzle state to OFF position is sent to the field activity controller.

In summary, the FSML consists of multiple FSM's that operate in parallel, and receive input from the BL to generate the desired actuator control commands. One state from each FSM is always active to provide control commands for the desired operation of the ag-robot.

The CML can be a hardware layer consisting, in this embodiment, of the four controllers for machine actuators. Typical actions of an ag-robot; speed, steering, raising and lowering of the hitch and nozzle flow, are performed by individual controllers in the IRCA. These controllers utilize feedback to regulate motor speed, steering position, hitch location and chemical application rate. These controllers receive commands from the FSML and passing these along to the AL to affect machine control.

Figure 7:
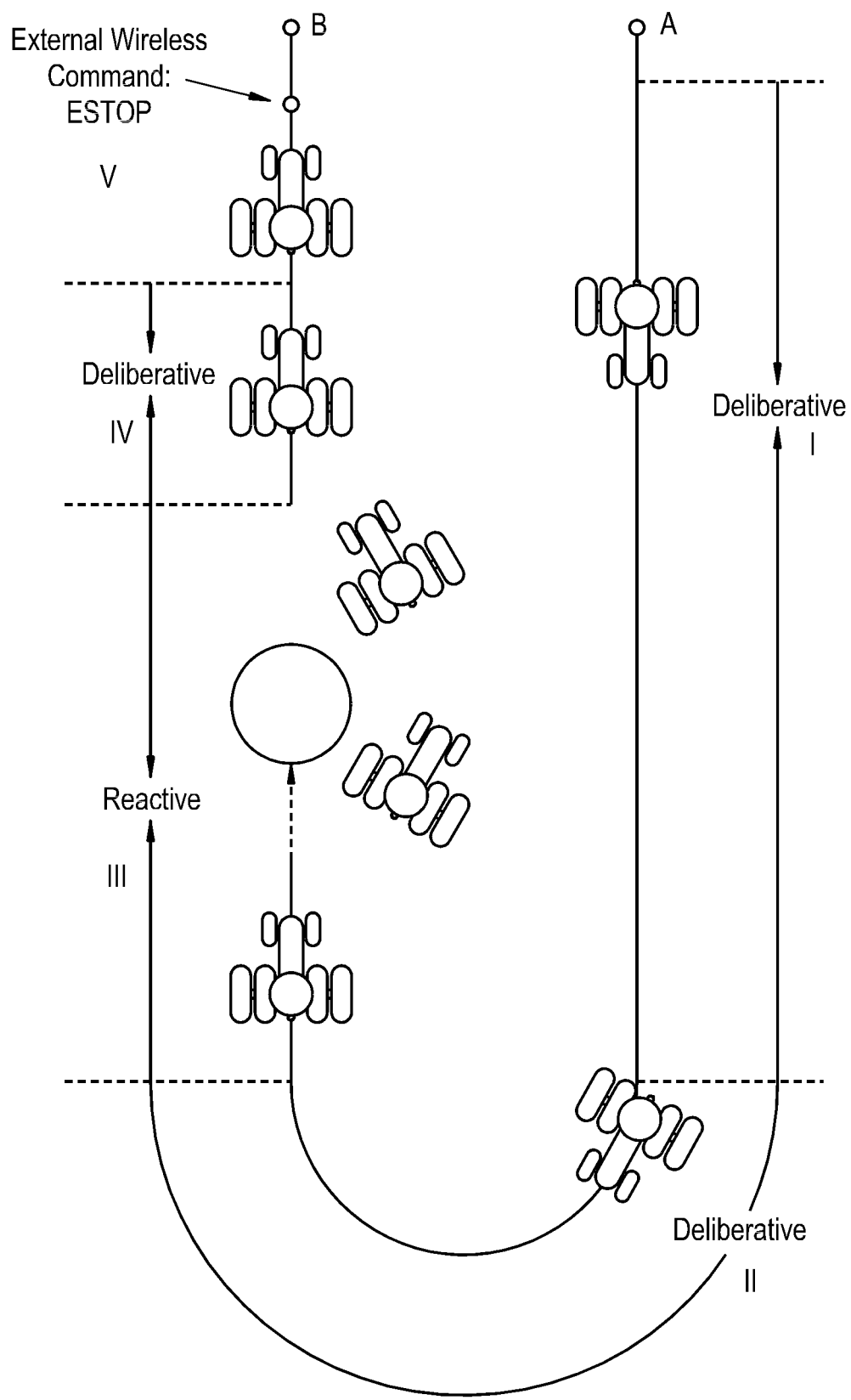
FIG. 7 is a schematical illustration of five scenarios of an ag-robot for FSM simulation using the IRCA of FIG. 1.
Figure 8:
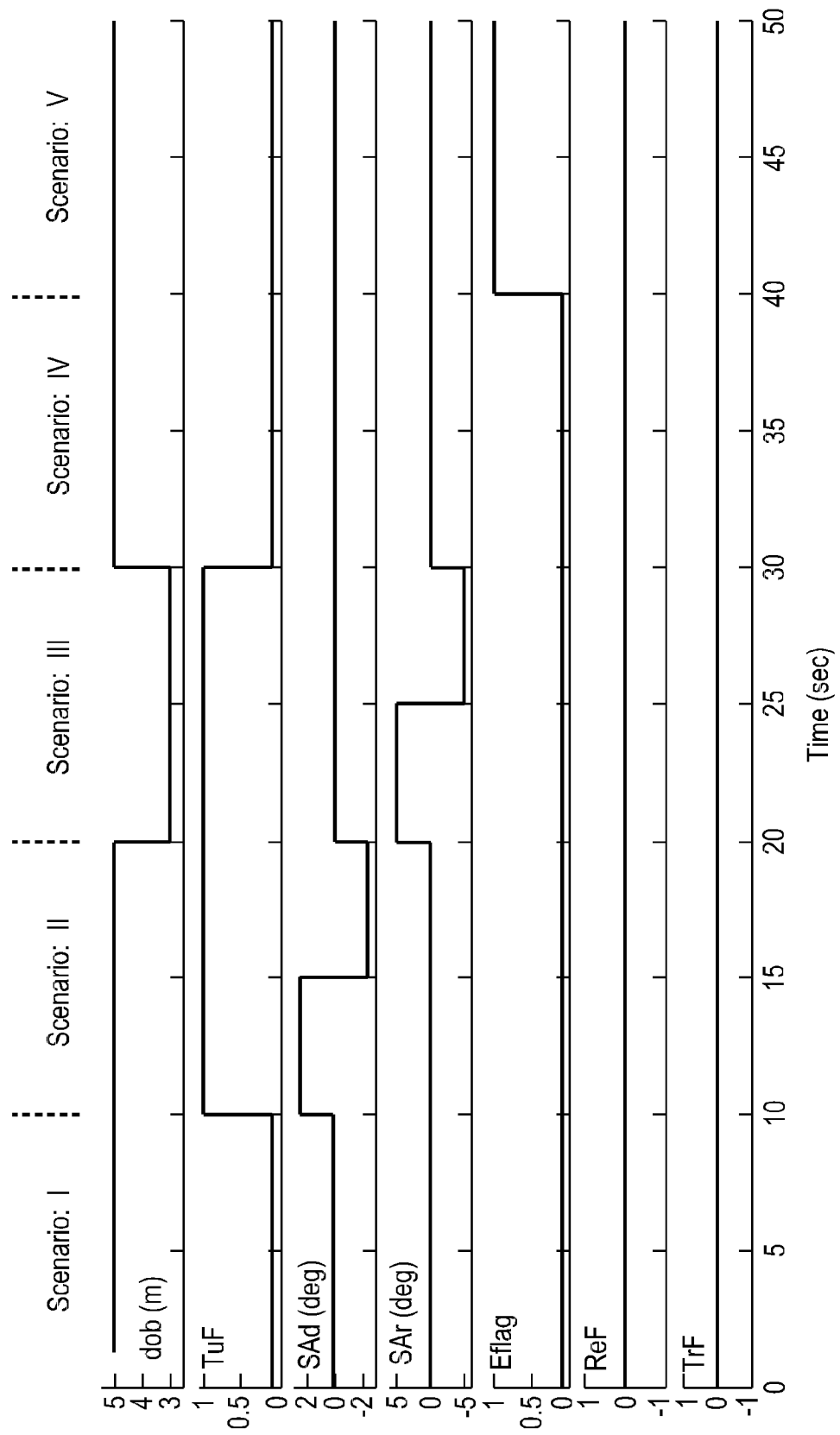
FIG. 8 is an illustration of Input signals created using Signal Builder corresponding to the five scenarios illustrated in FIG. 7.

Now, additionally referring to FIGS. 7 and 8, there is illustrated the switching of internal states of the FSML. SIMULINK and the State Flow Chart tools of MATLAB were used. Five scenarios (I-V of FIG. 7) were created to simulate typical row crop production and the FSML of the IRCA. These scenarios were used to create inputs to switch the internal states of the FSMs (I to IV) present in the FSML. Input comes from the deliberative and the reactive behaviors of the IRCA. Inputs (shown in FIG. 8) for the FSML simulation were created using the SIMULINK's signal builder tool. The input signals fed to the FSML include distance to obstacle (dob), TuF, SAd, SAr, emergency flag (Eflag), ReF and TrF. From FIG. 7, Scenario I, the robot starts from point A and follows a straight path in deliberative mode. Under Scenario II the robot begins to maneuver for the turn and at the end of the turn (Scenario III) the robot encounters an obstacle. By virtue of the By-Pass of Control action the ag-robot switches to reactive mode and avoids the obstacle completing Scenario III. The robot switches back to the deliberative mode (Scenario IV) and continues towards the goal point. For Scenario V the ag-robot receives a wireless command from an external source to stop before reaching goal point B. The magnitudes of the input signals for the five scenarios are summarized in table 1. From FIG. 8, each scenario is assumed to last for 10 s for a total simulation time of 50 s.

| Inputs | Scenario I | Scenario II | Scenario III | Scenario IV | Scenario V |
|---|---|---|---|---|---|
| dob (m) | 5 | 5 | 3 | 5 | 5 |
| TuF | 0 | 1 | 1 | 0 | 0 |
| $SA_d$ (deg) | ±0.125 | ±2.5 | — | ±0.125 | ±0.125 |
| $SA_r$ (deg) | — | — | ±5 | — | — |
| Eflag | 0 | 0 | 0 | 0 | 1 |
| ReF | 0 | 0 | 0 | 0 | 0 |
| TrF | 0 | 0 | 0 | 0 | 0 |

Table 1. Summary of Inputs Used for FSM Simulation.

Figure 9:
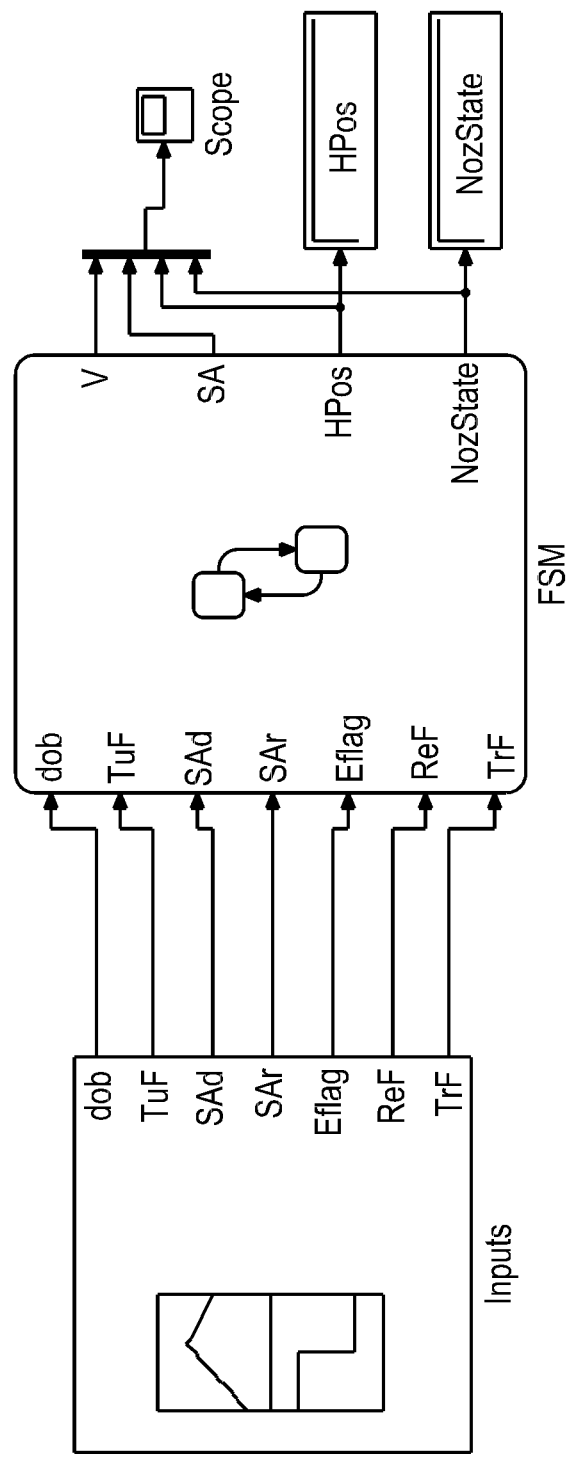
FIG. 9 is a schematical illustration of an SIMULINK model created for the FSML simulation illustrated in FIGS. 7 and 8.

A dob greater than or equal to 4 m represents safe operation while a dob less than 4 m indicates the presence of a fixed or approaching obstacle. A steering angle (SAd or SAr) value of 0+/−0.125° will be assumed to correspond to the straight path of the ag-robot and any steering angle value greater than |0.125°| will imply that the ag-robot is turning. These five scenarios do not use either the ReF or TrF flags, and hence remain set at a value of zero throughout the simulation. The SIMULINK model created to simulate the FSML is depicted in FIG. 9.

Figure 10:
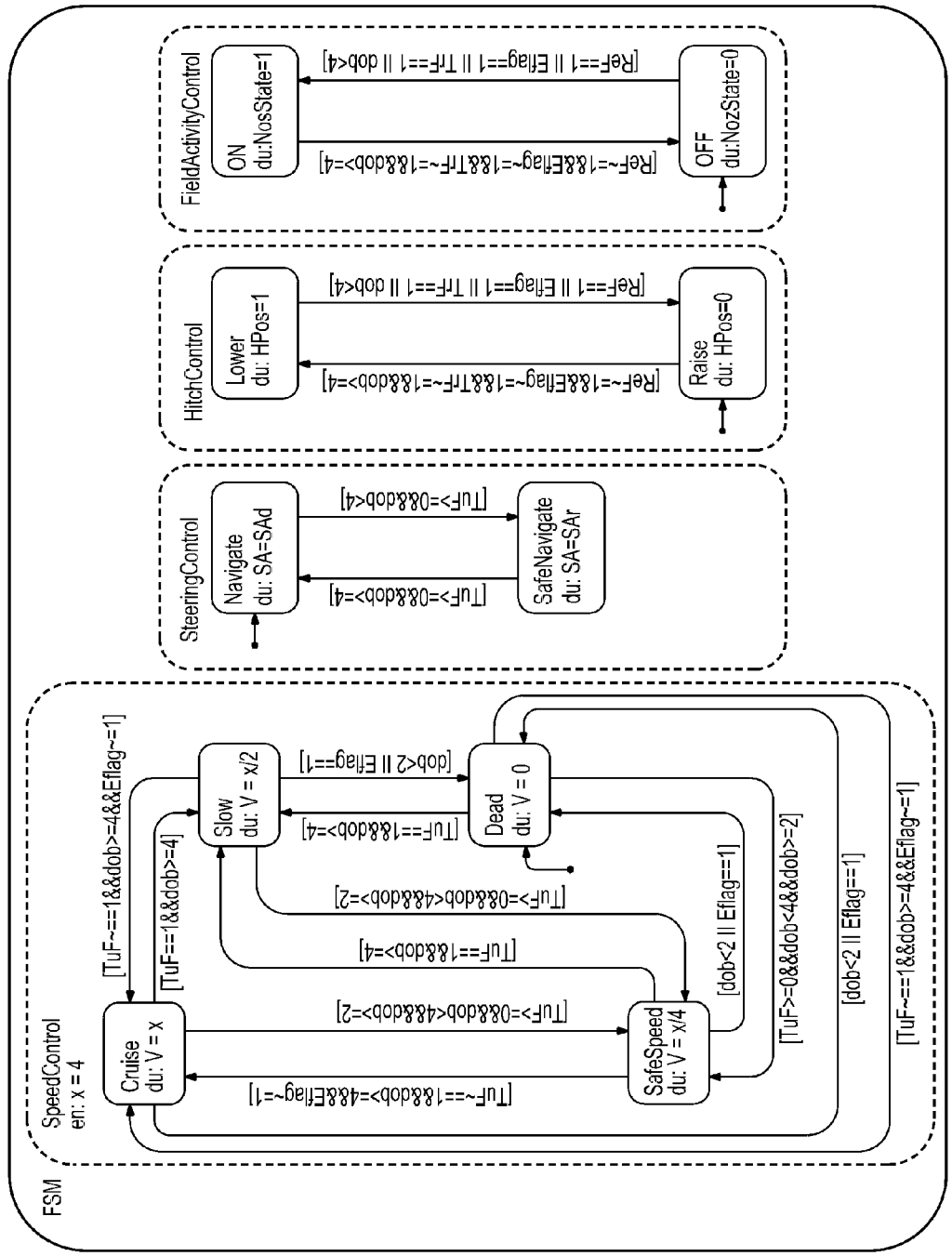
FIG. 10 is a state diagram illustrating a Finite State Machine Layer (FSML), of FIG. 1, created using the State Flow Chart tool showing the mutually exclusive internal finite states and the transitions that trigger these states.

The FSML generates desired speed (V), steering angle (SA), hitch position (HPos) and nozzle rate (NozState) commands that are sent to the control layer as reference inputs. The four FSMs within the FSML; Speed Control (FSM I), Steering Control (FSM II), Hitch Control (FSM III) and Field Activity Control (FSM IV); are active at all times. The internal states of each FSM are triggered based on the inputs generated by the BL. The mutually exclusive internal finite states and the transitions that trigger these states are depicted in FIG. 10. The trigger conditions causing the transitions to take place between the internal states of each FSM are summarized in Table 2.

TABLE 2

Trigger conditions for internal finite state transitions.

| | Internal States | Trigger conditions |
|---|---|---|
| FSM I | Cruise | TuF~=1 && dob>=4 && Eflag ~=1 |
| | Slow | TuF==1 && dob>=4 |
| | Safe Speed | TuF>=0 && dob<4 && dob>=2 |
| | Dead | dob<2 \|\| Eflag==1 |
| FSM II | Navigate | TuF>=0 && dob>=4 |
| | Safe Navigate | TuF>=0 && dob<4 |

TABLE 2-continued

Trigger conditions for internal finite state transitions.

| | Internal States | Trigger conditions |
|---|---|---|
| FSM III | Lower (1) | ReF~=1 && Eflag~=1&&TrF~=1&& dob>=4 |
| | Raise (0) | ReF==1 \|\| Eflag==1\|\| TrF==1\|\| dob<4 |
| FSM IV | ON (1) | ReF~=1&&Eflag~=1&&TrF~=1&&dob>=4 |
| | OFF (0) | ReF==1\|\|Eflag==1\|\|TrF==1\|\|dob<4 |

Based on the trigger conditions, finite states are activated and desired control commands are generated and sent to the CML.

Figure 11:
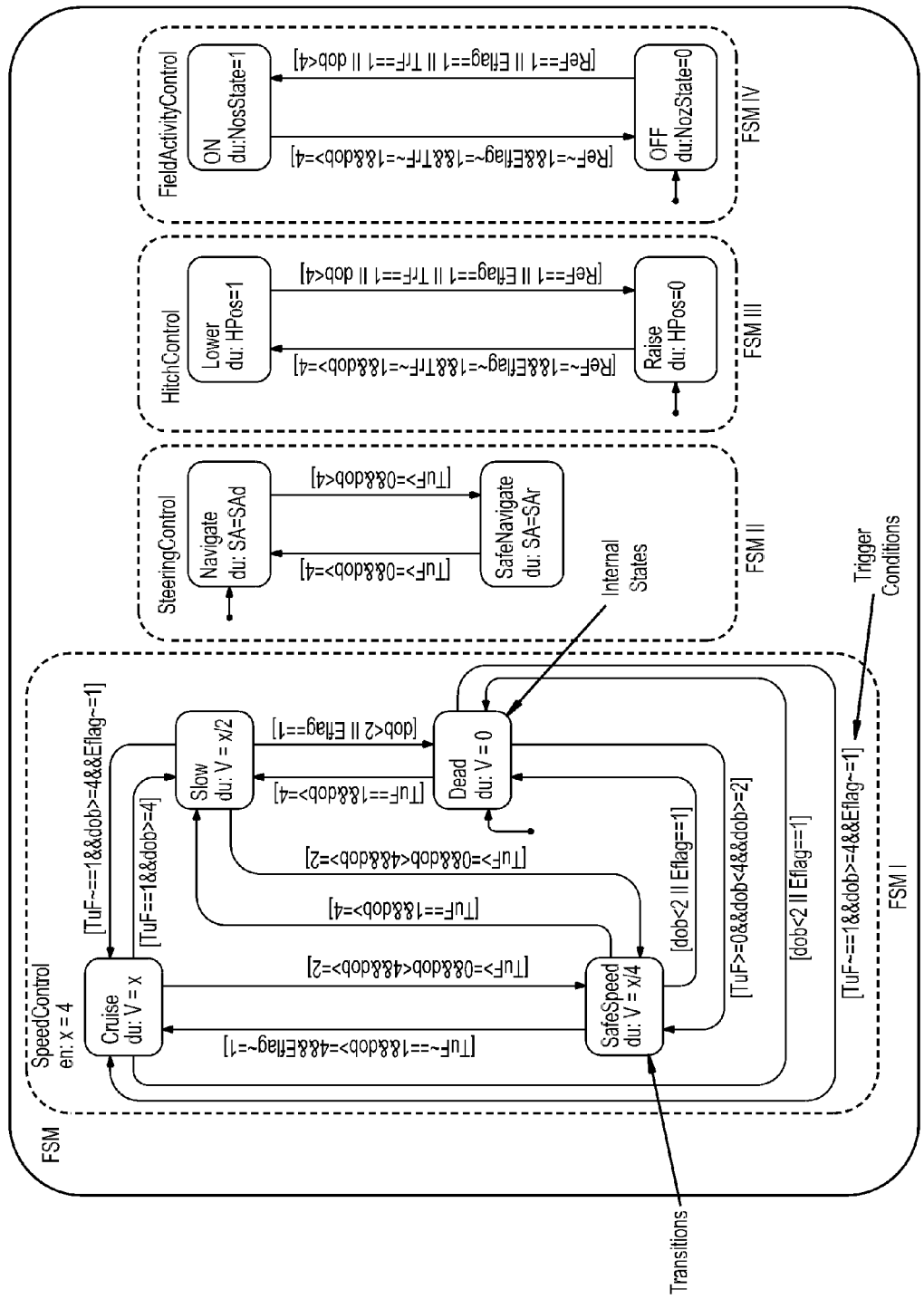
FIG. 11 is a state diagram illustrating the active states of the FSML (I to IV) in the default state.
Figure 12:
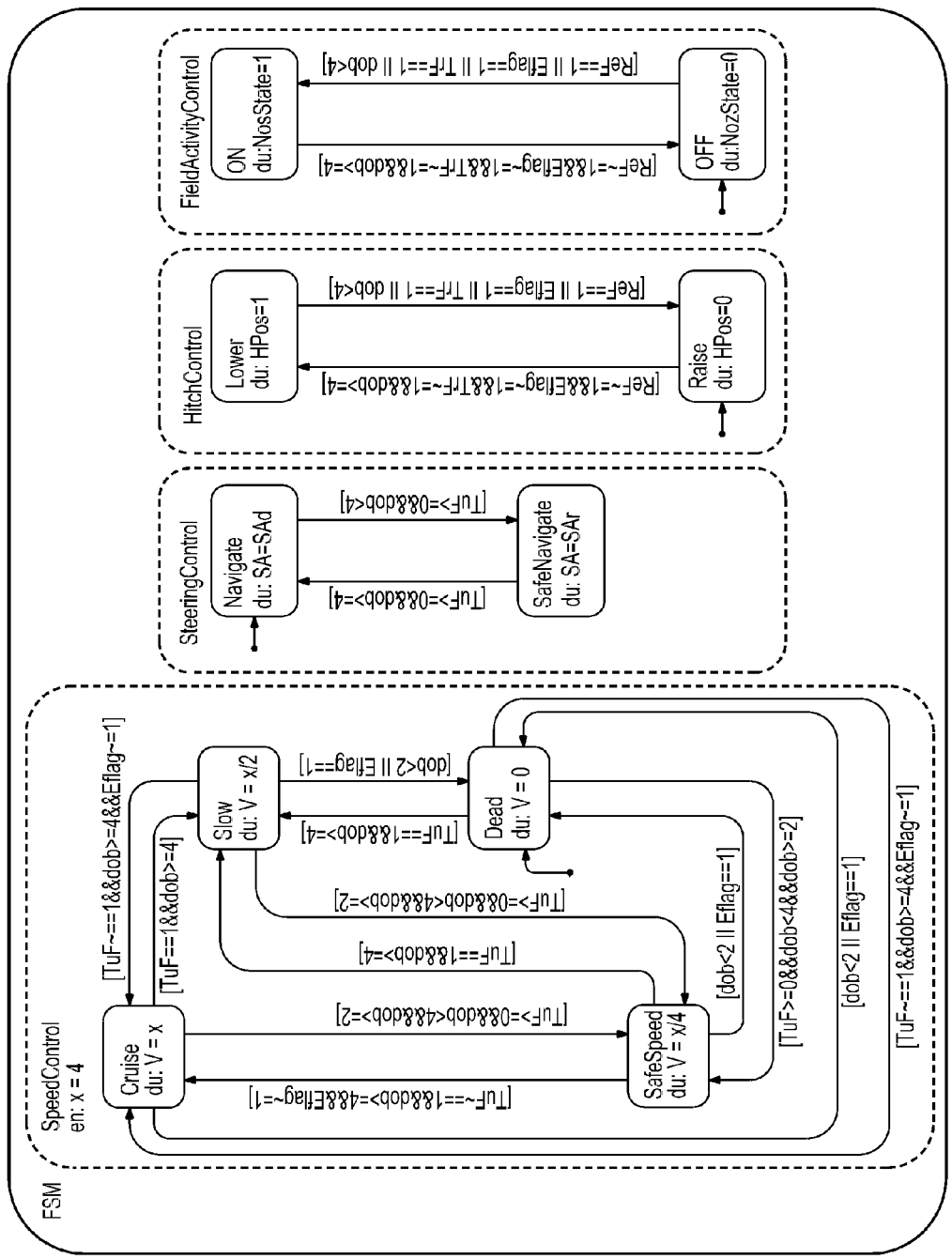
FIG. 12 illustrates the active states of FSML (I to IV) in Scenario I.

During operation, the FSML becomes active indicated by the red solid line that triggers the parallel FSMs (I to IV) represented by the blue dashed lines in FIG. 11. Each parallel FSM in turn makes one internal state active. The mutually exclusive internal states are represented by blue solid lines and at any instant in time, one internal state for all FSMs is active. The internal states Dead, Navigate, Raise and OFF from each FSM are active at the beginning of the simulation (see FIG. 11). These are the default internal states of the FSMs and transitions to other states occur when trigger conditions (as summarized in table 2) are satisfied.

Now additionally referring to FIGS. 12-15, in Scenario I, when the ag-robot is performing a row crop operation in a straight line with no obstacles in its vicinity, the internal states of each FSM (I to IV) transition from default states to Cruise, Navigate, Lower and ON (FIG. 12) generating the desired commands for the CML.

Figure 13:
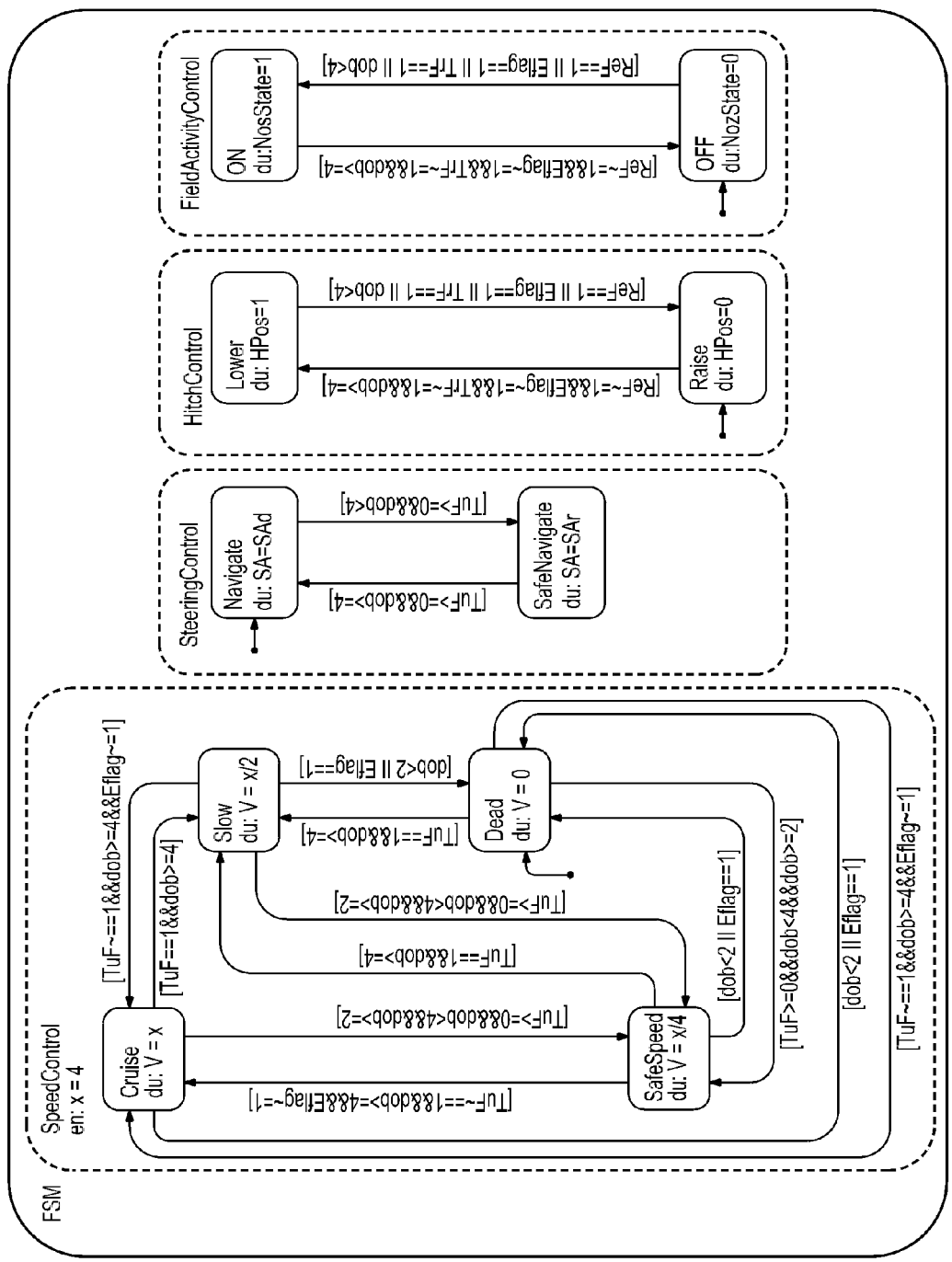
FIG. 13 illustrates the active states of FSML (I to IV) in Scenario III.

Similarly, in Scenario III, in the presence of an obstacle, the internal states transition to Safe Speed, Safe Navigate, Raise and OFF (FIG. 13).

Figure 14:
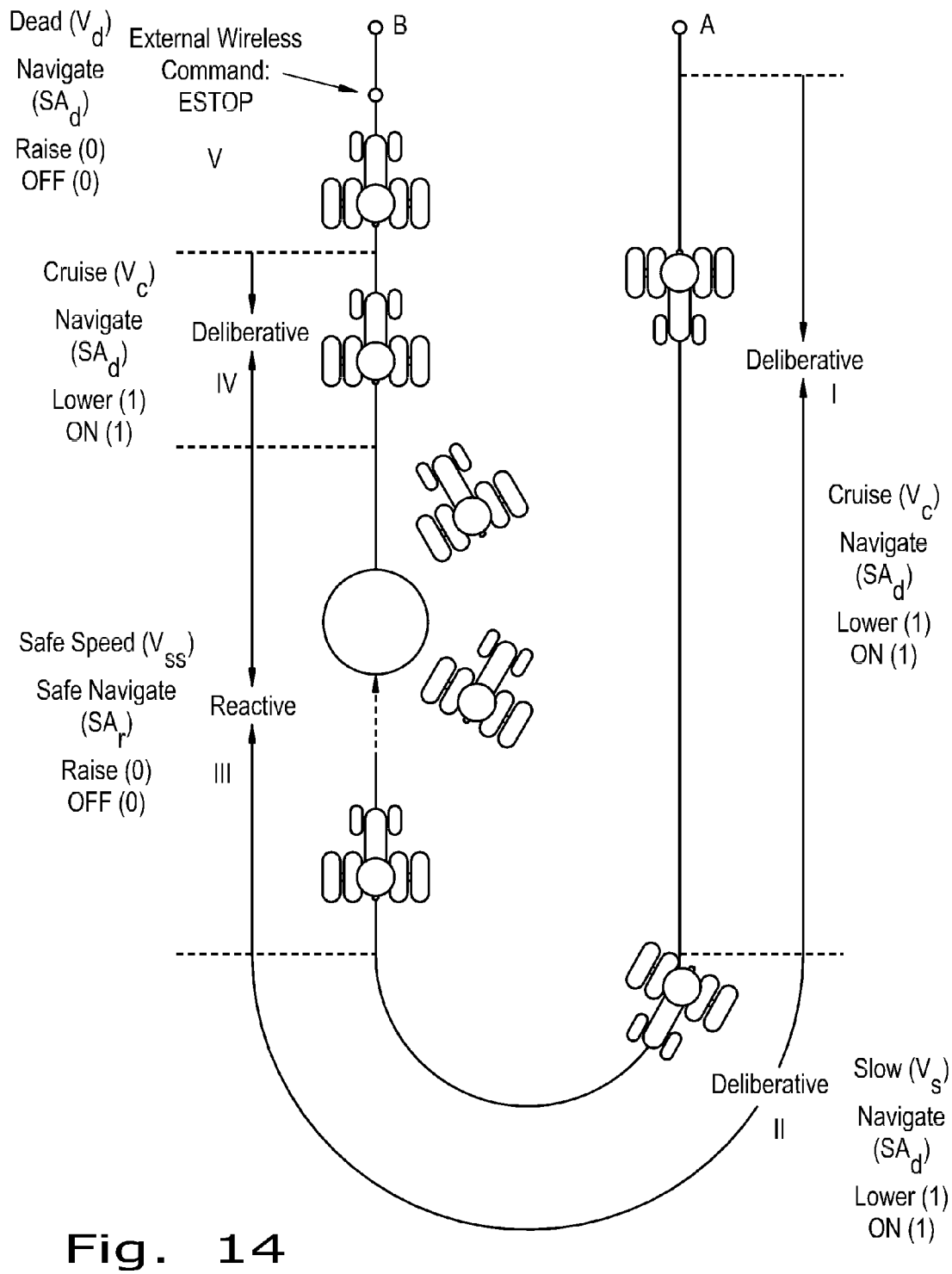
FIG. 14 illustrates the active finite states and desired control commands for the five scenarios.

These active states provide desired commands to the controllers of the Ag-Robot to slow down and avoid the obstacle. The active internal states of the FSML for each scenario are shown in FIG. 14. These active states generate desired control commands in response to the changing environment. The outputs of the simulation are depicted in FIG. 15 and summarized in Table 3.

Figure 15:
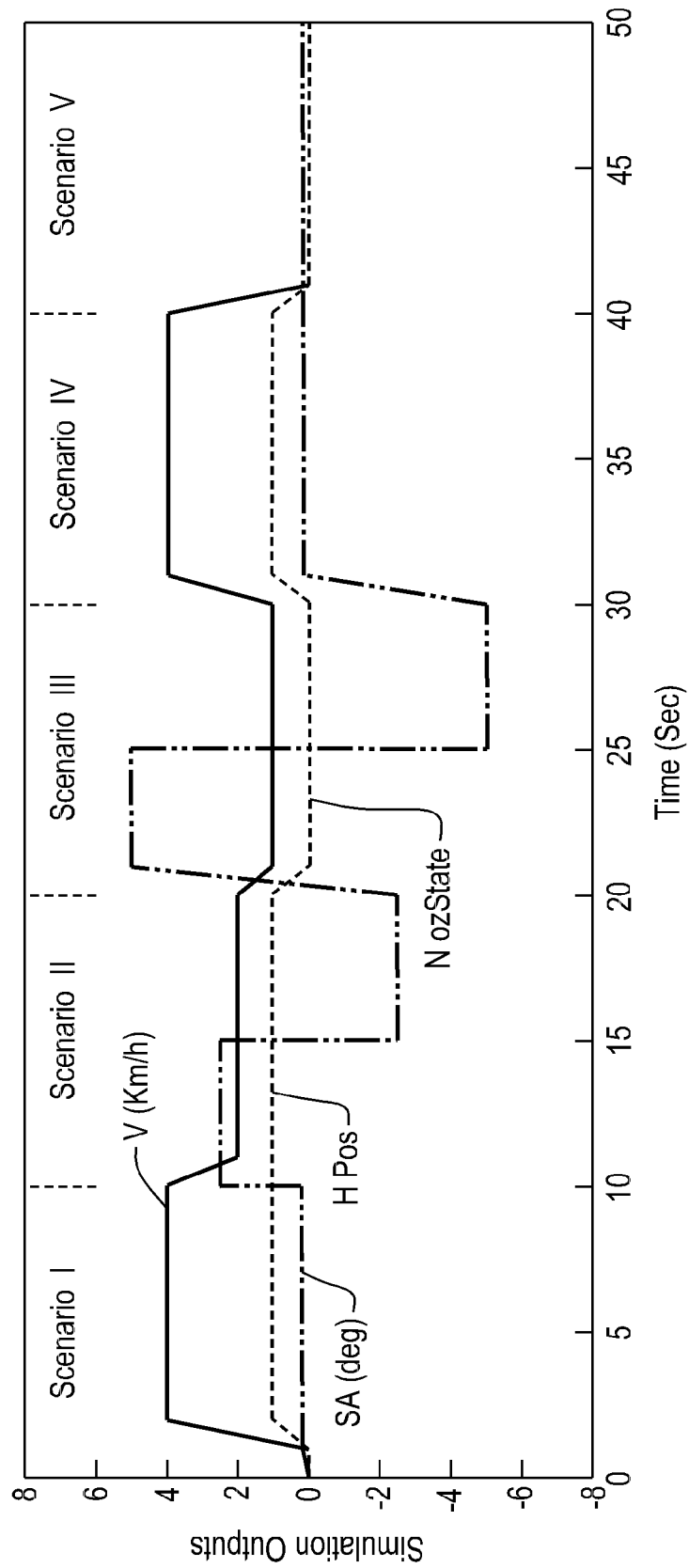
FIG. 15 illustrates FSM outputs during the five scenarios of FIG. 14.

In the first 10 s of the ag-robot's travel, a speed command (V=Vc=4 km/h) is generated as the Cruise state becomes active (FIG. 15). Simultaneously, the state Navigate becomes active and generates a steering command (SA=SAd=0.125°) for straight line navigation. The desired hitch position (Hpos=1) and nozzle rate (Nozstate=1) are generated as the states Lower and ON becomes active in Scenario I. In Scenario II, the ag-robot encounters a turn and the speed command (V=Vs=2 km/h) is generated as the state Slow is activated and a steering command (SA=SAd=±2.5°) is generated as the navigate state is active to maneuver the turn.

The hitch position and nozzle state remain equal to one as the ag-robot continues to spray while turning. In Scenario III the ag-robot encounters an obstacle and hence Safe Speed, Safe Navigate, Raise and OFF states are activated producing speed (V=Vss=1 km/h), steering angle (SA=SAr±0.5°), hitch position, and nozzle flow commands. For Scenario IV the ag-robot returns to straight line navigation and switches to the similar states from Scenario I. For Scenario V, the ag-robot receives an external emergency command and the states Dead, Navigate, Raise, OFF are activated to produce speed (V=Vd=0 km/h), steering (SA=SAd=0.125°, hitch position, and nozzle flow commands.

Thus, based on sensor output, the FSML switches internal finite states to produce desired reference control commands (table 3) for the actuator control of the ag-robot.

TABLE 3

Summary of the outputs obtained from FSM simulation.

| Scenarios | Simulation time band (sec) | Active Internal States (FSM I to IV) | Desired Control Commands |
|---|---|---|---|
| Scenario I | 0-10 | Cruise, Navigate, Lower, ON | 4 km/h, 0.125°, 1, 1 |
| Scenario II | 10-20 | Slow, Navigate, Lower, ON | 2 km/h, ±2.5°, 1, 1 |
| Scenario III | 20-30 | Safe Speed, Safe Navigate, Raise, OFF | 1 km/h, ±5°, 0, 0 |
| Scenario IV | 30-40 | Cruise, Navigate, Lower, ON | 4 km/h, 0.125°, 1, 1 |
| Scenario V | 40-50 | Dead, Navigate, Raise, OFF | 0 km/h, 0.125°, 0, 0 |

In the foregoing, a control architecture has been discussed that methodically converts sensor information into useful robotic actions for robust operation of an ag-robot. The architecture includes the concept of By-Pass of Control, where reactive and deliberative behaviors process and prioritize the environment data to produce goal achieving and reactive actions using FSML, AL and CML in response to the changing environment. FSML receives input from the BL and generates desired/reference commands for the actuator controllers. Thus, the proposed architecture adds intelligence to modern agricultural field machinery transforming them into autonomous vehicles capable of performing routine field practices with virtually no human intervention.

Figure 16:
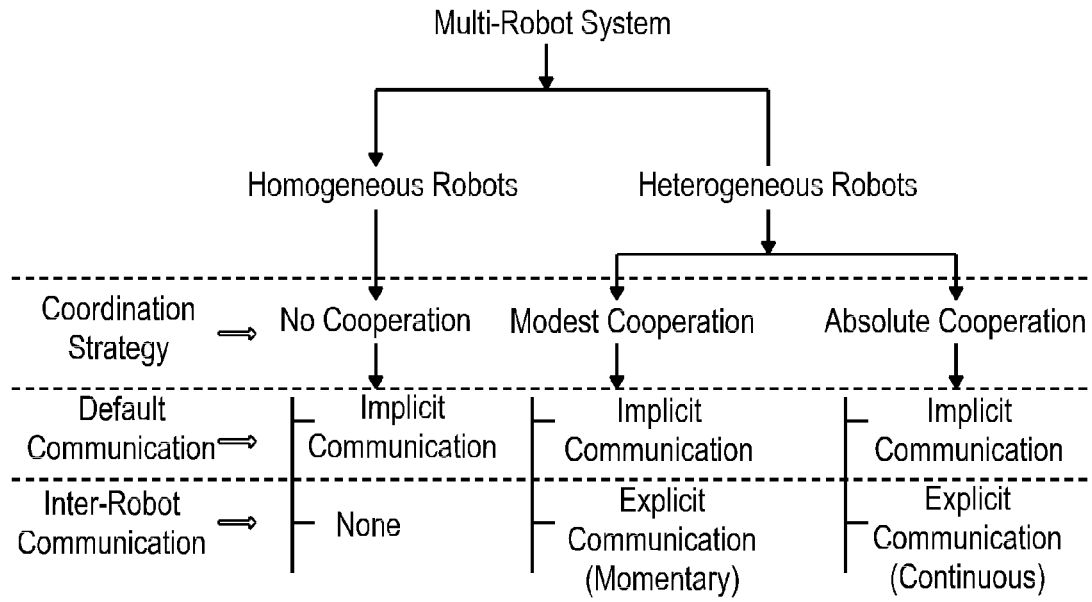
FIG. 16 illustrates a coordination strategy and inter-robot communication of a MRS of the present invention.
Figure 17:
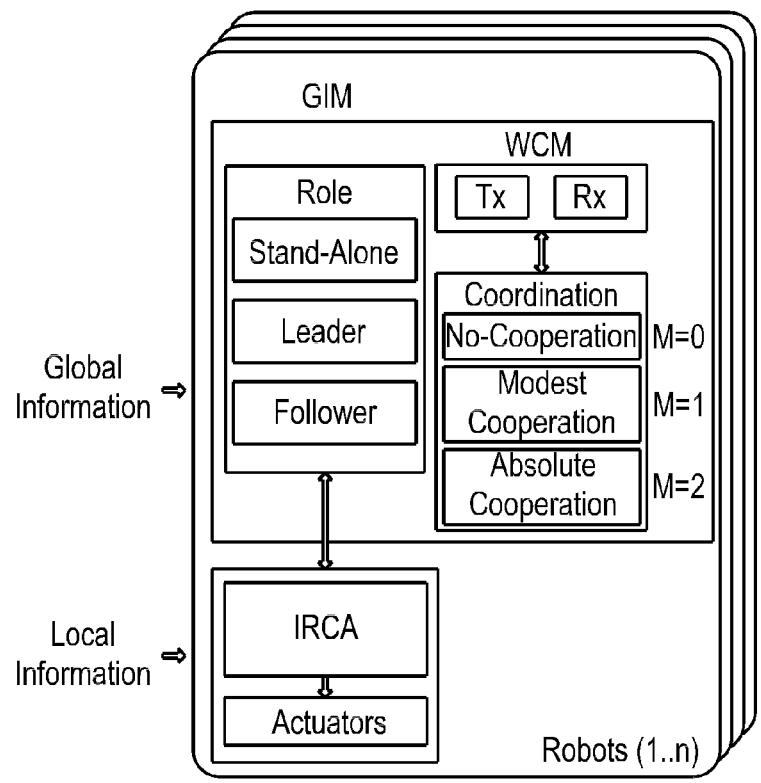
FIG. 17 illustrates a Multi Robot System Control Architecture (MRSCA) for a MRS of the present invention.

Now, additionally referring to FIGS. 16 and 17, when multiple robots are working together to accomplish a cooperative task, the foremost question to be resolved is the type of inter-robot communication required. Intuitively, the variety of coordination strategies that multiple robots could pursue affects communication requirements. Further, the coordination strategy differs for homogeneous versus heterogeneous MRS. Homogeneous MRS is a group of functionally equivalent robots that perform similar actions utilizing the same levels of sensing and control capabilities whereas, heterogeneous MRS is a group of functionally different robots that perform unique tasks to accomplish a collective assignment. Thus, the homogeneity and heterogeneity of the robots in a MRS affects the coordination strategies that determine the type of inter-robot communication required.

Although MRS compels us to think that some form of communication between robots is necessary, in reality, in some cases, no-communication between homogeneous robots is as good as when there is some form of inter-robot communication. A major requirement for a homogeneous MRS to be robust with no inter-robot communication is that the individual robots must be intelligent and should react to the local environment. The IRCA discussed above is assumed to provide this intelligence necessary for navigation and obstacle avoidance. Homogeneous robots will divide the task and work in their respective unique work areas without interfering with one and other's operations. Thus, cooperation for homogeneous MRS is not required and inter-robot communication becomes trivial.

A MRS involving heterogeneous robots requires inter-robot communication as each robot performs a different function that necessitates coordinated actions. The extent of cooperation between two heterogeneous robots will vary and can be of two types; modest cooperation, and absolute cooperation. For modest cooperation, the robots do not interfere with each other's work. However, short-term cooperation is established at the instant when robots work together. For absolute cooperation, un-interrupted cooperation between robots is required at all times. Implicit and explicit communications formulate a framework for homogeneous and heterogeneous robots. Implicit communication is the unintentional communication of the robots where, states of the robot are transmitted over the wireless channel. Intentional communication directed at a specific robot constitutes explicit communication. While some tasks require implicit communication, a combination of implicit and explicit communication may be important for specific tasks. In homogeneous MRSs, the robots utilize implicit communication to transmit their states whereas, for heterogeneous robots, explicit momentary and continuous communications must be established for moderate and absolute cooperation, respectively. A summary of the MRS classification is provided in FIG. 17. The coordination strategies and the inter-robot communication types mentioned in this classification provided the basis for the MRSCA of the present invention.

The MRSCA of the present invention can be seen in FIG. 17. The global information module (GIM) and the IRCA are the two main components of the MRSCA that enable coordinated activities of multiple robots.

The GIM, a crucial component of MRSCA, is local to each robot and the information contained in this module is accessible by all the robots in the MRS. Three additional modules; Coordination, Role and Wireless Communication contained within the GIM represent the mode of operation, the assigned role and the state of the wireless communication of each robot.

Figure 18:
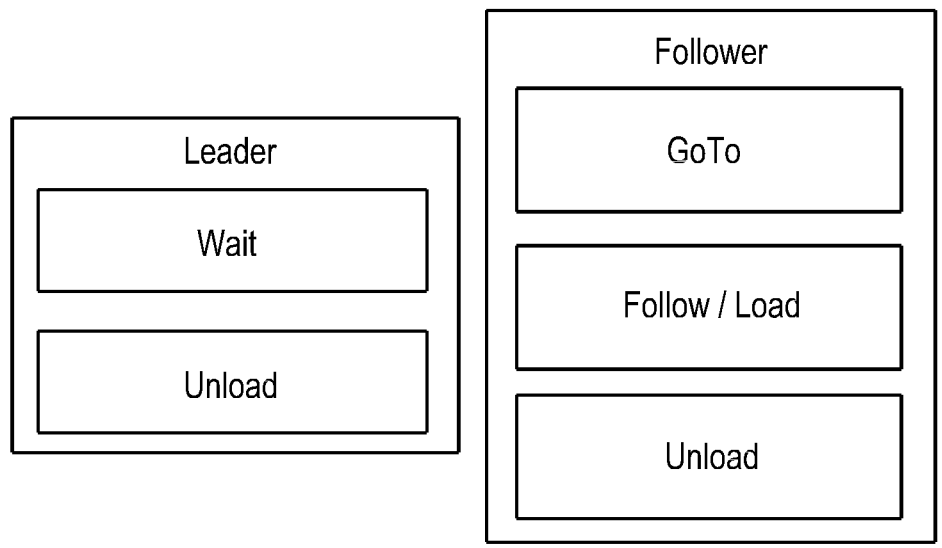
FIG. 18 illustrates the roles of the robot with internal finite states.

The coordination module (CM) determines the mode of operation of the robot. This module can be treated as a finite state machine (FSM) with three modes; No-cooperation, Modest Cooperation and Absolute Cooperation. A mode of operation becomes active when the mode variable (m) is set to one of the following values; 0, 1, 2. This active mode of operation assigns a role to the robot enabling it to perform a coordinated task. The robot can be assigned any one of the three roles; Stand Alone, Leader or Follower depending on the mode of operation. These roles present in the role module (RM) are triggered by role variable (r) that can take on values of 0, 1 or 2. In No Cooperation mode the robot will assume the Stand Alone role and operates independently whereas in Modest and Absolute Cooperation mode the robot can assume any one of the two roles; Leader or Follower. The mode of operation and the role assignment are purely based on the collective task the MRS is to accomplish. When a robot assumes the leader or Follower role various tasks must be performed. Tasks to be executed through each role can be represented by finite states as seen in FIG. 18. Thus, the Leader can be modeled as a FSM with finite states Wait and Unload.

Similarly, the follower role consists of tasks Go To, Follow/Load and Unload. In modest or absolute cooperation mode, one of the robots takes on a leader role and other robots the follower roles to finish a collective task. The wireless communication module (WCM) has two finite states, one to transmit (Tx) and the other to receive (Rx) the messages containing the states of the robots. The states Tx and Rx of WCM is triggered by the communication variable (c) that depends entirely on the mode of operation.

Figure 19:
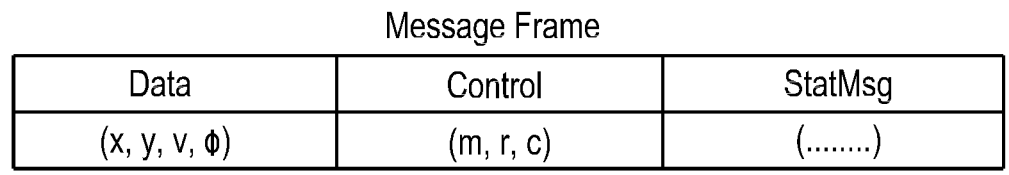
FIG. 19 illustrates the components of a generic message shared by the MRS of the present invention.

A generic message shared by the robots of the MRS is composed of three parts; data, control and status. The data component contains the location, speed and heading information whereas, the control component contains information that is used to trigger the mode of operation, role assignment and form of communication. The status component of the message contains data that represent the statuses of the internal states of the robot at any instant. The status component (StatMsg) will be discussed in detail in the following sections as the content of StatMsg varies for different levels of cooperation. Thus, a message containing the data, control and StatMsg components represent the current state of robot and is a function of global (m, r, c, StatMsg) and the local information (x, y, v, ϕ). The global information can be modified by the robots for changing the modes and roles whereas; local information, although accessible by other robots cannot be altered. A typical generic message exchanged between the robots of the MRS is summarized in FIG. 19.

A rule table (Table 4) with the values of control variables (m, r, c) for different levels of coordination is developed. Control variables m and r assume values of 0, 1 or 2 depending whereas, control variable can assume values of 0 or 1 depending on the level of cooperation. When there is no-cooperation (m=0), a stand-alone role (r=0) is assigned to each robot and the robots do not communicate (c=0) with each other. In the no-cooperation mode the robots of the MRS remain in default communication (c=0) mode (implicit communication) and transmit their states to the central monitoring station (CMS).

TABLE 4

Rule Table for Initialization of MRS.

| Coordination Strategy | Control Variables (m, r, c) |
|---|---|
| No Cooperation | (0, 0, 0) |
| Modest Cooperation | (1, 1, 0), (1, 2, 1) |
| Absolute Cooperation | (2, 1, 0), (2, 2, 1) |

For modest cooperation (m=1), the robot assumes the role of Leader (r=1) or Follower (r=2). Thus, when operated as a leader it transmits (c=0) messages to the CMS and other robots that act as Followers. Whereas, when the robot is operated as a Follower (r=2) it receives messages (c=1) from the Leader followed by transmission of its states to the CMS. In the case of absolute cooperation (m=2), similar to modest cooperation, the robot assumes the role of Leader (r=1) or Follower (r=2). The communication variable 'c' takes a value of 0 or 1 for transmitting and receiving of messages under the leader and follower roles respectively.

The MRSCA is now illustrated using three types of agricultural operations, each involving a MRS with three levels of cooperation; No-Cooperation, Modest Cooperation and Absolute Cooperation. For illustration purposes each level of cooperation will be associated with specific agricultural field operations which include; planting, baling and harvesting. Specifically, the GIM of the MRSCA, which establishes cooperation between the robots of the MRS, will be discussed.

Figure 20:
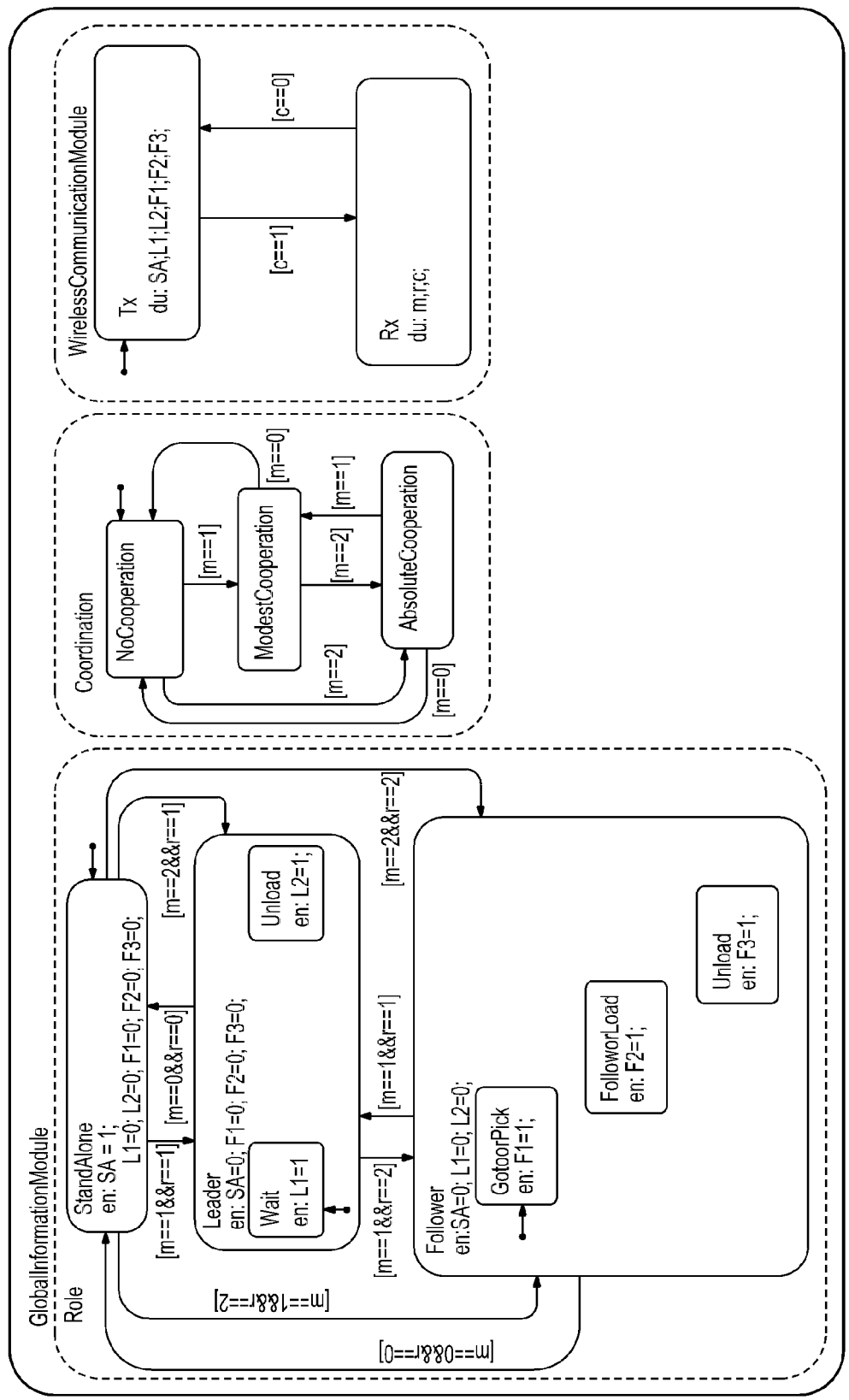
FIG. 20 illustrates a state diagram of the global information module (GIM) used in the robots of the present invention.
Figure 21:
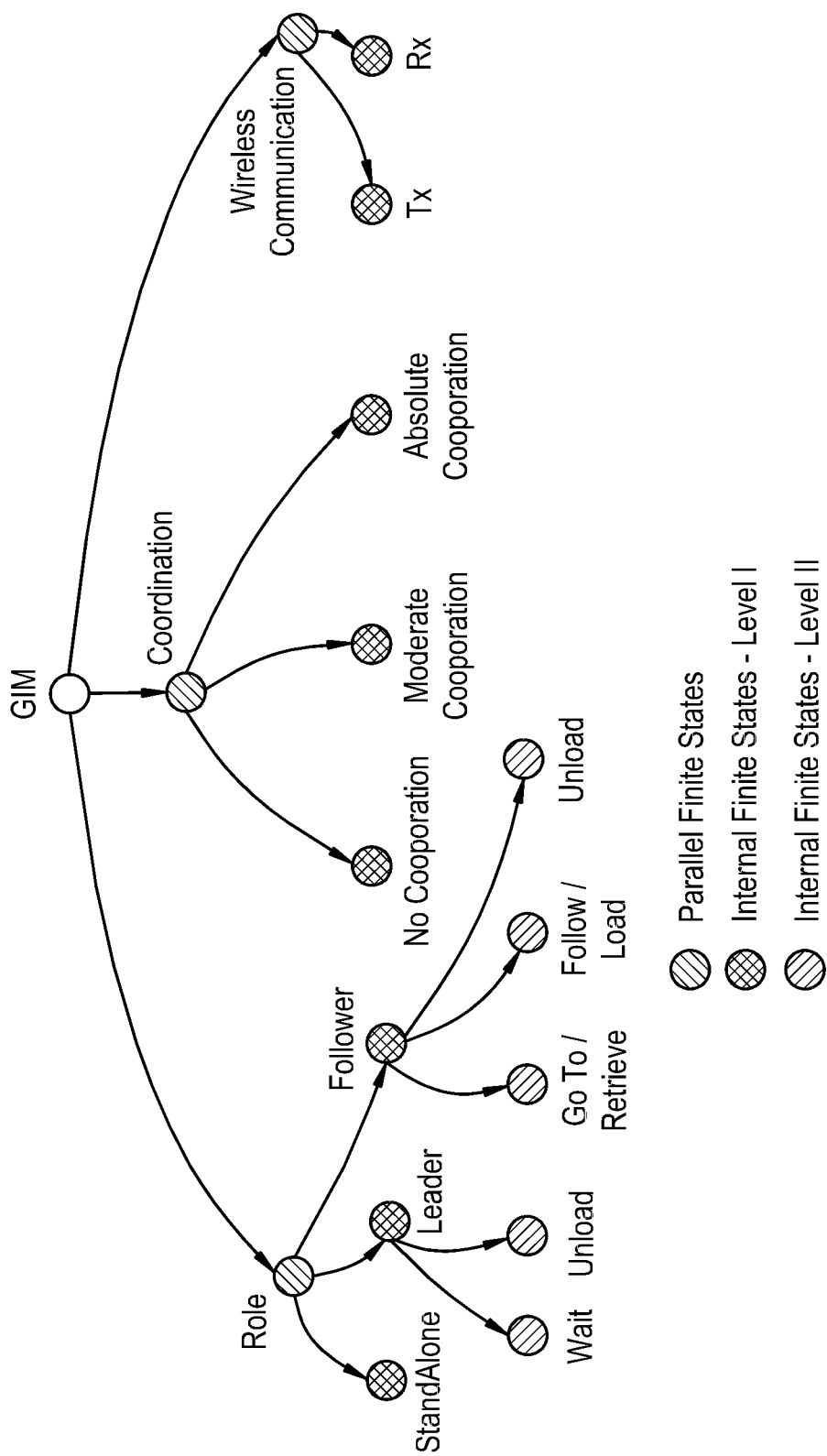
FIG. 21 illustrates an embodiment of a hierarchy of the FSMs of the GIM of the present invention.

The GIM is illustrated as being implemented by a state flow chart of FIG. 20 that has three parallel states (RM, CM and WCM). Inside each parallel state are the mutually exclusive finite states that become active when the transition conditions between the finite states are satisfied. The transitions between the internal finite states of the RM, CM and WCM take place when the trigger conditions are satisfied. These trigger conditions vary with the nature of the cooperative task. The inputs to the GIM will be sent from either IRCA (local information) of the robot or other robots (global information) of the MRS depending on the level of cooperation. For each agricultural operation (planting, baling and harvesting), the inputs, status flags and the trigger conditions for transitions between the states differ and will be mentioned separately for each simulation. Typically, the control variables (m, r, c) that determine the coordination strategy, role and the type of communication will be used as the inputs. In addition to these control variables, some flags that represent the signals of the sensors of the robots will be used as inputs. A FSM hierarchy map, to summarize the internal finite states of the GIM is created (FIG. 21). Tracking the states (Active or Not Active) of these FSMs is important to determine the behavior of the robot and eventually the behavior of the MRS.

Specifically, to predict the behavior of a robot at any instant, status flags (Table 5) corresponding to the roles (Stand Alone, Leader and Follower) and the tasks (Wait, Unload, Go To and Follow/Load) associated with these roles are created. These status flags will indicate the statuses of the current roles and active tasks of the robots. The status flags used for simulation of the GIM are defined and summarized in table 2. Additional status flags that indicate the sensor states or in some cases external inputs will be defined and used based on the requirement of the simulation.

TABLE 5

Status flags of GIM.

| Status Flag | Definition | High | Low |
|---|---|---|---|
| SA | Raised when role of the robot is Stand Alone (FIG. 20) | 1 | 0 |
| L1 | Raised when the robot is performing a leader role with the task Wait active (FIG. 20) | 1 | 0 |
| L2 | Raised when the robot is performing a leader role with the Unload task active (FIG. 20) | 1 | 0 |
| F1 | Raised when the robot is performing a follower role and the task Goto is active (FIG. 20) | 1 | 0 |
| F2 | Raised when the robot is performing a follower role and the task Follow/Load is active (FIG. 20) | 1 | 0 |
| F3 | Raised when the robot is performing a follower role and the task Unload is active (FIG. 20) | 1 | 0 |

Figure 22:
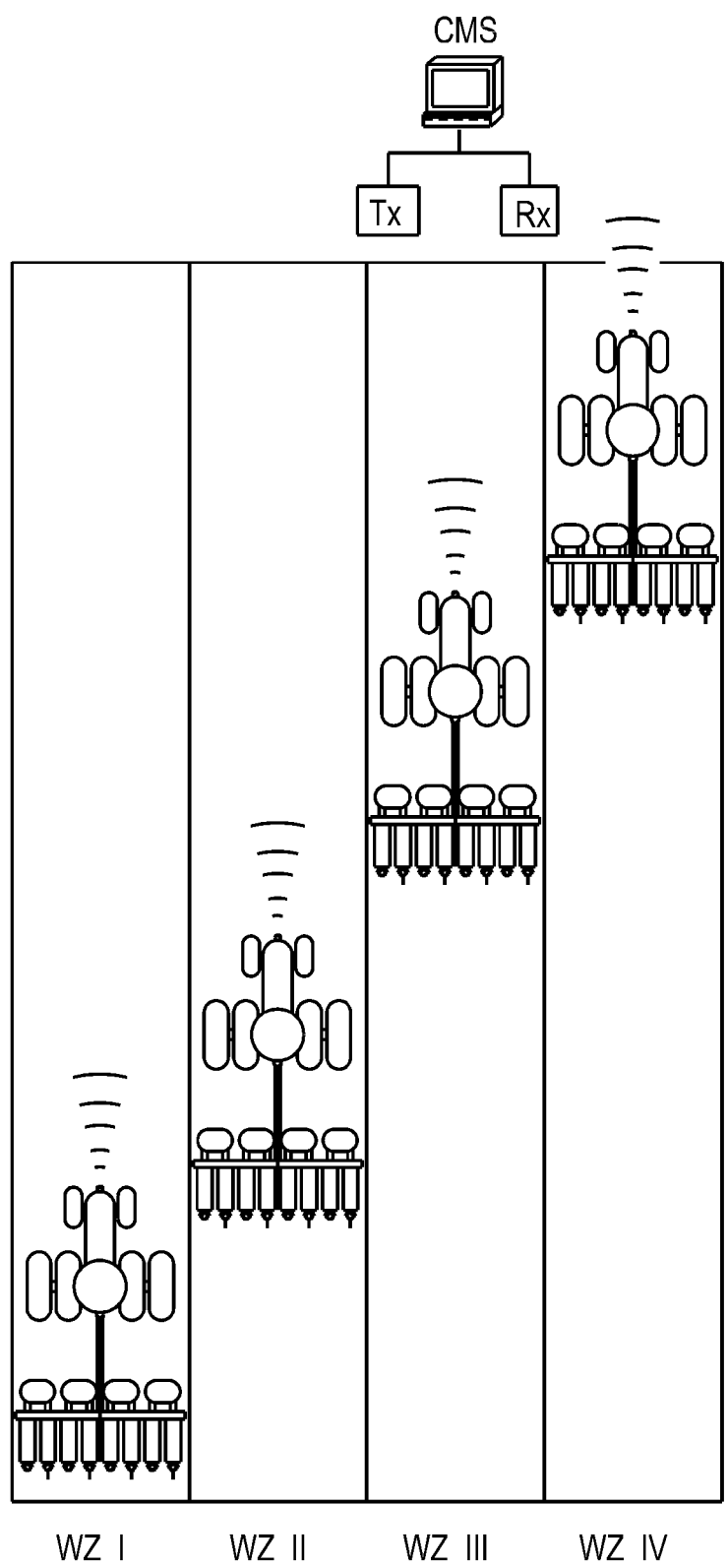
FIG. 22 schematically illustrates a field with the MRS planting in unique work zones (WZ I to WZ IV) to illustrate the interaction of the MRS that takes place in accordance with the present invention.

MRSCA Applied to Homogeneous MRS (No Cooperation)—A MRS deployed for planting can be considered as a group of homogeneous robots that perform a similar function. In FIG. 22, four robots are shown with field divided into four working zones (WZI to WZIV). Reactive and deliberative behaviors of the IRCA (Pitla et al., 2011) provide local intelligence allowing robot to navigate, plant and avoid obstacles.

The robots transmit messages with the local and global information to the CMS. Information about the task is obtained as a priori at the beginning of the planting operation and each robot is initialized by assigning the control variables (m, r, c) to values that define the type of coordination, role assignment and of communications.

Initialization for Homogeneous MRS:

Ag-Robots (I to IV)
{Coordination: m= 0 (No-cooperation)
Role Assignment: r=0 (Stand-Alone)
Inter-robot communication: c=0 (Transmit - default communication)}

Figure 23:
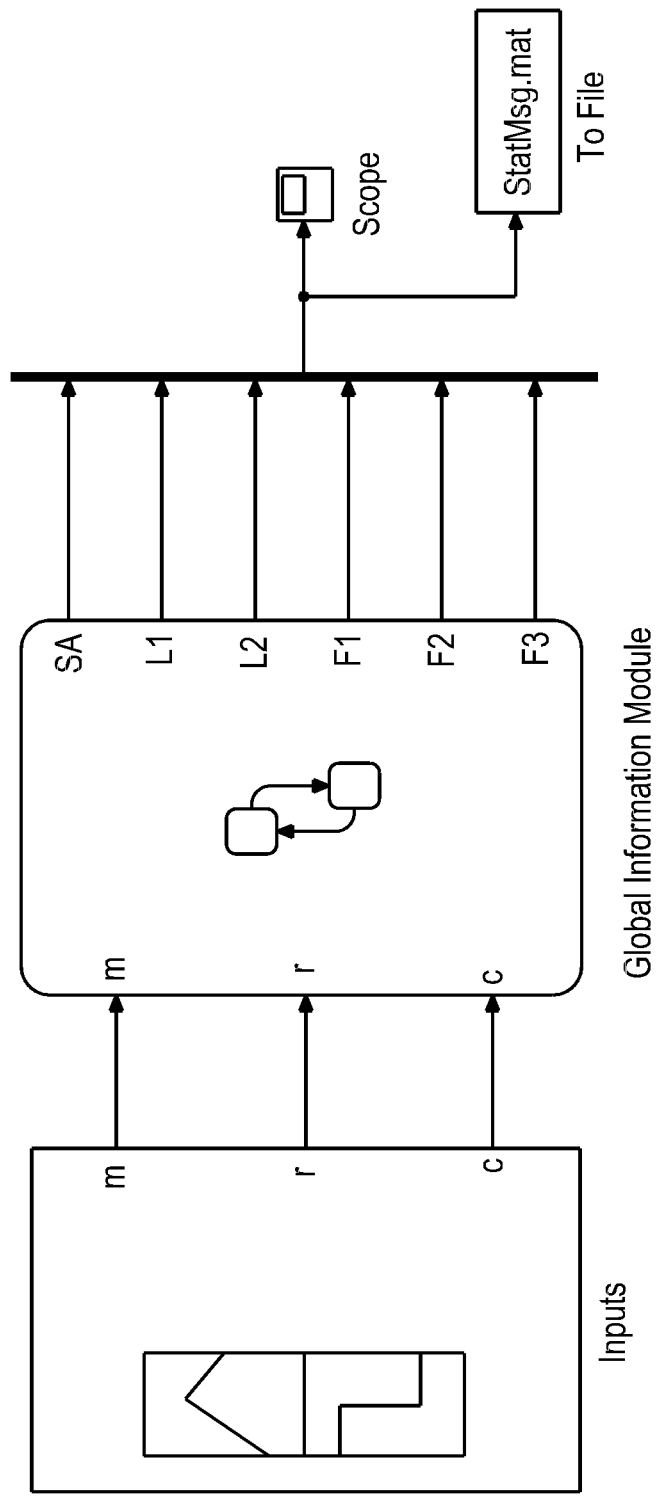
FIG. 23 illustrates a Simulink model for simulating the GIM of homogeneous MRS of the present invention.

SIMULATION—The basic homogeneous SIMULINK model (developed in MATLAB) is shown in FIG. 23. Input control variables (m, r, c) for this simulation are created using the signal builder and are obtained from the initialization of the robot. Outputs of the simulation include a series of status flags representing the statuses (active or not active) of the roles and the tasks (Internal finite states of the Roles). A status message (StatMsg) is created from the status flags and transmitted to the CMS for cooperative task execution and monitoring purposes.

Figure 24:
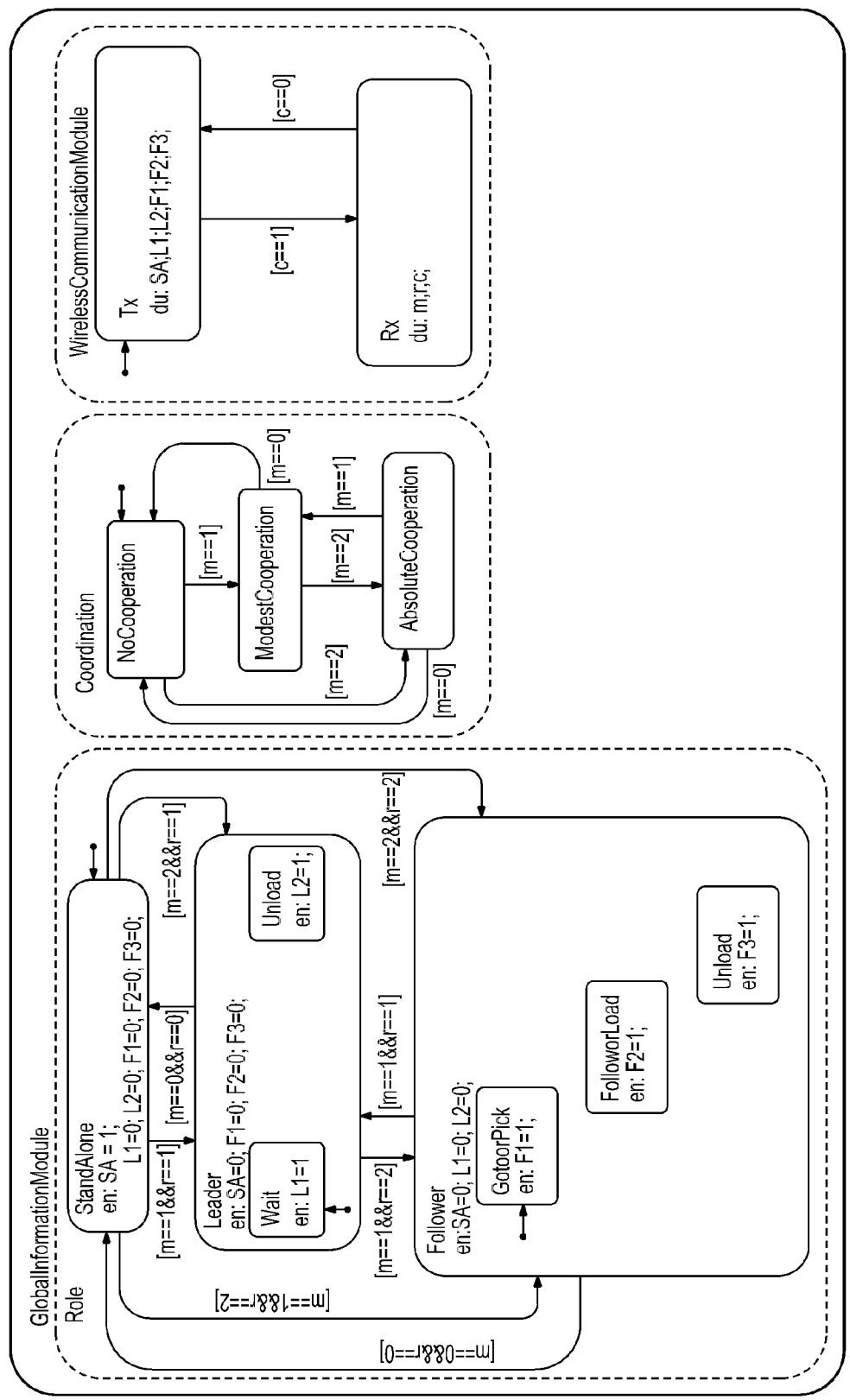
FIG. 24 illustrates a state diagram of the active parallel states and internal finite states of the GIM.

For the planting operation, as there is no inter-robot communication, the StatMsg created as a result of the simulation is used only for monitoring of the MRS. Thus, each robot transmits a message that contains the local information (x, y, v, $\phi$) obtained from the IRCA and the global information (m, r, c, StatMsg) obtained from the GIM. Upon simulation, based on the values of the control variables, the three parallel states; RM, CM and WCM of the GIM become active (see FIG. 24) triggering the mutually exclusive internal finite states on level 1 (refer to FIG. 21 and FIG. 24). The internal finite states Tx of the WCM, No Cooperation of the CM and Stand Alone of the RM are triggered that switching the robot into a no cooperation mode where the robot is assigned a stand-alone role.

The internal finite states Leader and Follower of the RM are not triggered as the robot is in No Cooperation mode. The status flags associated with the Stand Alone role is raised whereas; other status flags corresponding to the internal finite states of the Leader and Follower roles remain dormant. Thus, the simulation creates a series of status flags that represent the statuses of the RM which determines the overall behavior of the robot. These status flags are encoded into a message (StatMsg) that can be accessed by the CMS. The message (FIG. 25) generated as a result of this simulation indicates that the robot is working in no cooperation mode with a stand-alone role. Thus, four planters of the MRS working in the field with no cooperation transmits the message frame (FIG. 26) containing three components; data, control and the StatMsg to the CMS indicating their overall states.

Figures 25, 26, 27:
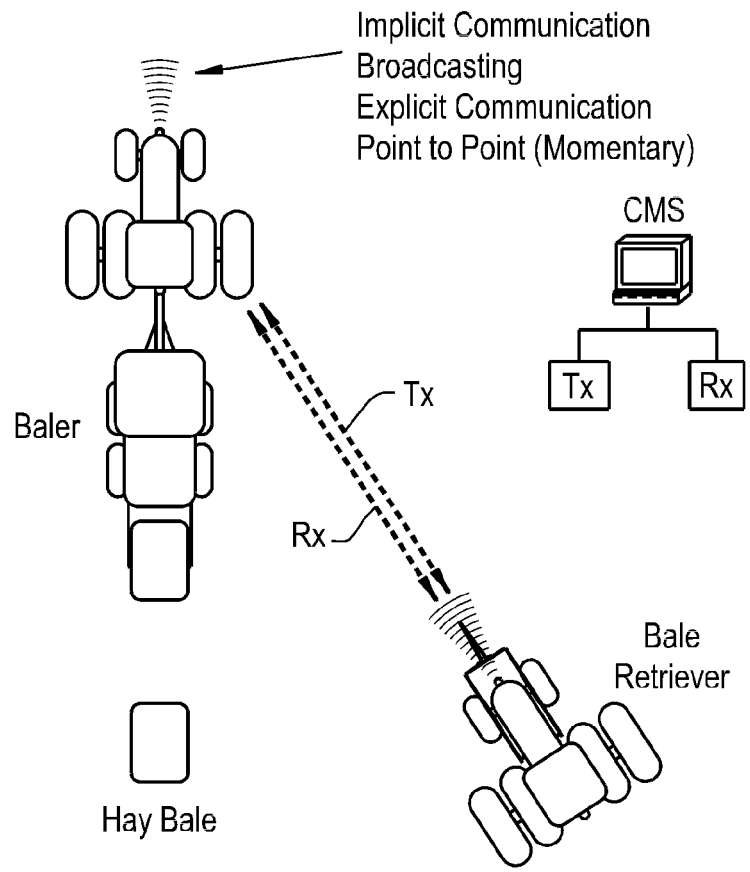
FIG. 25 illustrates a StatMsg generated from the GIM.
FIG. 26 illustrates a message frame of the MRS in No Cooperation mode.
FIG. 27 illustrates the MRS of the present invention performing baling and retrieval operations.

MRSCA Applied to Heterogeneous MRS (Modest Cooperation)—A good example where a heterogeneous MRS with modest level of cooperation can be deployed is the task of hay baling and bale retrieval. Two robots as depicted in FIG. 27 operate in a heterogeneous nature to perform two operations. For the cooperative portion of the task, when the Baler finishes and drops a bale, the Bale Retriever is alerted to the location of the bale. The level of cooperation is modest for this task as the Baler and Bale Retriever communicate for a short period of time to inquire and respond about the status of formed bales. After the communication, the Baler and the Bale Retriever resume their independent operations. For this example, the Baler is assigned the role of a Leader and tasked with transmitting messages containing the location of the hay bale to the Bale Retriever. The Bale Retriever acts as a Follower by receiving and acting on the messages. Once the bale is retrieved it is transported to the field edge for drop off at a collection point.

The Leader and Follower robots are initialized by assigning Modest cooperation values to the control variables (m, r, c).

Initialization:

Robot I
        Coordination: m= 1 (Modest);
        Role Assignment: r=1 (Leader);
        Inter-robot communication: c=0 (Transmit)
    Robot II
        Coordination: m= 1 (Modest);
        Role Assignment: r=2 (Follower);
        Inter-robot communication: c=1 (Receive)

Figure 28:
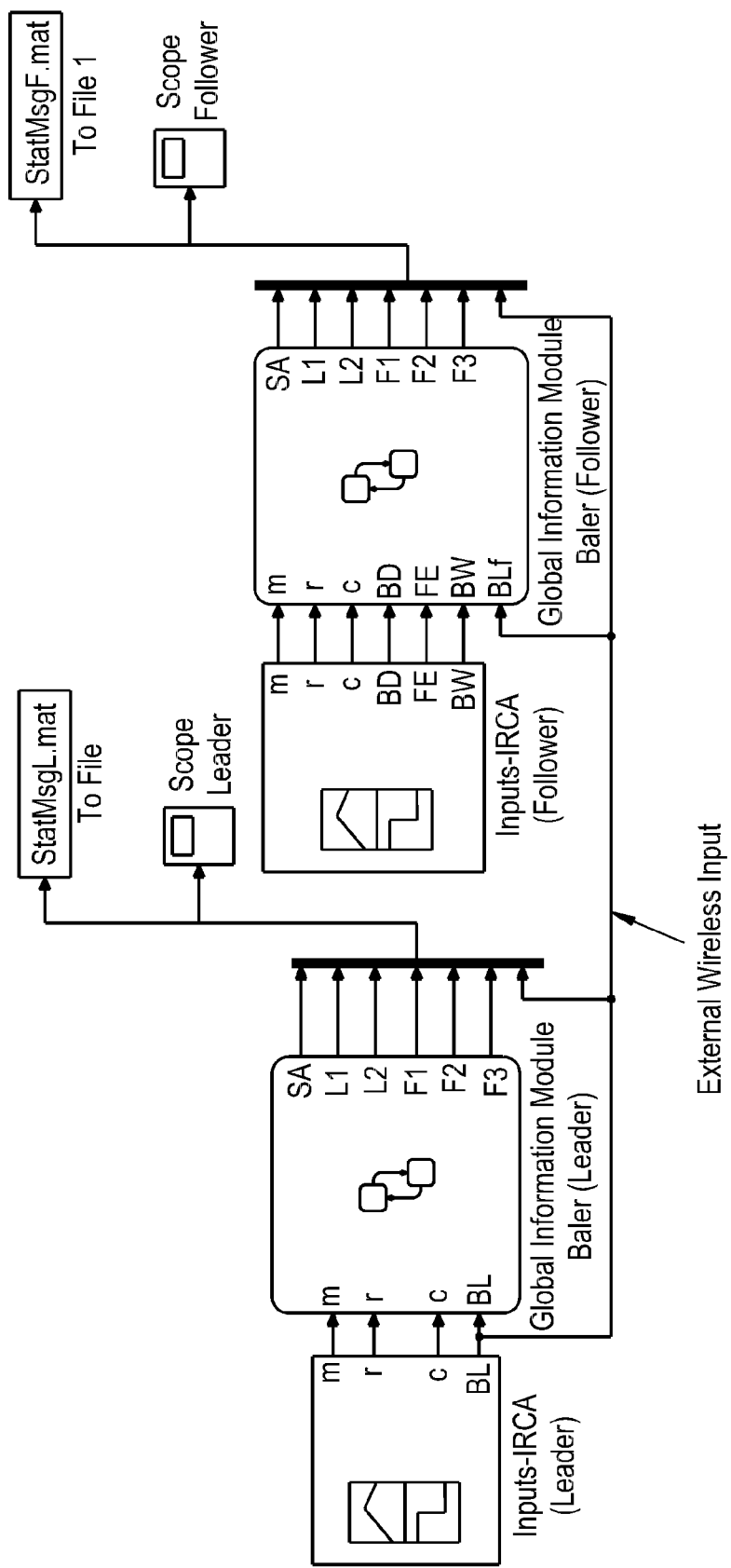
FIG. 28 illustrates a Simulink model developed for simulating modest cooperation between heterogeneous robots (Baler and Bale Retriever)

SIMULATION—A SIMULINK model (FIG. 28) is developed consisting of two GIMs, one representing the Baler (Leader) and the other representing the Bale Retriever (Follower). In addition to the status flags mentioned in Table 5, new flags are defined that are used as inputs to the GIMs in this simulation. These flags correspond to the signals of the sensors of the robots. The additional flags used are summarized in Table 6.

TABLE 6

Additional Flags Created for Simulating the Baling Operation.

| Generic Flags | Definition | High | Low |
| --- | --- | --- | --- |
| BL, BLf | Raised when the bale is ready to be retrieved | 1 | 0 |
| BD | Raised when the Bale Retriever is closer to the hay bale to be retrieved | 1 | 0 |
| FE | Raised when the Bale Retriever is close to the field edge for dropping of the bale | 1 | 0 |
| BW | Raised when the bale is loaded on the Bale Retriever | 1 | 0 |

The inputs to the GIM of the Baler are control variables m, r, c and the flag BL. Flag BL is raised when a sensor (e.g., proximity sensor) on the Baler indicates a bale is formed and ready to be dropped. The Baler sends this raised flag BL tagged with the location information to the Bale Retriever before dropping the bale. This raised flag BL acts as an external wireless input (FIG. 28) to the GIM of the Bale Retriever in the simulation. The raised BLf flag triggers the Bale Retriever to navigate to the location of the bale. Other inputs to the GIM of the Bale Retriever are the flags BD, FE and BW representing sensor signals including the proximity of the bale and field edge, and weight of the bale, respectively.

Figure 29:
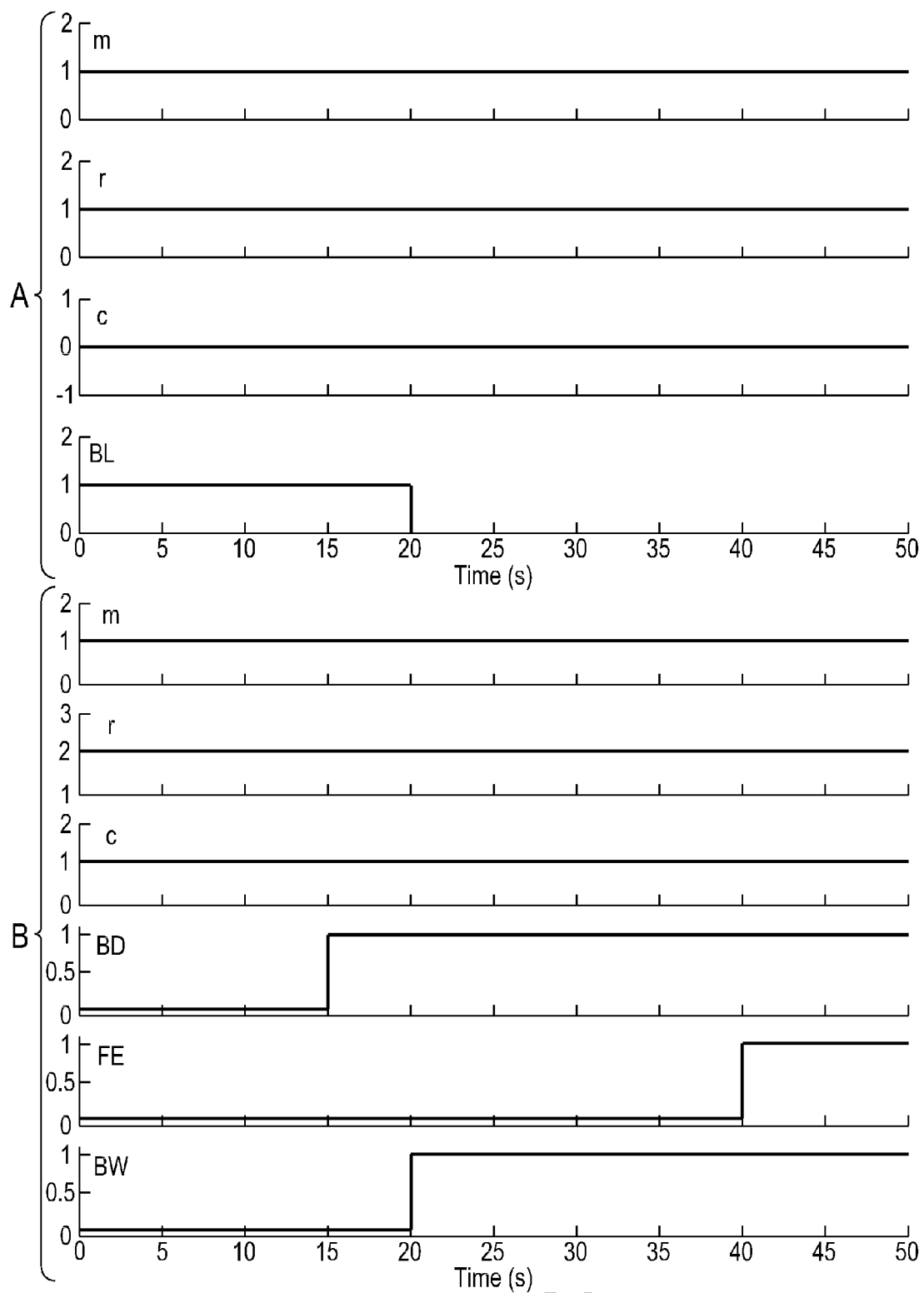
FIG. 29 illustrates a) Inputs to the GIM of the Baler. b) Inputs to the GIM of the Bale Retriever.
Figure 30B:
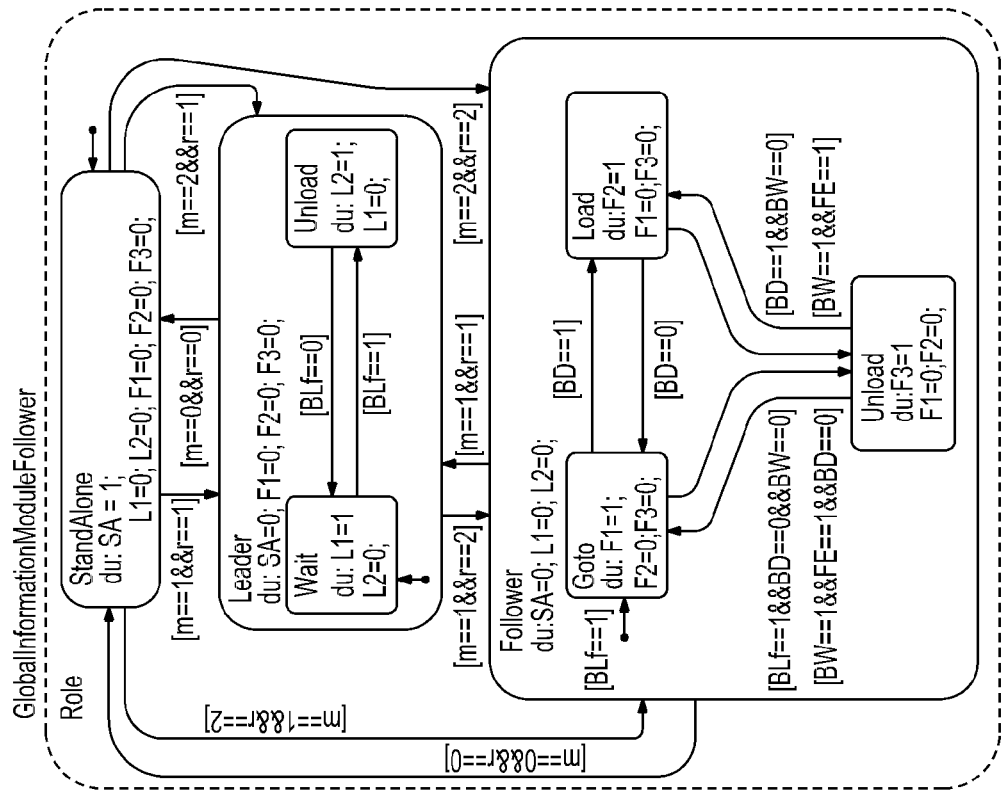
FIG. 30B illustrates a role module for the Bale Retriever.
Figure 30A:
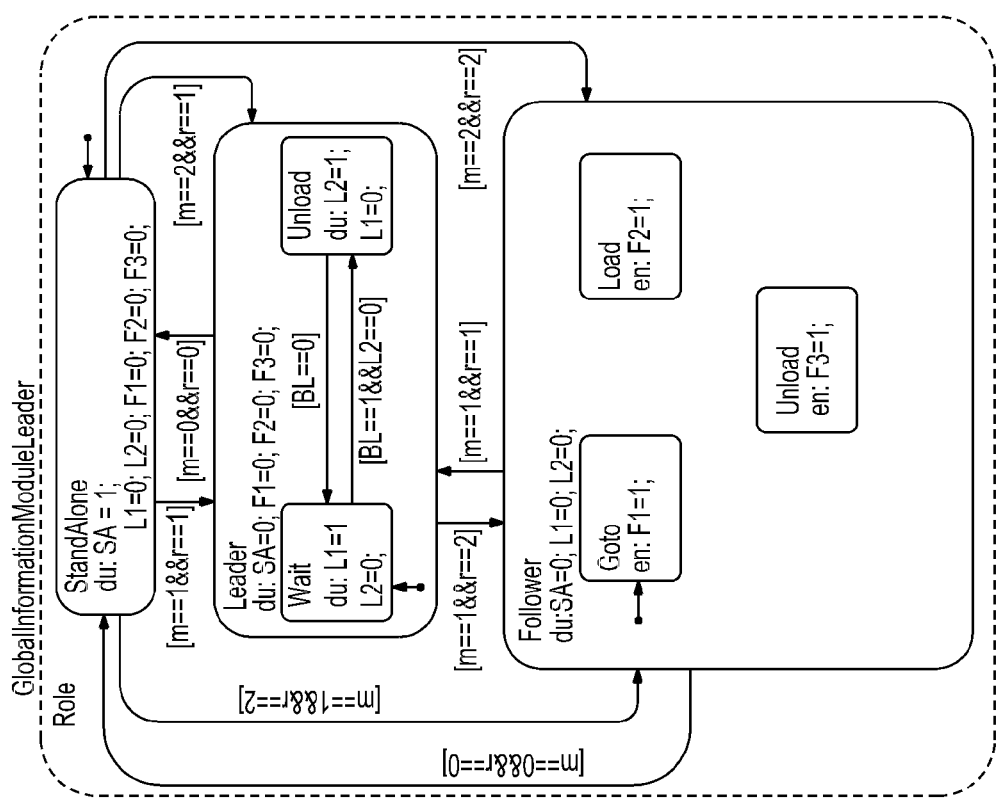
FIG. 30A illustrates a role module for the Baler.

The input signals (FIG. 29) to the Baler and the Bale Retriever are created using the signal builder of MATLAB. The flag BL (FIG. 29a) is sent as input to the Baler for the first 20 s indicating a bale has been formed and is ready to be retrieved. Once the bale drops, the BL flag becomes inactive for the next 30 s indicating Baler is forming another bale. The input flags to the Bale Retriever; BD, FE and BW are raised in a sequence to trigger a series of tasks that include bale retrieval and unloading at the edge of the field. The Baler takes on the role of the Leader with Wait and Unload as tasks associated with it. The Bale Retriever takes on the role of the Follower with Go To, Load and Unload tasks. A comparison of the internal finite states (Level 2) of the roles of the Baler and Bale Retriever are presented in FIGS. 30A and 30B. For simplification, the internal finite states at Level 2 will be addressed as "tasks" from here on.

Figure 31:
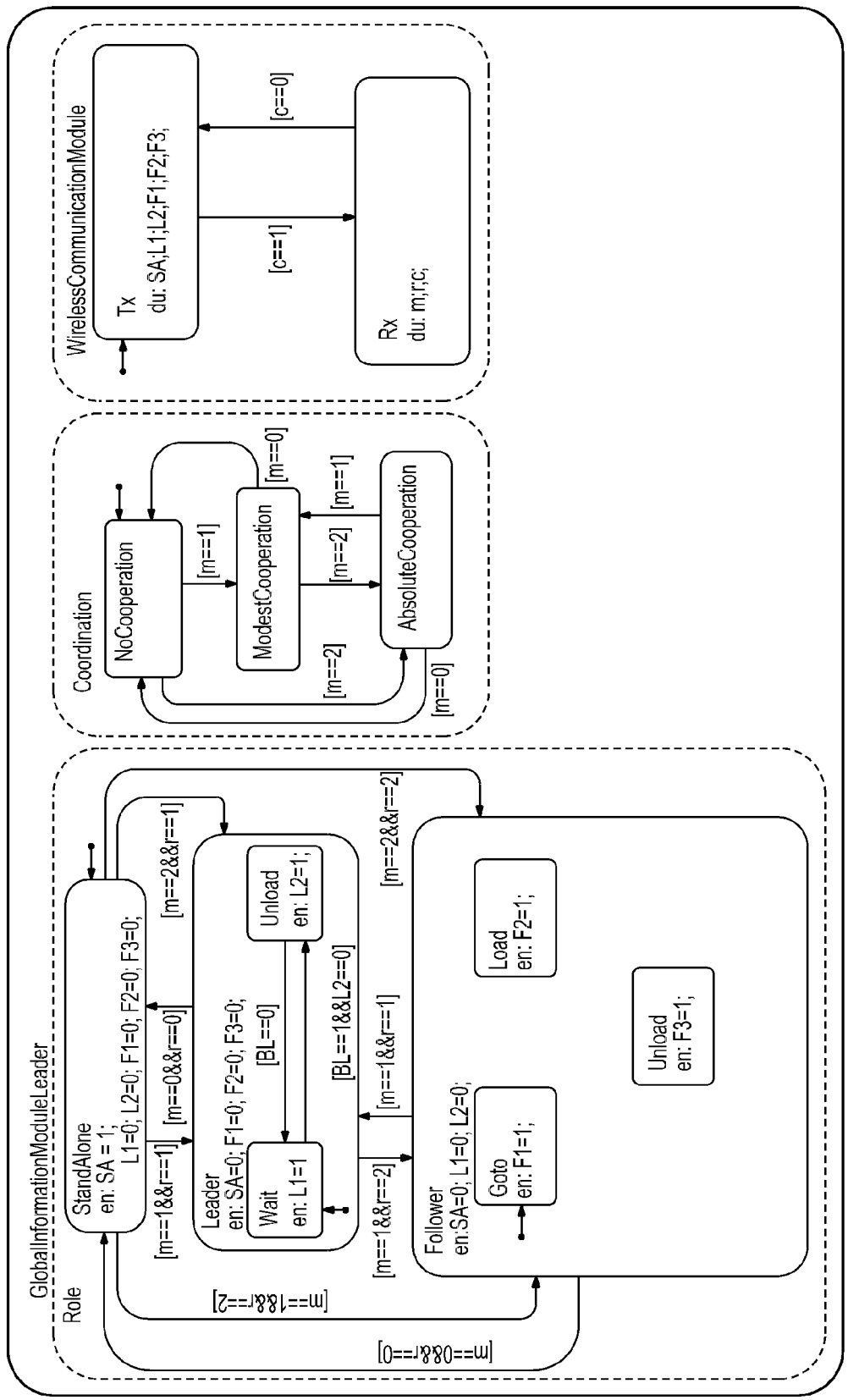
FIG. 31 illustrates active states of the Baler (Leader)

Upon simulation, the parallel states of the GIM of the Baler become active depicted by the dashed blue lines in FIG. 31. The active mutually exclusive states (blue solid lines) indicate that the Baler is acting as leader and is transmitting in modest cooperation mode. An active Unload task refers to the unloading of the bale by the Baler. After unloading, the Baler returns to the default task Wait, where it will resume its operation of baling. Subsequently, when the next bale is ready, the BL flag is raised and the transition from task Wait to Unload takes place.

Figure 32B:
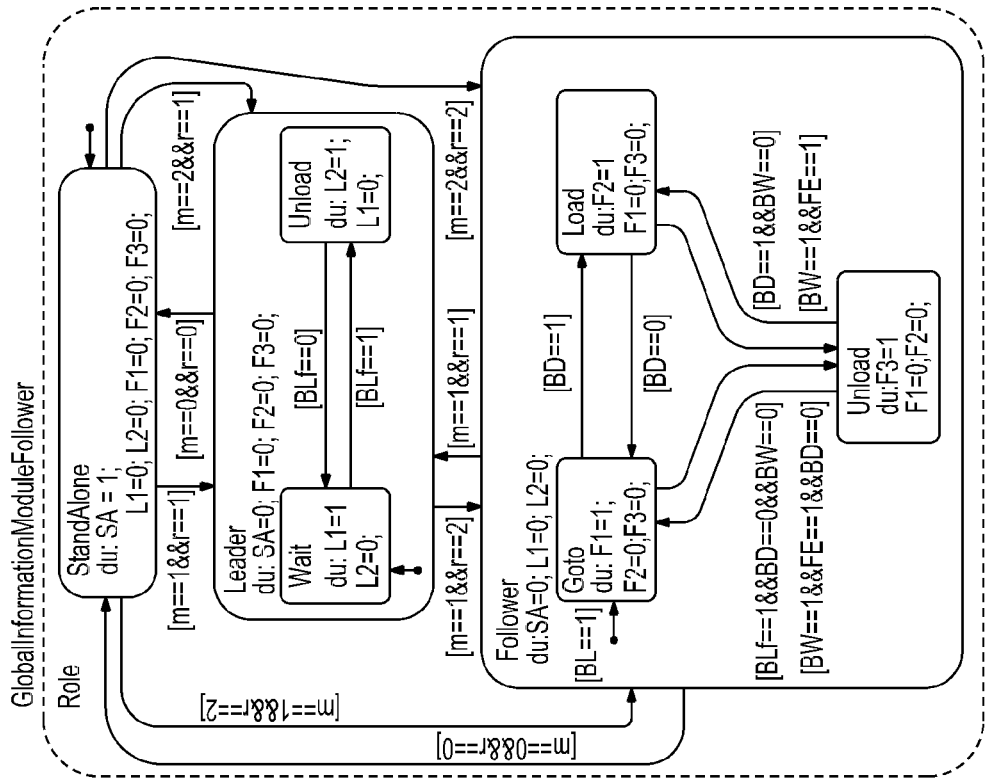
FIG. 32B illustrates the active task Load of the Bale Retriever during the execution of the bale retrieving task.
Figure 32A:
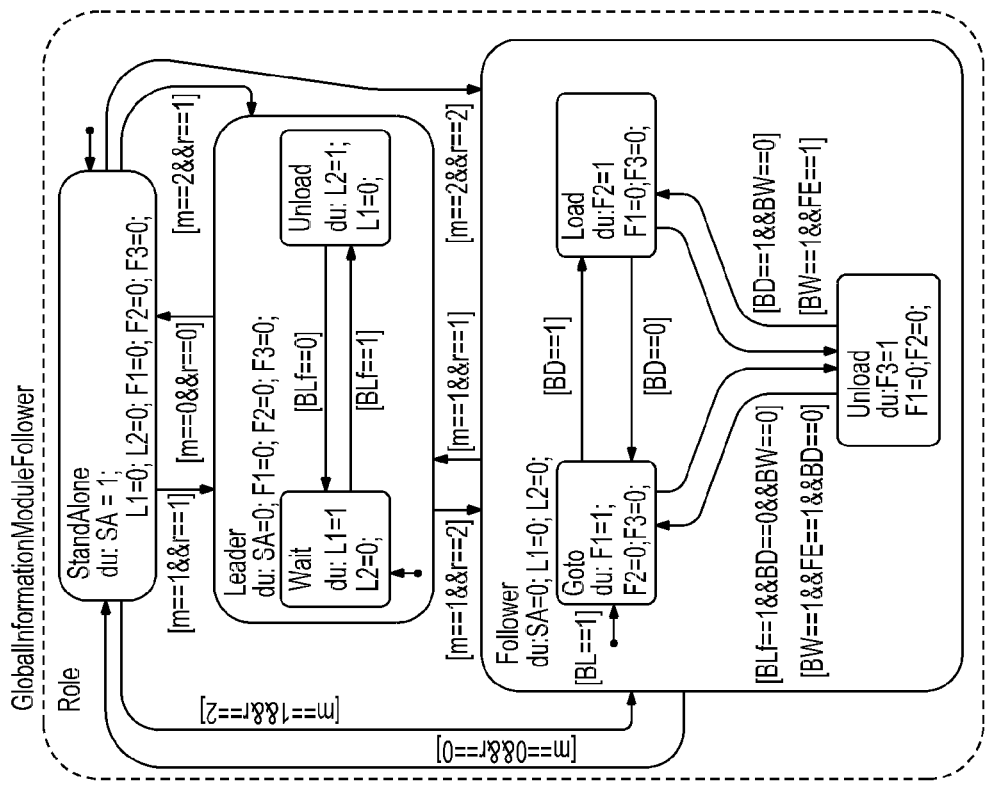
FIG. 32A illustrates the active task Go To of the Bale Retriever during the execution of the bale retrieving task.
Figure 32C:
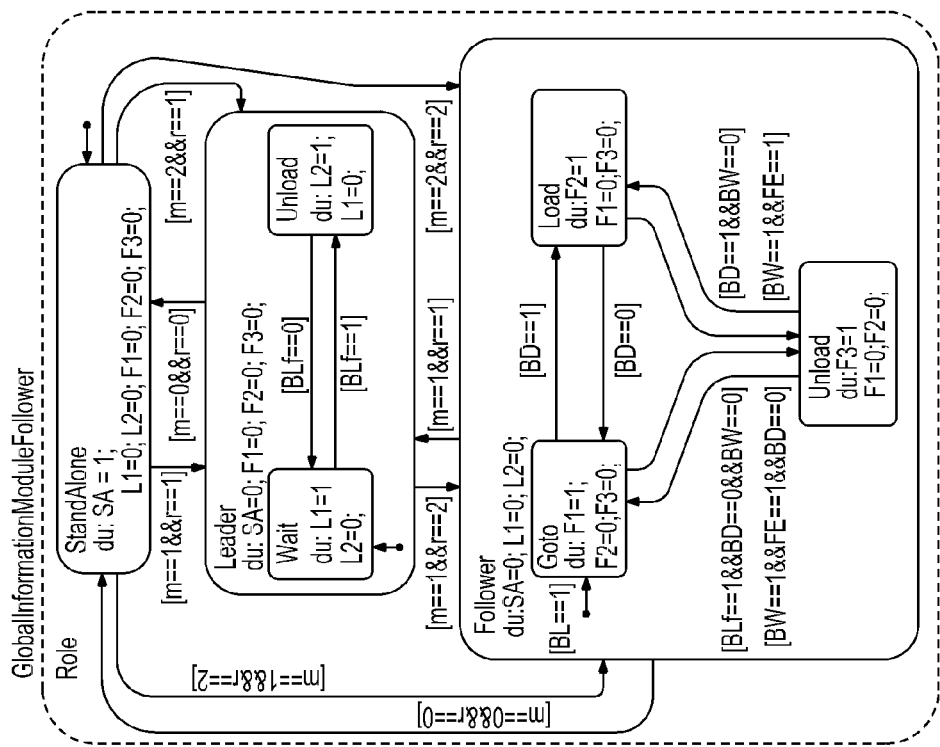
FIG. 32C illustrates the active task Unload of the Bale Retriever during the execution of the bale retrieving task.
Figure 33A:
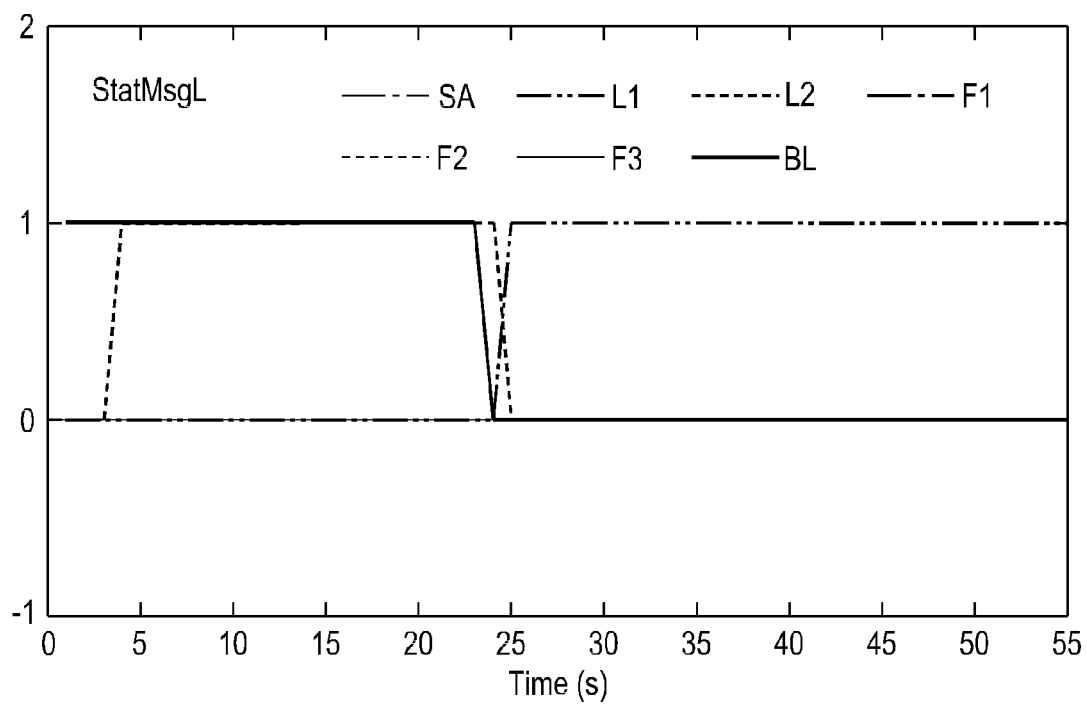
FIGS. 33A and 33B illustrate status messages of the Baler and the Bale Retriever that may be obtained during operation.
Figure 33B:
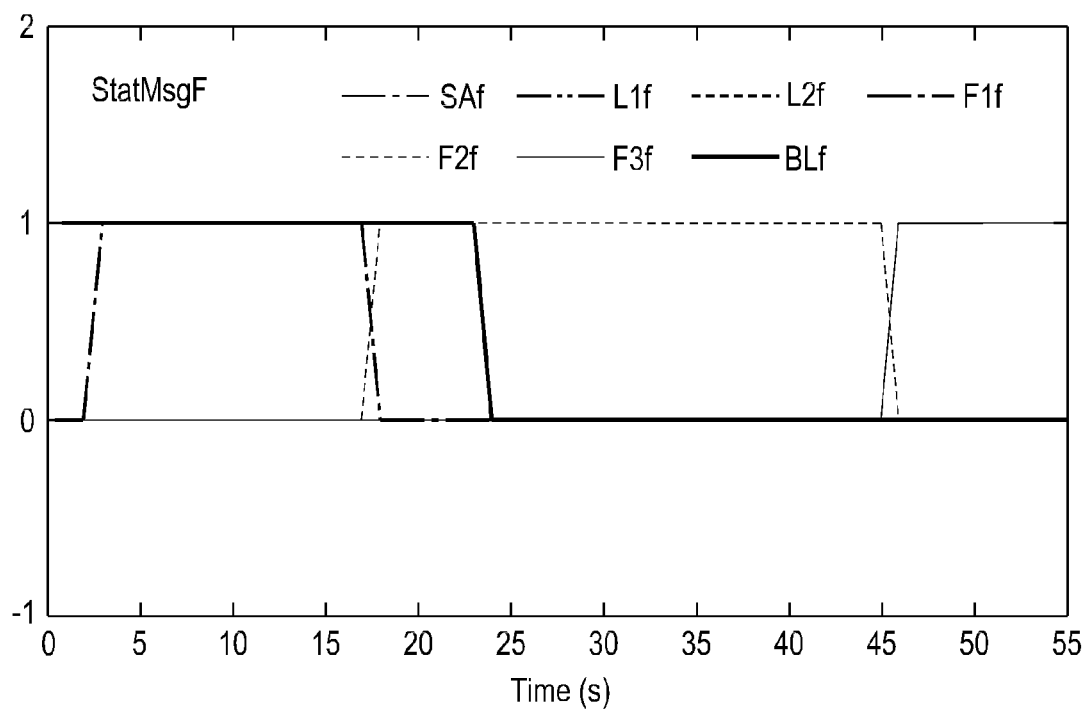

The active tasks of the Follower role at different stages of the task execution is depicted in FIGS. 32A, 32B and 32C. The Bale Retriever triggers the task Go To (FIG. 32A) upon receiving a raised BL flag from the baler. The Bale Retriever navigates towards the bale and when the robot senses the hay bale, flag BD is raised and the task Load (FIG. 32B)

associated with the follower role is triggered to load the hay bale. After loading the hay bale, the Bale Retriever navigates towards the edge of the field for drop off. The task Unload (FIG. 32C) is triggered when the robot reaches a desired location on the field edge indicated by the raised flag FE. A time series plot of the status messages of the Baler and the Bale Retriever obtained during this simulation is provided in FIGS. 33A and 33B. The status message of the Baler (StatMsgL) contains the time history of the switching of the tasks associated with leader role represented by the status flags L1 and L2. Thus, the behavior of the Baler is predicted from the content of StatMsgL that can be shared with the MRS For example, from FIG. 33A, we can determine that in the first 25 s, the Baler is unloading (since L2=1 and BL=1) the bale and for the remaining 30 s, the baler is in the Wait state (since L1=1 and BL=0) indicating that the Baler is working to create the next bale or just waiting to unload.

Similarly, the status message of the Follower (StatMsgF) can be interpreted to understand the behavior of the Bale Retriever. The flags F1f, F2f and F3f are in a raised state from 3 to 17 s, 18 to 45 s and 46 to 55 s respectively indicating the time duration of active task Go To, Load and Unload. Thus, StatMsgL and StatMsgF indicate the statuses of the tasks executed by the Baler and the Bale Retriever based on which the leader and the follower robots synchronize their actions to finish the cooperative task of baling.

Figure 34:
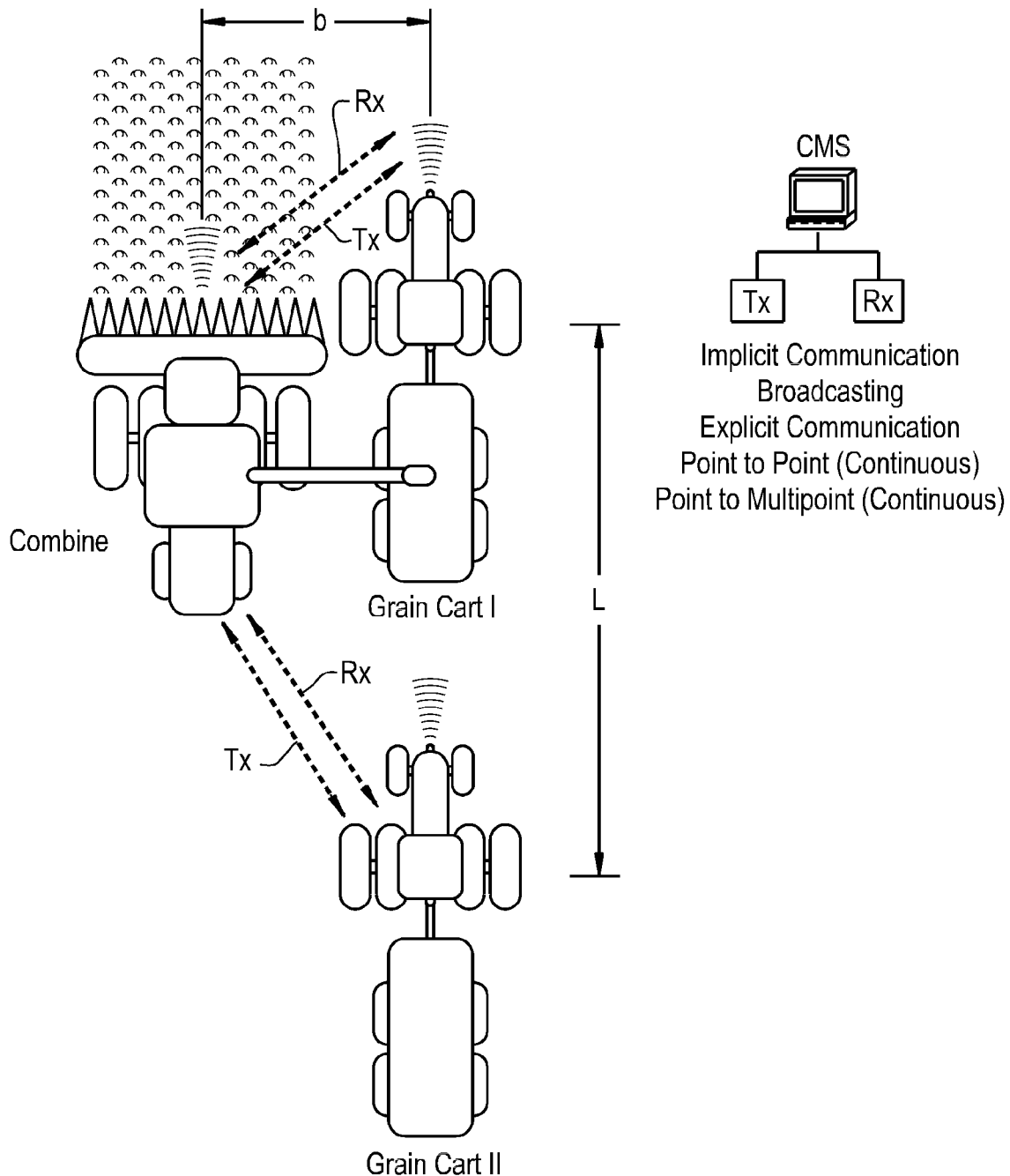
FIG. 34 schematically illustrates the MRS performing harvest operations.

Heterogeneous MRS (Absolute Cooperation)—The task of harvesting row crops requires a grain Combine for harvesting the grain and a grain cart for the storage of the grain on-the-go. To maximize the efficiency of the harvesting task, in some cases, an additional grain cart is deployed to replace the filled grain cart. This operation involving three machines requires constant communication and coordination between the machine operators to successfully transfer the grain. Elimination of the machine operators increases the already existing challenge of coordinating them significantly and demands a robust control approach for the control of the autonomous machines. The MRSCA developed classifies the robots involved (FIG. 34) in the task of harvesting as heterogeneous robots as these robots perform different functions. This heterogeneous MRS requires absolute cooperation and should communicate at all times during the operation to enable the transfer of the grain between the machines. The Combine is considered as the Leader that explicitly communicates with Grain Cart I and Grain Cart II to send instructions. The grain carts act as Followers, take instructions, and react accordingly to accomplish the assigned cooperative task. The initialization steps of the three robots are shown below.

Initialization:

---

Robot I
    Coordination: m= 2 (Absolute)
    Role Assignment: r=1 (Leader)
    Inter-robot communication: c=0(Transmit)
Robot II and Robot III
    Coordination: m= 2 (Absolute)
    Role Assignment: r=2 (Follower)
    Inter-robot communication: c=1(Receive)

---

A SIMULINK model (FIG. 35) with three GIMs one for the Combine (Leader) and the other two for the Grain Carts (Followers) are illustrated. The control variables (m, r, c) and some additional new flags mentioned in Table 7 are used as inputs to the GIMs of the Leader and the two Followers.

TABLE 7

Additional status flags created for simulating harvest operations.

| Generic Flags | Definition | High | Low |
| --- | --- | --- | --- |
| PS | Raised when the Grain Carts are full with grain or when the grain is available in the Combine for unloading | 1 | 0 |
| OD | Raised when the Grain Cart is at a desired bearing (heading and location) relative to the Combine | 1 | 0 |
| SYNCF1/SYNCL1 | Raised when Grain Cart I wants to synchronize with the Combine for the transfer of grain | 1 | 0 |
| SYNCF2/SYNCL2 | Raised when Grain Cart II wants to synchronize with the Combine for the transfer of grain | 1 | 0 |

Figure 35:
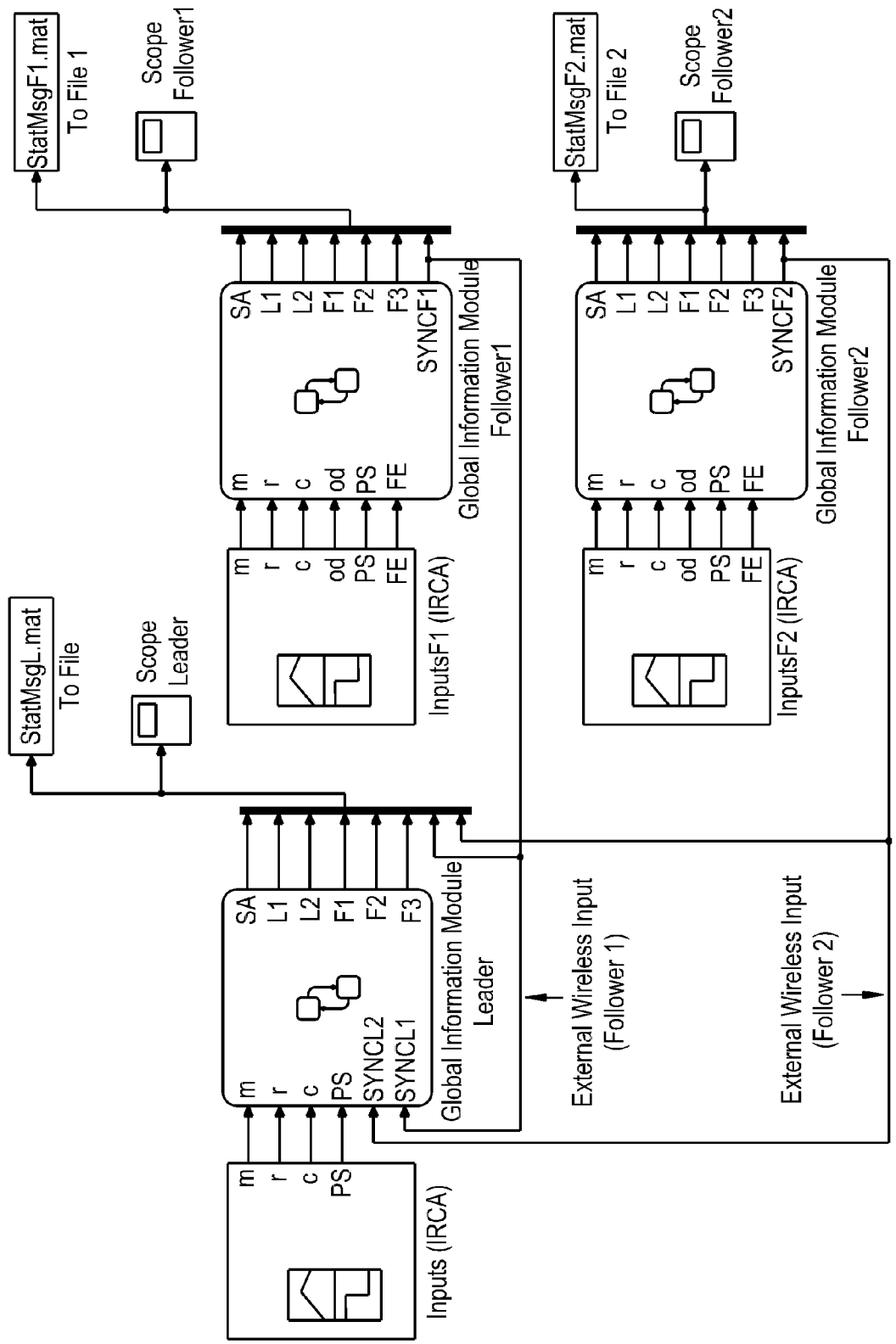
FIG. 35 illustrates a Simulink model developed for simulating absolute cooperation between heterogeneous robots (Combine, Grain Cart I, and Grain Cart II)

Now additionally referring to FIG. 35, the inputs to the GIM of the Leader are the control variables (m, r, c), SYNCL1, SYNCL2 and the flag PS. SYNCL1 and SYNCL2 are flags that are affected by the external inputs from Grain Carts I and II. These flags hold the values of flags SYNCF1 and SYNCF2 of Grain Cart I and II, respectively. When the Followers (Grain Carts) want to synchronize their actions with the Leader (Combine), the synchronization flags (SYNCF1, SYNCF2) are raised to initiate the transfer of the grain. The flag PS indicates the availability of the grain on the Combine and is raised when the grain is available for transfer.

The inputs to the GIMs of the Grain Carts are the control variables OD, PS and FE. The flag OD represent the positioning of the Grain Cart relative to the Combine. When the bearing of the Grain Cart is equal to the desired bearing required by the Combine, flag OD is raised and synchronous tasks take place for grain transfer. The flag PS represents a sensor signal that determines the quantity of the grain in the Grain Cart. The flag PS is raised when the Grain Cart is full with grain indicating that the transfer of the grain from the Combine to stop.

Figure 36:
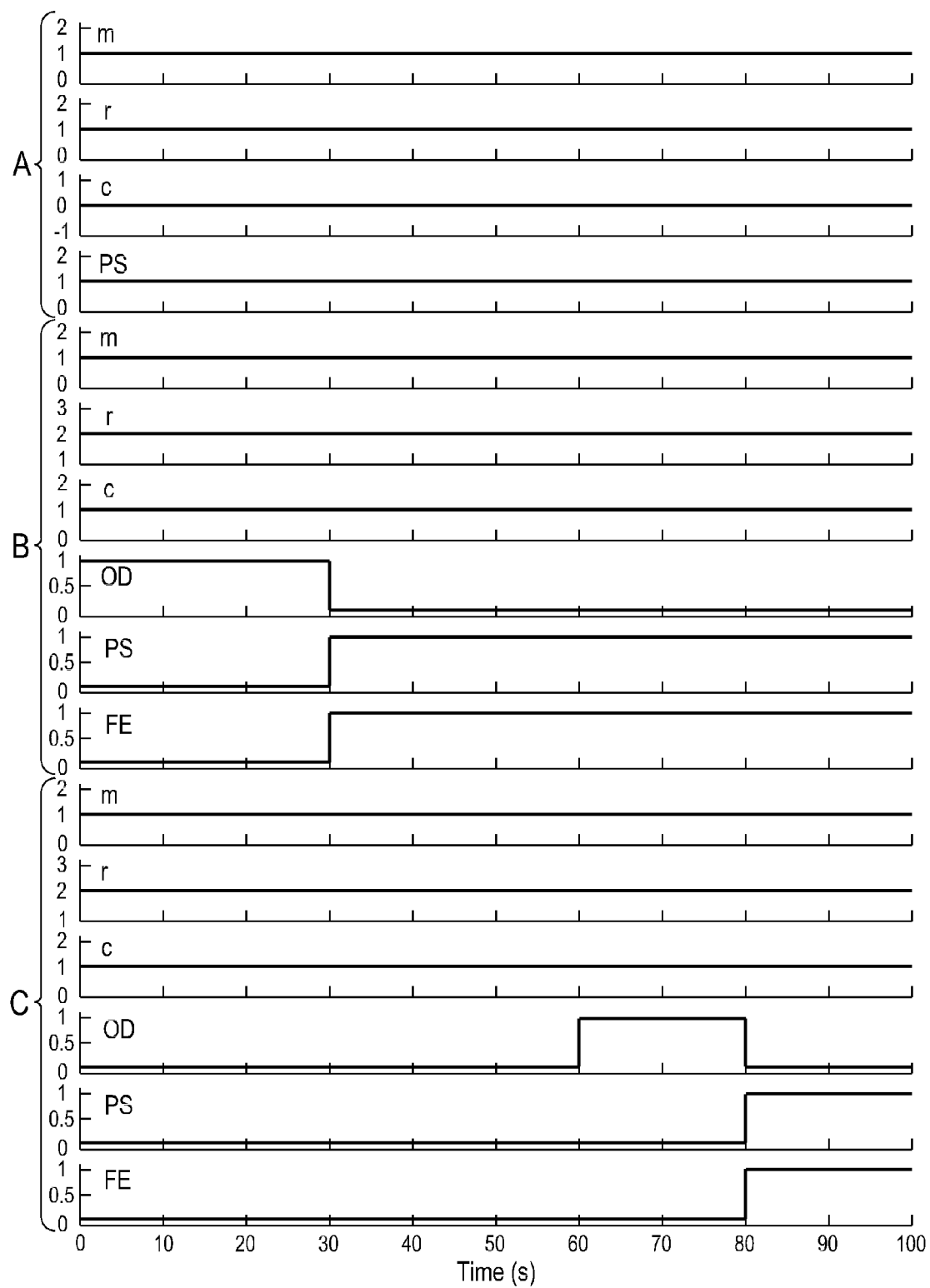
FIG. 36 illustrates inputs for the harvest operations carried out by the MRS of FIGS. 34 and 35.

Thus, the control variables, sensor and synchronization flags forms the inputs of the harvesting simulation. The inputs to the GIM of the Leader (Combine), Follower 1 (Grain Cart I) and Follower 2 (Grain Cart II) are depicted in FIG. 36. The inputs are created to enable Follower 1 to reach a desired bearing relative to the Leader first for the transfer of the grain. After the grain is transferred to Follower 1, the Leader synchronizes with Follower 2 to transfer the grain. The GIM created using the state flow chart of the Leader (Combine) is shown in FIG. 37A. For this operation, the GIM of the Leader differs from the GIM of the robots used for modest and absolute cooperation. The role Leader of the RM has a total of three tasks (Wait, Unload1 and Unload2) instead of only two.

The three tasks of the Leader role; Wait, Unload1 and Unload2 are activated separately to transfer the grain to the Followers. Specifically, task Unload1 is used to transfer grain to Follower 1 whereas Unload1 is used to transfer the grain to Follower 2.

Figure 37B:
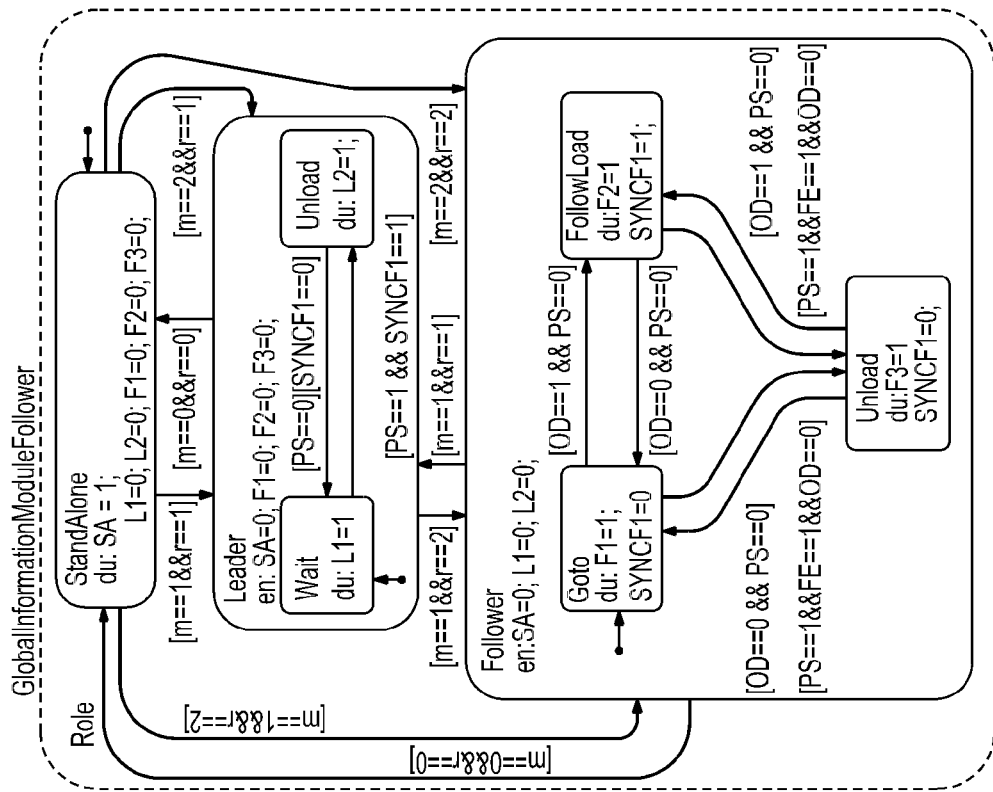
FIG. 37B illustrates a role module of a Grain Cart (Follower)
Figure 37A:
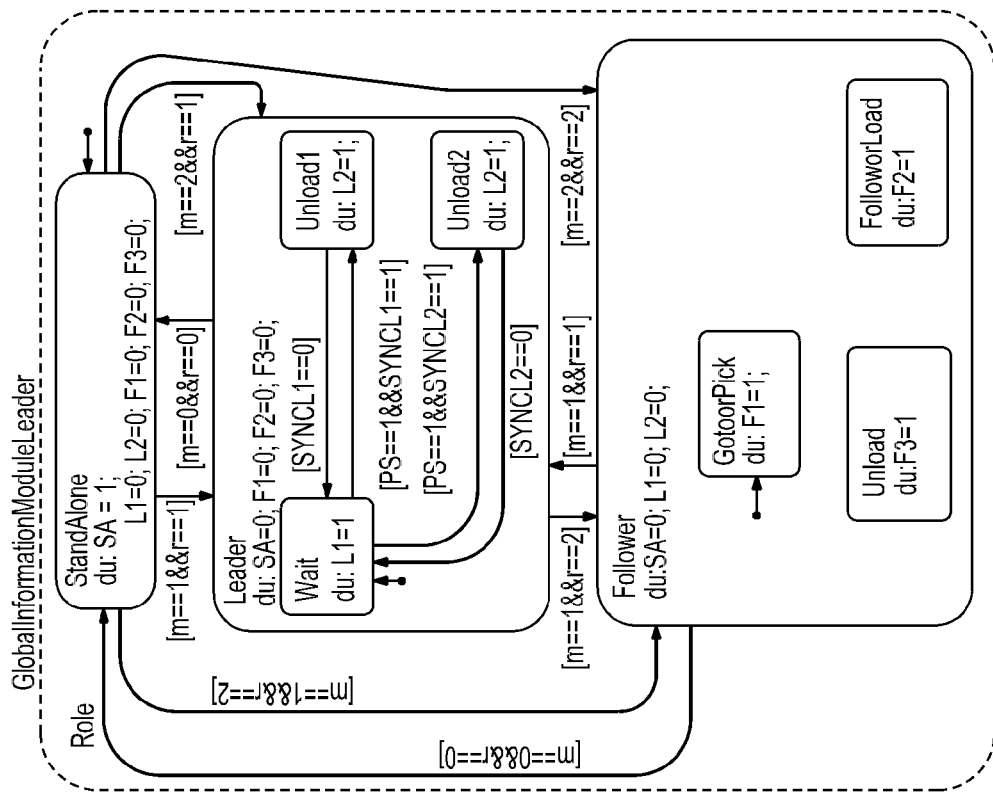
FIG. 37A illustrates a role module of a Combine (Leader)
Figure 38:
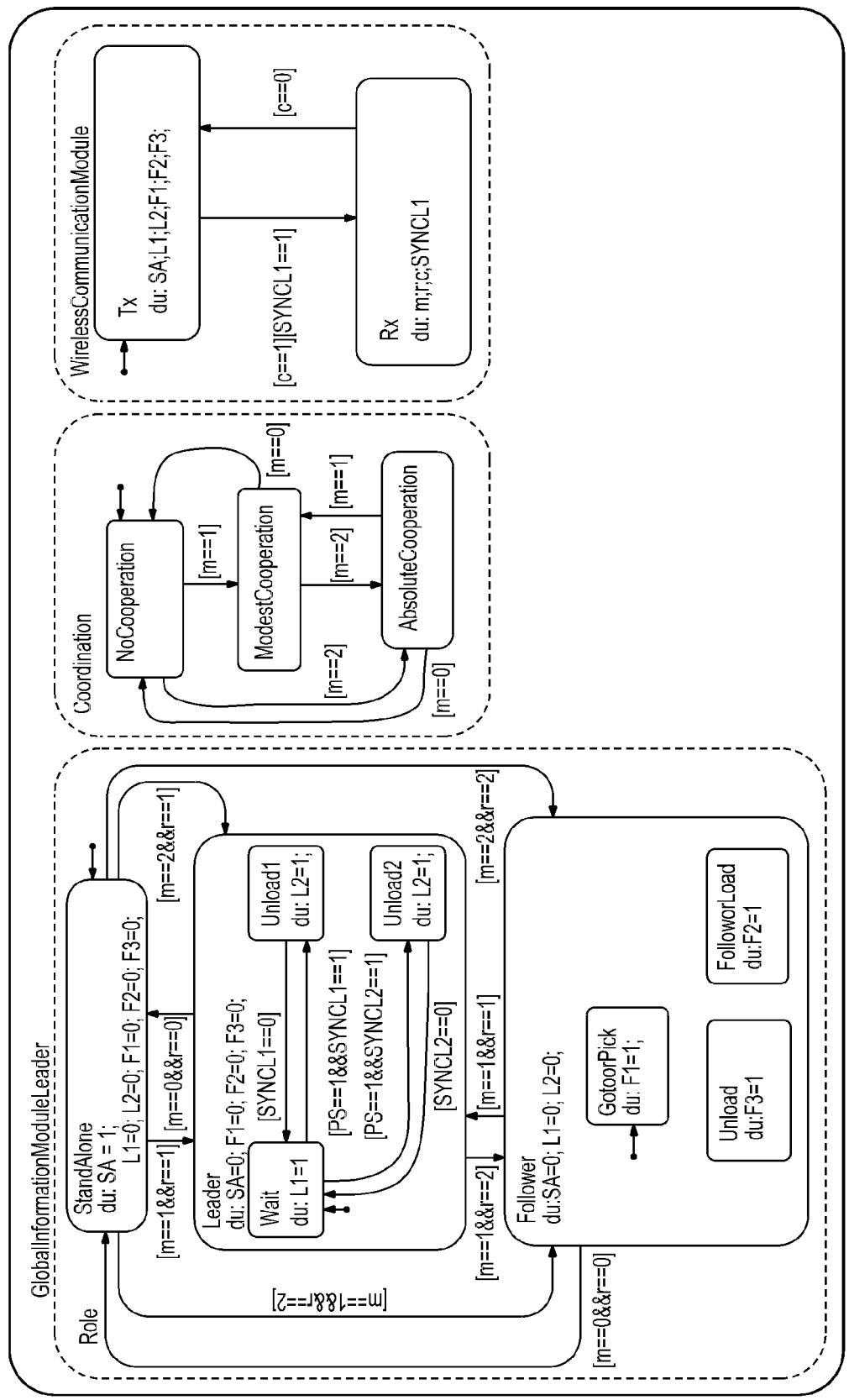
FIG. 38 illustrates the GIM of the combine (Leader)
Figure 39:
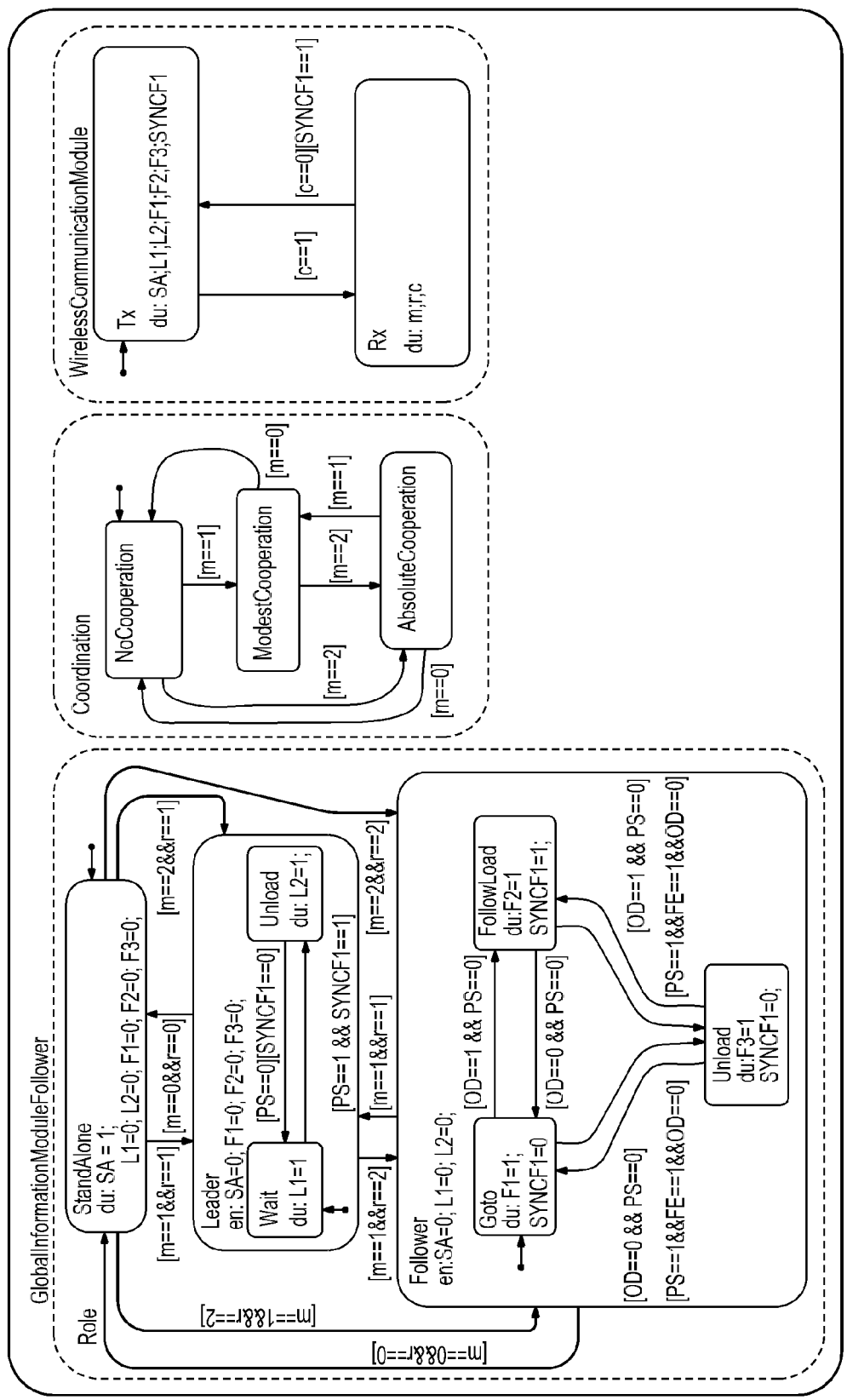

The role Follower is depicted in FIG. 37B that has three tasks; Go To, Follow Load and Unload. Upon simulation the role Leader in the GIM of the Combine and the role Follower in the GIMs of the Grain Cart I and Grain Cart II become active (FIG. 38 and FIG. 39).

Figure 40B:
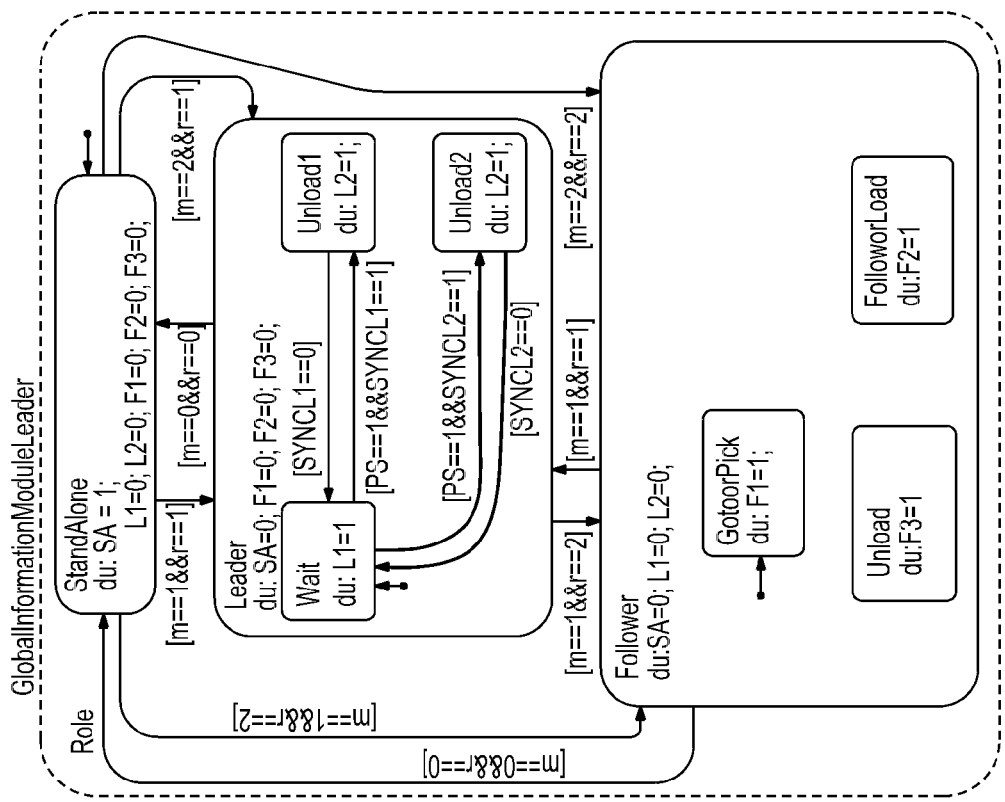
FIG. 40B illustrates active Internal States of Grain Cart II (Go To)
Figure 40A:
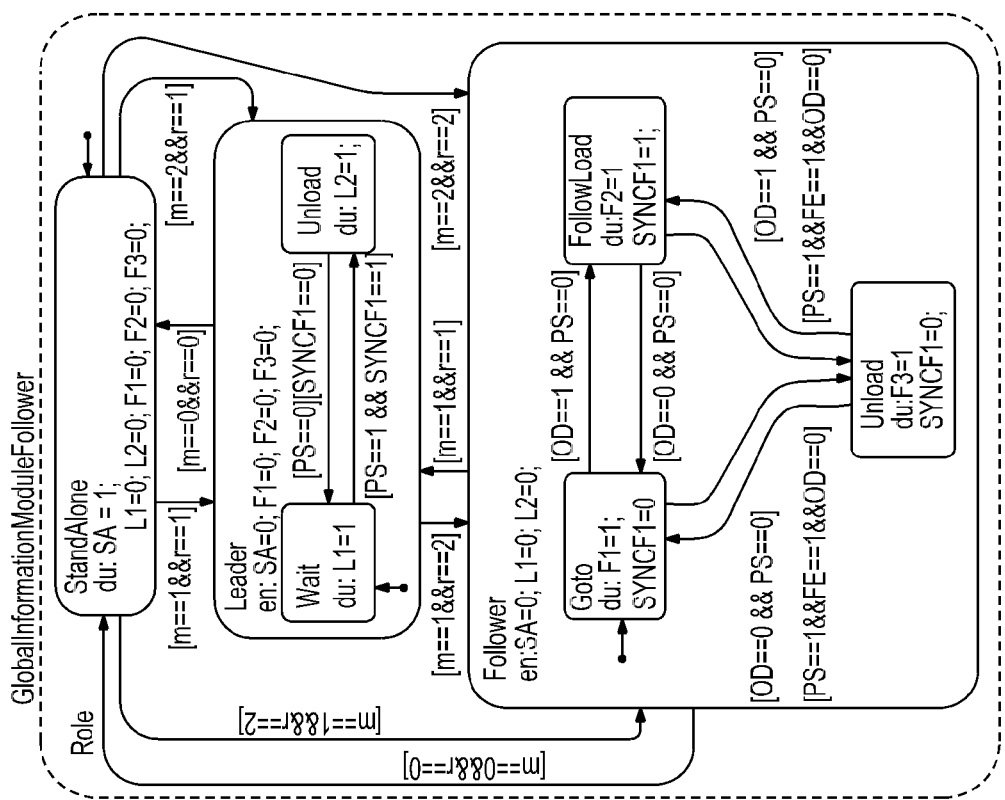
FIG. 40A illustrates active Internal States of Grain Cart I (Follow/load)

The active task Go To indicates that Grain Cart I is navigating towards the Combine. It must be noted that when the robot is performing the Go To state the synchronization flag SYNCF1 is 0 indicating that the robot is not at the desired location to initiate the transfer of grain. Once the Grain Cart I reaches a desired bearing relative to the Combine, the flag OD is raised indicating that Grain Cart I has reached the target location. The transition of state from Go To to Follow Load state takes place when the trigger condition (OD=1) is satisfied. The active state Follow Load (FIG. 40A) raises SYNCF1 of Grain Cart I and is sent as an external input to the Combine. The Leader upon receiving the raised SYNCF1 flag activates the task Unload 1 (FIG. 40B) to transfer the grain to Follower1. When the Grain Cart I is full with the grain, the PS flag is raised indicating that the Grain Cart I cannot take any more grain and the SYNCF1 flag is made 0. The Combine stops unloading and returns to the task Wait where it waits to synchronize with Grain Cart II.

Figure 41:
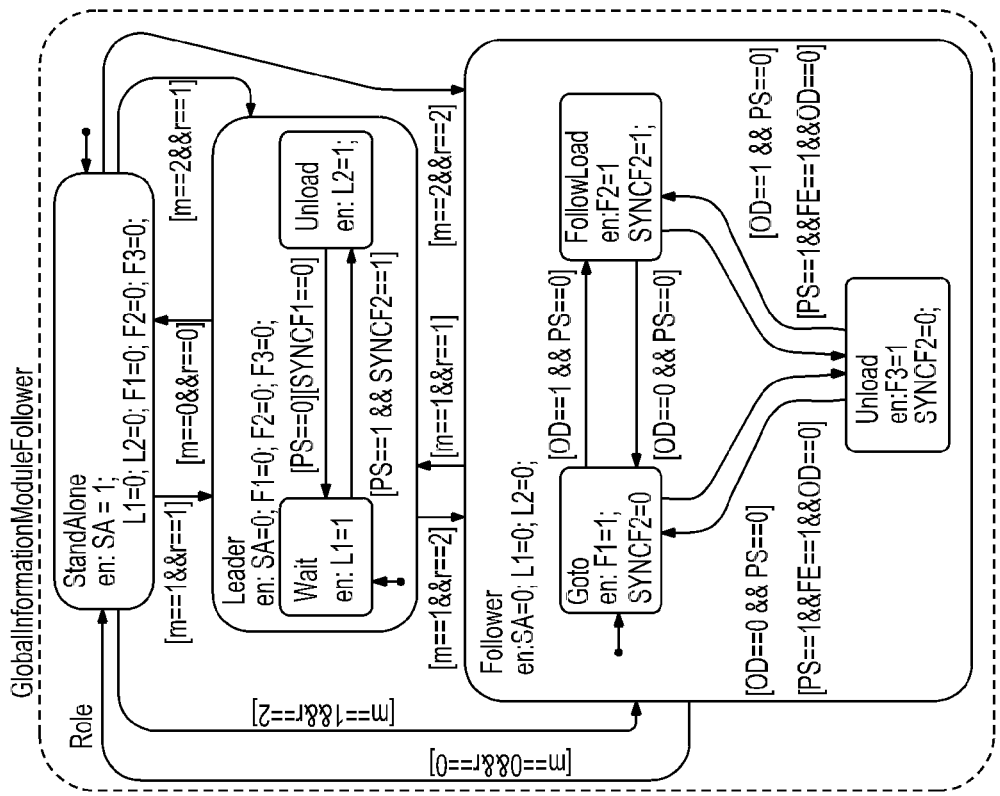
FIG. 41 illustrates active internal states of Grain Cart I (Unload) and Grain Cart II (Follow/Load)
Figure 41:
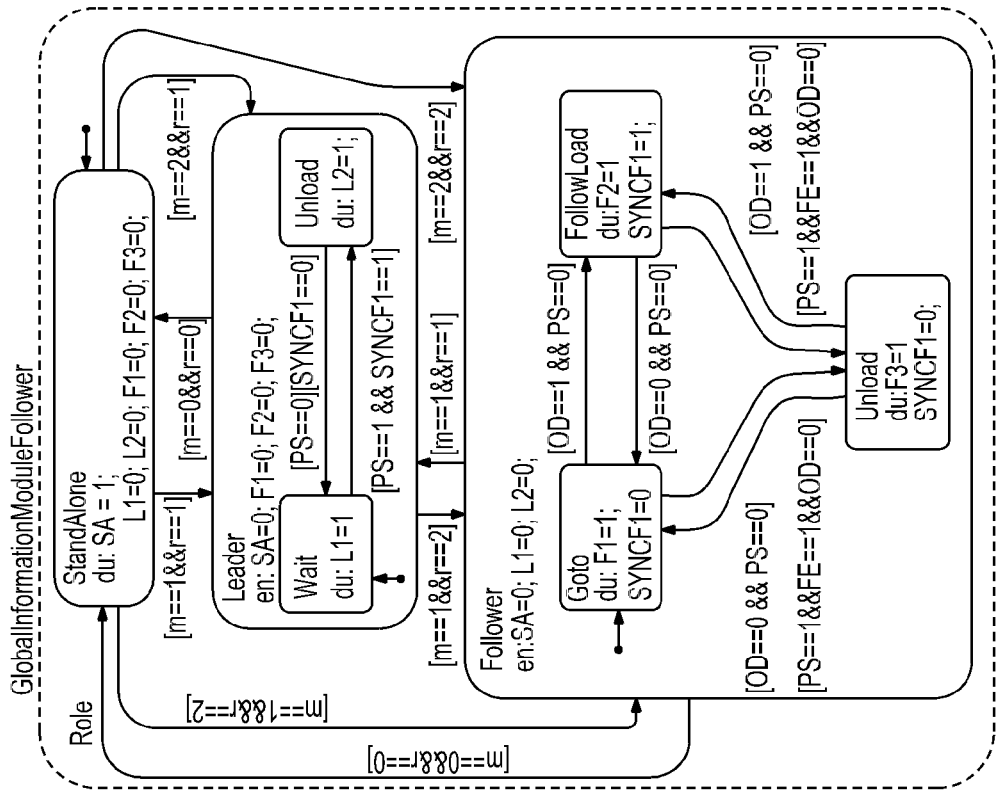

Grain Cart II prepares to reach the desired location required by the Combine for the transfer of the grain and in the meantime Grain Cart I unloads (FIG. 41a) at the target location at the field edge. Once Grain Cart II reaches the desired location relative to the Combine, the flag SYNCF2 is raised and the synchronized task Unload 2 of the Combine and Follow Load (FIG. 41b) of the Grain Cart II becomes active to transfer the grain.

Figure 42A:
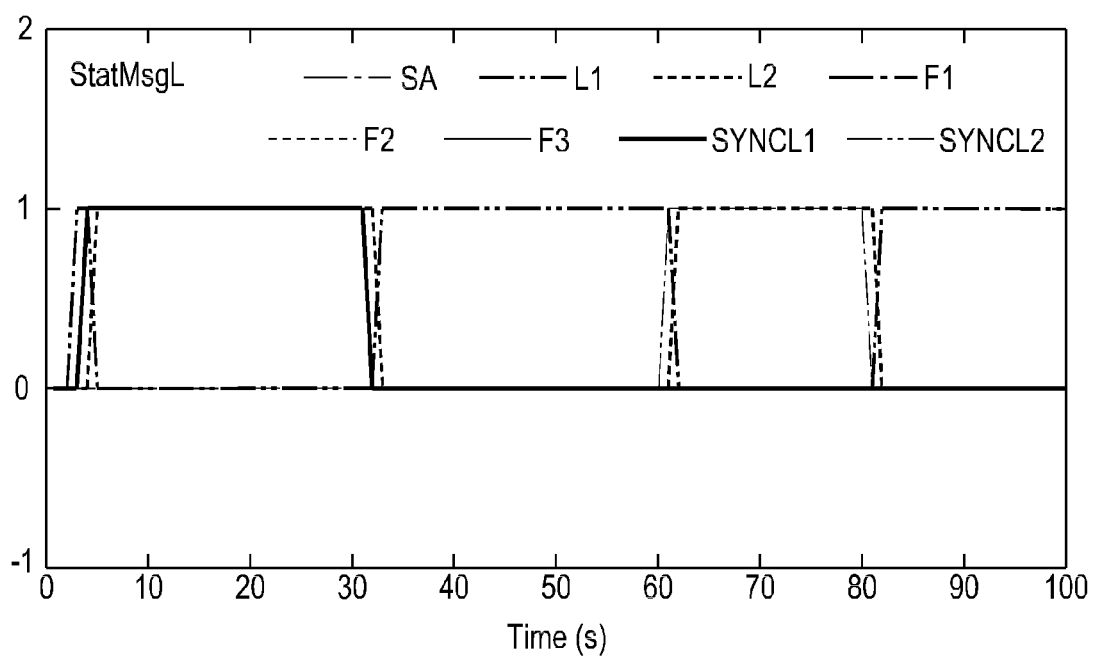
FIGS. 42A, 42B and 42C illustrate status messages of Harvester, Grain Cart I and Grain Cart II during operation.
Figure 42B:
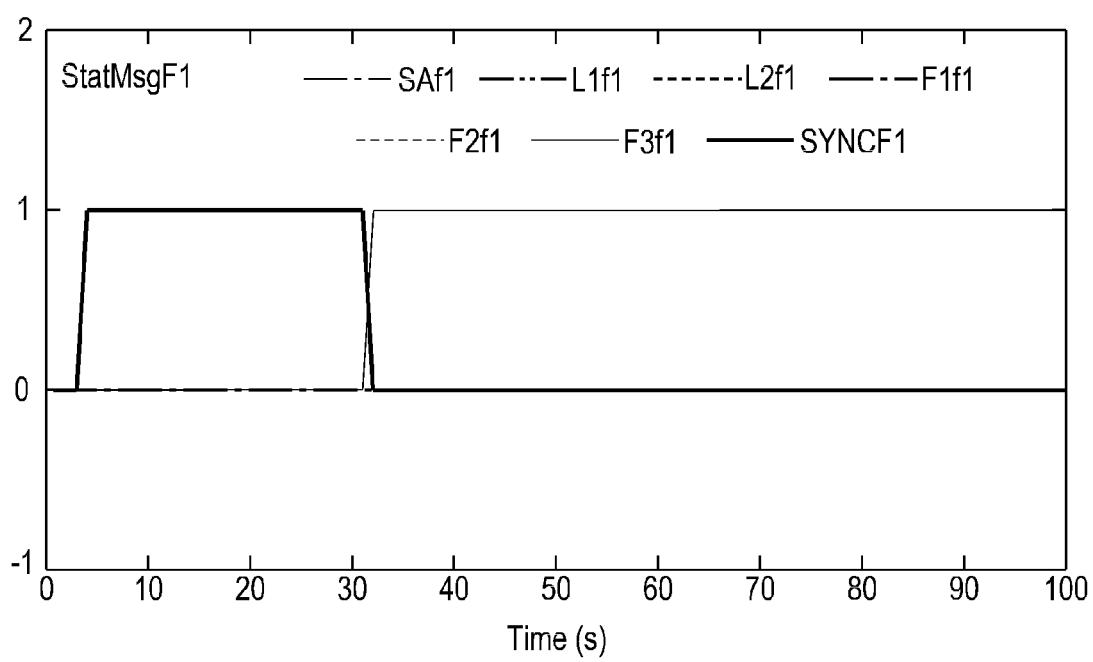
Figure 42C:
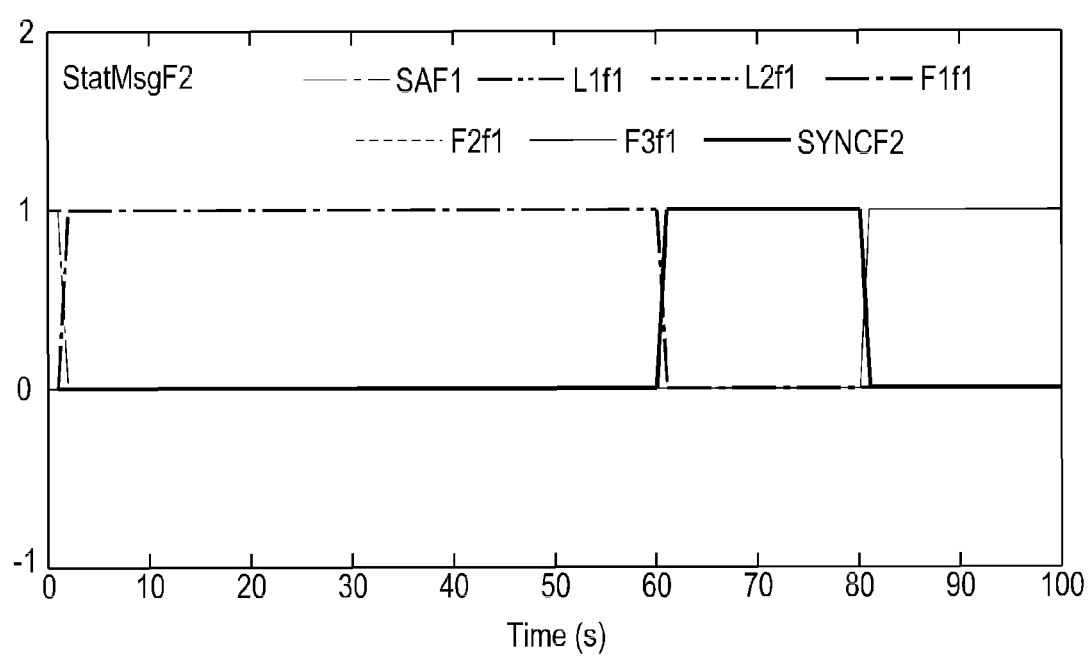

The time series plot of the status messages of the Combine, Grain Cart I and Grain Cart II obtained as outputs of the simulation is seen in FIGS. 42A, 42B and 42C. The duration of the active internal finite states and the statuses of the flags can be determined from the status messages; StatMsgL, StatMsgF1 and StatMsgF2. For example, from FIG. 42A it can be interpreted that the Leader had the task Unload active (since flag L2 is raised) between time 3 and 30 s indicating the unloading of the grain. After unloading the grain, the Leader switches to the task Wait that is represented by the raised flag L1 between 30 and 60 s. The flag L1 is raised again between 60 and 80 s indicating that the Leader is unloading the grain to Follower 2 during that time. Flags L2 and F2. in a raised state correspond to the action of unloading of grain by the Leader and loading of grain by the Follower and are active at the same time indicating that they represent pair of synchronized actions.

The first 3 to 30 s of StatMsgF1 (FIG. 42B) indicate that Follower 1 is loading the grain (since flag F2fl=1 and SYNCF1=0). After loading, the Follower 1 takes the grain to the field edge to unload as indicated by the raised flag F3fl between 30 and 100 s. During the first 60 s (FIG. 42C), when Follower 1 was loading grain and returning to the field edge, Follower 2 was in Go To state and was navigating towards the Leader indicated by the raised flag F1fl between 3 and 60 s. Upon reaching the Combine the grain is loaded on to the Grain Cart II indicated by the active flags F2fl and SYNCF2 between 60 and 80 s. After the transfer of the grain Follower 2 returns to the field edge to unload the grain represented by the raised flag F3fl between 80 and 100 s. Thus, StatMsgL, StatMsgF1 and StatMsgF2 aid in determining the active internal states of the Leader, Follower 1 and Follower 2.

A MRSCA to control agricultural field machinery has been discussed herein. The key component of the MRSCA, the GIM allows multiple levels of cooperation including: No Cooperation, Modest Cooperation and Absolute Cooperation. For purposes of illustration, three typical agricultural tasks (planting, baling and grain harvesting) involving multiple robots were identified and associated with each type of cooperation. The GIM for each application was developed and simulated using MATLAB SIMULINK to assign roles to the robots and create status messages that determined the active states of the robots involved in the cooperative tasks. These status messages allowed the robots to carry out synchronized tasks for accomplishing a cooperative goal.

In a general way the multiple robot control architecture described in the foregoing includes a plurality of robotic agricultural machines, which, for example, includes a first robotic agricultural machine and a second robotic agricultural machine. Each of the robotic agricultural machine includes at least one controller configured to implement a plurality of finite state machines within an IRCA, and a GIM communicatively coupled to the IRCA. The GIM of the first robotic agricultural machine and the GIM of the second robotic agricultural machine are configured to cooperate to cause the first robotic agricultural machine and the second agricultural machine to perform at least one agricultural task, such as baling and gathering hay or harvesting a crop.

The robotic agricultural machines are configured to coordinate their actions with several levels of cooperation including a modest level of cooperation and an absolute level of cooperation. The modest level of cooperation includes an assignment of a leader role to, for example, the first robotic agricultural machine to thereby define a leader robot and an assignment of a follower role to the second robotic agricultural machine to thereby define a follower robot. The leader robot, which may be a baler, is configured to communicate to the follower robot a characteristic of an agricultural product, such as that a bale has been produced and that the bale has a specific location in the field, where the leader robot has dropped the bale. The follower robot is configured to interact with the agricultural product, in this case a bale, without further communication with the leader robot relative to bale. The follower robot then gathers the bale up and takes it to a desired location without further communication with the leader robot. Then in a subsequent action the leader robot communicates to the follower robot a characteristic of another agricultural product, such as another bale being produced, and the follower robot then interacts with the next bale without further communication with the leader robot relative to this bale, again delivering the bale to a desired location.

In another example, using the absolute level of cooperation, involving a leader robot and first and second follower robots, another agricultural task is undertaken, such as the harvesting of a crop, for example with the leader robot being a combine and the two follower robots being mobile grain carts. The leader robot is configured to communicate to the first follower robot a characteristic of the leader robot, such as the need to offload grain and the present position and velocity of the leader robot. The first follower robot is configured to interact with the leader robot relative to the grain, for example to position itself to receive the grain from the leader robot.

At one point the leader robot and the first follower robot communicate with each other relative to the agricultural product and, dependent upon the information communicated, the leader robot and the first follower robot can transition from the absolute level of cooperation to the modest level of cooperation or to a level of no cooperation. This transition takes place once the grain is offloaded and the grain cart then takes on the task of moving the grain to a desired location in the field or to a site where the grain is removed from the grain cart.

As the first follower robot stops or reduces interaction with the leader robot, and the first follower robot moves away, there may be a need for additional offloading of grain from the leader robot. Then the second follower robot and the leader robot communicate with each other relative to a characteristic of said leader robot and a characteristic of the first follower robot. In that the second follower robot is informed that the first follower robot is disengaged from the leader robot and that now the second follower robot is to move into position and match the velocity of the leader robot in order to receive grain from the leader robot.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A multiple robot control architecture, comprising:
    a plurality of robotic agricultural machines including a first robotic agricultural machine and a second robotic agricultural machine, each said robotic agricultural machine including:
        a plurality of actuator controllers;
        at least one controller configured to implement a plurality of finite state machines within an individual robot control architecture (IRCA), a corresponding one of said finite state machines being unique to each of said plurality of actuator controllers, each of the finite state machines operating in parallel relative to each other, with one state in each finite state machine always being active; and
        a global information module (GIM) communicatively coupled to said IRCA, said GIM of said first robotic agricultural machine and said GIM of said second robotic agricultural machine are configured to cooperate to cause said first robotic agricultural machine and said second agricultural machine to perform at least one agricultural task, said GIM including a finite state machine with three parallel finite states.

2. The multiple robot control architecture of claim 1, wherein said plurality of robotic agricultural machines are configured to coordinate their actions with a plurality of levels of cooperation including a modest level of cooperation and an absolute level of cooperation.

3. The multiple robot control architecture of claim 2, wherein said modest level of cooperation includes an assignment of a leader role to said first robotic agricultural machine to thereby define a leader robot and an assignment of a follower role to said second robotic agricultural machine to thereby define a follower robot.

4. The multiple robot control architecture of claim 3, wherein said leader robot is configured to communicate to said follower robot a characteristic of an agricultural product, said follower robot being configured to interact with said agricultural product without further communication with said leader robot relative to said agricultural product.

5. The multiple robot control architecture of claim 4, wherein said leader robot is configured to communicate to said follower robot a characteristic of an other agricultural product, said follower robot being configured to interact with said other agricultural product without further communication with said leader robot relative to said other agricultural product.

6. The multiple robot control architecture of claim 2, wherein said absolute level of cooperation includes an assignment of a leader role to said first robotic agricultural machine to thereby define a leader robot and an assignment of a follower role to said second robotic agricultural machine to thereby define a first follower robot.

7. The multiple robot control architecture of claim 6, wherein said leader robot is configured to communicate to said first follower robot a characteristic of said leader robot, said first follower robot being configured to interact with said leader robot relative to an agricultural product.

8. The multiple robot control architecture of claim 7, wherein at least one of said leader robot and said first follower robot communicate with each other relative to the agricultural product and dependent thereon said leader robot and said first follower robot transition from said absolute level of cooperation to said modest level of cooperation or to a level of no cooperation.

9. The multiple robot control architecture of claim 7, wherein said plurality of robotic agricultural machines includes a third robotic agricultural machine, said third robotic agricultural machine being assigned a follower role to thereby define a second follower robot, said leader robot and said second follower robot communicate with each other relative to a characteristic of said leader robot and a characteristic of said first follower robot.

10. The multiple robot control architecture of claim 9, wherein said first follower robot disengages from said leader robot, said second follower robot and said leader robot being configured to communicate a characteristic of said leader robot, said second follower robot being configured to interact with said leader robot relative to an agricultural product.

11. A method of controlling a multiple robot architecture including a plurality of robotic agricultural machines which include a first robotic agricultural machine and a second robotic agricultural machine, the method comprising the steps of:
    implementing a plurality of finite state machines within an individual robot control architecture (IRCA) in each of said plurality of robotic agricultural machines), a corresponding one of said finite state machines being unique to each of a plurality of actuator controllers, each of the finite state machines operating in parallel relative to each other, with one state in each finite state machine always being active; and
    communicatively coupling a global information module (GIM) in each of said plurality of robotic agricultural machines to said IRCA, said GIM of said first robotic agricultural machine and said GIM of said second robotic agricultural machine are configured to cooperate to cause said first robotic agricultural machine and said second agricultural machine to perform at least one agricultural task, said GIM including a finite state machine with three parallel finite states.

12. The method of claim 11, wherein said plurality of robotic agricultural machines are configured to coordinate their actions with a plurality of levels of cooperation including a modest level of cooperation and an absolute level of cooperation.

13. The method of claim 12, wherein said modest level of cooperation includes an assignment of a leader role to said first robotic agricultural machine to thereby define a leader robot and an assignment of a follower role to said second robotic agricultural machine to thereby define a follower robot.

14. The method of claim 13, wherein said leader robot is configured to communicate to said follower robot a characteristic of an agricultural product, said follower robot being configured to interact with said agricultural product without further communication with said leader robot relative to said agricultural product.

15. The method of claim 14, wherein said leader robot is configured to communicate to said follower robot a characteristic of an other agricultural product, said follower robot being configured to interact with said other agricultural product without further communication with said leader robot relative to said other agricultural product.

16. The method of claim 12, wherein said absolute level of cooperation includes an assignment of a leader role to said first robotic agricultural machine to thereby define a leader robot and an assignment of a follower role to said second robotic agricultural machine to thereby define a first follower robot.

17. The method of claim 16, wherein said leader robot is configured to communicate to said first follower robot a characteristic of said leader robot, said first follower robot being configured to interact with said leader robot relative to an agricultural product.

18. The method of claim 17, wherein at least one of said leader robot and said first follower robot communicate with each other relative to the agricultural product and dependent thereon said leader robot and said first follower robot transition from said absolute level of cooperation to said modest level of cooperation or to a level of no cooperation.

19. The method of claim 17, wherein said plurality of robotic agricultural machines includes a third robotic agricultural machine, said third robotic agricultural machine being assigned a follower role to thereby define a second follower robot, said leader robot and said second follower robot communicate with each other relative to a characteristic of said leader robot and a characteristic of said first follower robot.

20. The method of claim 19, wherein said first follower robot disengages from said leader robot, said second follower robot and said leader robot being configured to communicate a characteristic of said leader robot, said second follower robot being configured to interact with said leader robot relative to an agricultural product.

\* \* \* \* \*